United States Patent
Haruta et al.

(10) Patent No.: US 8,089,593 B2
(45) Date of Patent: Jan. 3, 2012

(54) OPTICAL RESIN FILM, OPTICAL COMPENSATION SHEET, POLARIZING PLATE AND LIQUID CRYSTAL DISPLAY

(75) Inventors: Hiromoto Haruta, Minami-Ashigara (JP); Nobutaka Fukagawa, Minami-Ashigara (JP); Osamu Uchida, Minami-Ashigara (JP); Aiko Yoshida, Minami-Ashigara (JP); Kunihiro Atsumi, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1092 days.

(21) Appl. No.: 11/884,889

(22) PCT Filed: Mar. 17, 2006

(86) PCT No.: PCT/JP2006/305891
§ 371 (c)(1),
(2), (4) Date: Aug. 22, 2007

(87) PCT Pub. No.: WO2006/098517
PCT Pub. Date: Sep. 21, 2006

(65) Prior Publication Data
US 2008/0284957 A1    Nov. 20, 2008

(30) Foreign Application Priority Data

Mar. 17, 2005    (JP) .................................. 2005-077316
Mar. 17, 2005    (JP) .................................. 2005-077317

(51) Int. Cl.
*G02F 1/1335* (2006.01)

(52) U.S. Cl. ........................................ 349/117; 349/120
(58) Field of Classification Search .................. 349/117, 349/120
See application file for complete search history.

(56) References Cited

U.S. PATENT DOCUMENTS

| | | | |
|---|---|---|---|
| 6,778,242 B1 | | 8/2004 | Murayama et al. |
| 2004/0063887 A1* | | 4/2004 | Toyomasu et al. .......... 526/307.2 |

FOREIGN PATENT DOCUMENTS

| | | |
|---|---|---|
| JP | 2000-154261 A | 6/2000 |
| JP | 2001 337222 A | 12/2001 |
| JP | 2003-015113 A | 1/2003 |
| JP | 2003-29033 A | 1/2003 |
| JP | 2003-207621 A | 7/2003 |
| JP | 2004-4550 A | 1/2004 |
| JP | 2004-37714 A | 2/2004 |
| JP | 2004-325523 A | 11/2004 |
| JP | 2004-325971 A | 11/2004 |
| JP | 2004-326089 A | 11/2004 |
| WO | WO 2004/068226 A1 | 8/2004 |

OTHER PUBLICATIONS

PCT/ISA/210.

(Continued)

*Primary Examiner* — Nathanael R Briggs
(74) *Attorney, Agent, or Firm* — Buchanan Ingersoll & Rooney PC

(57) ABSTRACT

An optical resin film is provided, in which a wavelength dispersion of a retardation in planar direction and a wavelength dispersion of a retardation in thickness direction are independently controlled, is provided and has at least an additive having a negative intrinsic birefringence.

14 Claims, 3 Drawing Sheets

OTHER PUBLICATIONS

PCT/ISA/237.
Office Action from Japanese Patent Office issued in corresponding Japanese Patent Application No. 2006-073361 dated Jan. 4, 2011, with an English translation.

Office Action from Japanese Patent Office issued in Applicants' corresponding Japanese Patent Application No. 2006-073360 dated Sep. 14, 2010, and English translation.

* cited by examiner

OPTICAL RESIN FILM, OPTICAL COMPENSATION SHEET, POLARIZING PLATE AND LIQUID CRYSTAL DISPLAY

TECHNICAL FIELD

The present invention relates to an optical resin film, an optical compensation sheet, a polarizing plate and a liquid crystal display.

BACKGROUND ART

A liquid crystal display is spreading in its applications in recent years, as an image display apparatus of a low electric power consumption capable of space saving. A large viewing angle dependence of the displayed image has been considered a major drawback of the liquid crystal display, but a VA liquid crystal mode of a wide viewing angle, recently commercialized, is rapidly increasing the application of the liquid crystal display even in a market requiring a high-quality image such as a television.

Along with such trend of the liquid crystal display, further improvements are being required in the optical compensation ability of an optical compensation member, employed for improving color and contrast, and a viewing angle dependence thereof.

In the optical compensation film for a liquid crystal display of VA mode, JP-A-2004-326089 discloses a technology of constructing a negative C-plate and a positive A-plate, employed for improving the viewing angle characteristics of the liquid crystal display, in a layered structure with a specified combination of wavelength dispersion characteristics, thereby realizing a liquid crystal display of satisfactory color reproducibility, with a high contrast and without an unevenness caused by interference or a color shift. However, in this technology, in case base films of the A-plate and the C-plate are used as protective films of the polarizer, such films are difficult to adhere to a polarizing film and have to be made tacky, thereby resulting in an elevated cost.

Also JP-A-2004-325523 describes a technology of providing a retardation film showing excellent phase difference characteristics over a wide range (from a short wavelength region to a long wavelength region) and showing a satisfactory antireflective property in a short wavelength region and a long wavelength region when employed in a reflective LCD, by a single retardation film which is formed by mixing a resin having a positive refractive index anisotropy, a resin having a negative refractive index anisotropy and a retardation regulating agent showing a dichroic property, or which is formed by mixing a copolymer resin having a repeating unit constituting a polymer with a positive refractive index anisotropy and a repeating unit constituting a polymer with a negative refractive index anisotropy, and a retardation regulating agent mentioned above. This technology is however associated with drawbacks that the materials for preparing the film are inevitably expensive and that the film involves a high production cost and a poor mass producibility.

Also JP-A-2004-325971 discloses a technology of utilizing a laminated phase difference plate showing a birefringence, formed by stretching a layered product containing at least one each of a first layer, principally constituted of a material showing a positive intrinsic birefringence, and a second layer, principally constituted of a material showing a negative intrinsic birefringence, thereby realizing a liquid crystal display of satisfactory color reproducibility, with a high contrast and without an unevenness caused by interference or a color shift. However in this method, the layered product having different softening temperatures is stretched at a certain temperature which is inevitably different from an optimum stretching temperature of each layer, thereby being unable to exhibit a sufficient performance.

Also WO2004/068226 A1 discloses a technology of executing an optical compensation with a polymer film having different wavelength dispersions in a retardation in planar direction and a retardation in thickness direction, thereby further improving a contrast and obtaining a color in a black-display state closer to gray by means of a single compensation film. However this technology is insufficient in optimizing the retardation. Also JP-A-2004-326089 discloses a technology, for realizing the above-mentioned wavelength dispersion characteristics, of utilizing a laminated retardation film formed by laminating, on a stretched polymer film having an inverse wavelength dispersion characteristics in which the retardation becomes smaller at a shorter wavelength, a coated layer having a normal wavelength dispersion characteristics in which the retardation becomes larger at a shorter wavelength. This method, however, involves a complex manufacturing process because of the laminated structure, thus being insufficient in the productivity and the cost.

DISCLOSURE OF THE INVENTION

An object of the present invention is to provide an optical resin film, in which a wavelength dispersion of retardation in planar direction and a wavelength dispersion of retardation in thickness direction are independently controlled. Another object of the present invention is to employ a polarizing plate of which a retardation in planar direction becomes smaller at a shorter wavelength (inverse wavelength dispersion) and a retardation in thickness direction becomes larger at a shorter wavelength (normal wavelength dispersion) in a liquid crystal display, thereby providing a liquid crystal display of a high display quality, with little color change and improved viewing angle dependence of contrast.

As a result of studies undertaken by the present inventors, it is found that the aforementioned objects can be attained by following means:

<First Aspect>

1-1) A stretched optical resin film including at least an additive having a negative intrinsic birefringence and at least an additive having a positive intrinsic birefringence.

1-2) A stretched optical resin film described in 1-1), wherein an absorption maximum of a longest wavelength in the additive having the positive intrinsic birefringence is positioned at a shorter wavelength than an absorption maximum of a longest wavelength in the additive having the positive intrinsic birefringence.

1-3) A substantially transparent stretched optical resin film described in 1-1) or 1-2), wherein a retardation thereof satisfies following relations (A)-(F), preferably relations (A1)-(F1) and more preferably relations (A2)-(F2):

(A) $0\text{ nm} < Re(546) < 300\text{ nm}$;
(B) $30\text{ nm} < Rth(546) < 700\text{ nm}$;
(C) $0.1 < Re(480)/Re(546) < 1.0$;
(D) $1.0 < Re(628)/Re(546) < 4.0$;
(E) $0.8 < Rth(480)/Rth(546) < 4.0$; and
(F) $0.1 < Rth(628)/Rth(546) < 1.2$:
(A1) $20\text{ nm} < Re(546) < 200\text{ nm}$;
(B1) $70\text{ nm} < Rth(546) < 500\text{ nm}$;
(C1) $0.3 < Re(480)/Re(546) < 1.0$;
(D1) $1.0 < Re(628)/Re(546) < 3.0$;
(E1) $1.0 < Rth(480)/Rth(546) < 3.0$; and
(F1) $0.3 < Rth(628)/Rth(546) < 1.0$:
(A2) $30\text{ nm} < Re(546) < 150\text{ nm}$;

(B2) 100 nm<Rth(546)<400 nm;
(C2) 0.5<Re(480)/Re(546)<1.0;
(D2) 1.0<Re(628)/Re(546)<2.0;
(E2) 1.0<Rth(480)/Rth(546)<2.0; and
(F2) 0.5<Rth(628)/Rth(546)<1.0.

1-4) A stretched optical resin film described in any one of 1-1) to 1-3), wherein the stretched polymer film is a cellulose acylate film.

1-5) A stretched optical resin film described in any one of 1-1) to 1-3), wherein the stretched polymer film is a cycloolefin-type polymer film.

1-6) An optical compensation sheet having a stretched polymer film described in any one of 1-1) to 1-5), and an optically anisotropic layer.

1-7) A polarizing plate including a polarizer and two protective, the polarizer being between the two protective films, wherein at least one of the two protective films is formed by a stretched polymer film described in any one of 1-1) to 1-5).

1-8) A polarizing plate including a polarizer and two protective films, the polarizer being between the two protective films, wherein at least one of the two protective films is formed by an optical compensation sheet described in 1-6).

1-9) A liquid crystal display including a liquid crystal cell and two polarizing plates, the liquid crystal cell being between the two polarizing plates, wherein at least one of the two polarizing plates is a polarizing plate described in 1-7) or 1-8).

1-10) A liquid crystal display described in 1-9), wherein the liquid crystal cell is of a VA mode.

1-11) A liquid crystal display described in 1-9), wherein the liquid crystal cell is of an OCB mode.

A stretched optical resin film of a first aspect of the invention, including at least an additive having a negative intrinsic birefringence and at least an additive having a positive intrinsic birefringence, can easily control, in a wide range, a retardation in planar direction, a retardation in thickness direction, and a wavelength dispersion thereof. In the invention, particularly preferred is an optical resin film in which the retardation in planar direction has an inverse wavelength dispersion and the retardation in thickness direction has a normal wavelength dispersion.

An optical resin film having such optical characteristics can be obtained by employing an additive of a positive intrinsic birefringence, having a retardation in planar direction whose wavelength dispersion characteristics in the visible wavelength region is a substantially flat or inverse, and adding an additive of a negative intrinsic birefringence, followed by a stretching.

By the addition of an additive of a positive intrinsic birefringence, in which a longitudinal direction of the molecule and a maximum direction of a polarization anisotropy are substantially parallel, the optical resin film can easily exhibit a retardation in planar direction. Also by the addition of an additive of a negative intrinsic birefringence, in which a direction of a longitudinal direction of the molecule and a maximum direction of a polarization anisotropy are mutually perpendicular, the retardations in planar direction of the optical resin and the additive become mutually perpendicular and the retardation in planar direction of the optical resin is decreased corresponding to the retardation in planar direction of the additive.

Therefore, for example when, in the additive of a positive intrinsic birefringence, the retardation in planar direction has substantially flat or inverse wavelength dispersion in the visible wavelength region and, in the additive of a negative intrinsic birefringence, the retardation in planar direction has normal wavelength dispersion, the resulting stretched optical resin film containing the additive of positive intrinsic birefringence exhibits a retardation in planar direction with an inverse dispersion or a larger inverse dispersion respectively in case the retardation of the stretched film has a flat wavelength dispersion or an inverse wavelength dispersion.

On the other hand, retardations in thickness direction of the optical resin and the additive mutually emphasize in contrast to the retardations in planar direction, as the optical resin and the additive are both oriented in planar direction and maximum directions of polarizations thereof are also oriented in planar direction. In case the additives of positive and negative intrinsic birefringence have a normal wavelength dispersion exceeding a flat or inverse wavelength dispersion of the optical resin, the resulting stretched optical film will show a retardation in thickness direction of a normal dispersion.

Based on the foregoing, it is found that an optical resin film with a retardation in planar direction of an inverse wavelength dispersion and a retardation in thickness direction of a normal wavelength dispersion can be easily realized, and the present invention has thus been made.

In particular in the present invention, the additive of a positive intrinsic birefringence allows to regulate the retardation in planar direction over a wide range without excessively increasing an orienting stretch rate, thereby simply and stably producing a stretched resin film.

Further, the present invention allows to obtain a liquid crystal display with a wide viewing angle for contrast and with little color change even after a prolonged drive.

<Second Aspect>

2-1) A stretched optical resin film including at least an additive having a negative intrinsic birefringence, wherein a retardation thereof satisfies following relations (A)-(F), preferably relations (A1)-(F1) and more preferably relations (A2)-(F2):

(A) 0 nm<Re(546)<300 nm;
(B) 30 nm<Rth(546)<700 nm;
(C) 0.1<Re(480)/Re(546)<1.0;
(D) 1.0<Re(628)/Re(546)<4.0;
(E) 0.8<Rth(480)/Rth(546)<4.0; and
(F) 0.1<Rth(628)/Rth(546)<1.2:
(A1) 20 nm<Re(546)<200 nm;
(B1) 70 nm<Rth(546)<500 nm;
(C1) 0.3<Re(480)/Re(546)<1.0;
(D1) 1.0<Re(628)/Re(546)<3.0;
(E1) 1.0<Rth(480)/Rth(546)<3.0; and
(F1) 0.3<Rth(628)/Rth(546)<1.0:
(A2) 30 nm<Re(546)<150 nm;
(B2) 100 nm<Rth(546)<400 nm;
(C2) 0.5<Re(480)/Re(546)<1.0;
(D2) 1.0<Re(628)/Re(546)<2.0;
(E2) 1.0<Rth(480)/Rth(546)<2.0; and
(F2) 0.5<Rth(628)/Rth(546)<1.0.

2-2) An optical resin film described in 2-1), wherein a retardation of a stretched optical resin film not containing the additive satisfies following relations (G)-(J) and preferably relations (K) and (L):

(G) Re(480)–Re(546)<10;
(H) Re(546)–Re(628)<10;
(I) Rth(480)–Rth(546)<20;
(J) Rth(546)–Rth(628)<20;
(K) Re(480)<Re(546)<Re(628); and
(L) Rth(480)<Rth(546)<Rth(628).

2-3) A stretched optical resin film described in 2-1) or 2-2), wherein cellulose acylate is employed as a material the stretched optical resin film.

2-4) A stretched optical resin film described in any one of 2-1) to 2-3), wherein a cycloolefin polymer is employed as a material the stretched optical resin film.

2-5) A stretched optical resin film described in any one of 2-1) to 2-4), wherein the additive has an absorption maximum within a wavelength region of 200 to 400 rum 2-6) A stretched optical resin film described in any one of 2-1) to 2-5), which has a slow axis crossing a stretching direction of the stretched optical resin film at an angle of −5° to 5°, wherein the angle has a fluctuation range of 5° or less in a longitudinal direction.

2-7) A stretched optical resin film described in any one of 2-1) to 2-6), having a film thickness within a range of 40 to 110 μm.

2-8) A producing method for a stretched optical resin film described in any one of 2-1) to 2-7), which includes adding an additive having a negative intrinsic birefringence to an optical resin film and stretching the film.

2-9) A polarizing plate including a polarizer and two protective films, the polarizer being between the two protective films, wherein at least one of the two protective films is formed by a stretched optical resin film described in any one of 2-1) to 2-8).

2-10) A liquid crystal display apparatus including a liquid crystal cell and two polarizing plates, the liquid crystal cell being between the two polarizing plates, wherein at least one of the two polarizing plates is a polarizing plate described in 2-9).

2-11) A liquid crystal display described in 2-10), wherein the liquid crystal mode is an OCB mode or a VA mode.

2-12) A VA-mode liquid crystal display including a polarizing plate described in 2-9), used at a backlight side of a liquid crystal cell.

In a second aspect of the present invention, particularly preferred is an optical resin film in which a retardation in planar direction has an inverse wavelength dispersion and a retardation in thickness direction has a normal wavelength dispersion.

An optical resin film having the optical characteristics of the present invention can be prepared by adding an additive having a negative intrinsic birefringence to an optical resin, followed by a stretching thereof. The optical resin to be employed preferably has a retardation in planar direction of a substantially a flat or inverse wavelength dispersion in the visible wavelength region.

By the addition of an additive of a negative intrinsic birefringence to a stretched optical resin constituting a matrix, since such additive is so oriented that a maximum direction of a polarization anisotropy thereof is substantially perpendicular to the orienting direction of a polymer chain of the optical resin, the retardations in planar direction of the optical resin and the additive become mutually substantially perpendicular and the retardation in planar direction of the optical resin is decreased corresponding to the retardation in planar direction of the additive, thereby realizing a retardation specified in the invention. The stretched optical resin more preferably has a retardation in planar direction and a retardation in thickness direction of substantially flat or inverse wavelength dispersion characteristics in the visible wavelength region. As the additive has a normal wavelength dispersion, the resulting stretched optical resin film exhibits a retardation in planar direction with an inverse dispersion or a larger inverse dispersion respectively in case the retardation of the optical resin has a flat wavelength dispersion or an inverse wavelength dispersion. On the other hand, retardations in thickness direction of the optical resin and the additive mutually emphasize in contrast to the retardations in planar direction, as the optical resin and the additive are both oriented in planar direction and maximum directions of polarizations thereof are also oriented in planar direction. In case the additive has a normal wavelength dispersion exceeding a flat or inverse wavelength dispersion of the optical resin, the resulting stretched optical film will show a retardation in thickness direction of a normal dispersion.

The present invention allows to provide an optical resin film and a polarizing plate, in which a wavelength dispersion of a retardation in planar direction and a wavelength dispersion of a retardation in thickness direction are independently controlled. In particular, it allows to obtain an optical resin film and a polarizing plate, in which a retardation in planar direction has an inverse wavelength dispersion and a retardation in thickness direction has a normal wavelength dispersion.

The present invention allows to produce an optical resin film by a casting of a polymer solution and a stretching of a film, without requiring a coating operation, thereby enabling a simpler and more inexpensive production in comparison with the prior technology relying on a coating.

A polarizing plate having such optical compensation function can be utilized particularly advantageously in a liquid crystal display apparatus of VA (vertical alignment) mode or OCB (optically compensated bend) mode, and can provide a liquid crystal display apparatus having a wide viewing angle in contrast and in color.

Figure 1A:
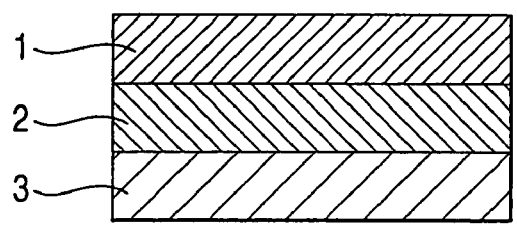
FIGS. 1A and 1B are schematic views showing an exemplary embodiment of a polarizing plate of the present invention.

Reference numerals and symbols are set forth below:
1 upper polarizing plate
2 absorption axis of upper polarizing plate
3 first optically anisotropic layer
4 slow axis of first optically anisotropic layer
5 upper electrode substrate of liquid crystal cell
6 orientation control direction of upper substrate
7 liquid crystal layer
8 lower electrode substrate of liquid crystal cell
9 orientation control direction of lower substrate
10 second optically anisotropic layer 1
11 slow axis of second optically anisotropic layer 1
12 second optically anisotropic layer 2
13 slow axis of second optically anisotropic layer 2
14 lower polarizing plate
15 absorption axis of lower polarizing plate
101 protective film for polarizing plate
102 slow axis of polarizing plate protective film
103 polarizing film of polarizing plate
104 absorption axis of polarizing film
105 protective film for polarizing plate
106 slow axis of polarizing plate protective film

DETAILED DESCRIPTION OF THE INVENTION

In the following, exemplary embodiments of the present invention will be clarified in detail.

A retardation film of the first aspect of the invention is a stretched polymer film including at least an additive having a negative intrinsic birefringence and at least an additive having a positive intrinsic birefringence. A retardation film of the second aspect of the invention is a stretched polymer film including at least an additive having a negative intrinsic birefringence.

In the present specification, an "additive having a positive intrinsic birefringence" means an additive which is oriented along with an orientation of a polymer resin constituting a matrix and which shows a large polarization in a direction substantially parallel to the orienting direction, and an "additive having a negative intrinsic birefringence" means an additive which is oriented along with an orientation of a polymer resin constituting a matrix and which shows a large polarization in a direction substantially perpendicular to the stretching direction. The orientation of the additive molecule need not be in a strictly same direction as the orientation of the polymer resin, but it is important that the additive shows a large polarization anisotropy in a direction substantially perpendicular to the orienting direction of the polymer chain. The orienting direction of the main polymer chain or the additive molecule can be measured by a polarized Raman spectroscopy or a polarized IR spectroscopy, and the polarization anisotropy of these substances can be measured by other methods, so that a relative relationship of the polymer chain and the additive can be easily recognized.

(Additive Having a Positive Intrinsic Birefringence)

In the additive having a positive intrinsic birefringence to be employed in the invention, the intrinsic birefringence preferably has a small or inverse wavelength dispersion, and more specifically, it is preferably so selected that specific birefringences ($\Delta n$) at a wavelength of 450 nm ($\Delta n(450)$) and a wavelength of 550 nm ($\Delta n(550)$) satisfy a following relation:

$|\Delta n(450)/\Delta n(550)| \leq 1.00$

More preferably it is so selected as to satisfy a following relation:

$|\Delta n(450)/\Delta n(550)| \leq 0.95$

A value $|\Delta(450)/\Delta n(550)|$ is preferably larger.

The additive may have any structure or any molecular weight as long as the above-mentioned condition is satisfied, but a compound having a high mutual solubility with the polymer resin and showing a large polarization anisotropy is preferable. Also the additive preferably has an absorption maximum within a wavelength range of 150-400 nm, more preferably having an absorption maximum within a wavelength range of 150-300 nm, and particularly preferably having an absorption maximum within a wavelength range of 150-250 nm. Specific examples of such additive include a polyvinyl alcohol-based oligomer, a polycarbonate-based oligomer, an olefinic oligomer (such as polyethylene or polypropylene), a norbornene-based oligomer and an additive represented by the following formula (A1). Among these, the additive represented by the formula (A1) is particularly preferable. However, the present invention is not at all restricted by these examples.

The additive having positive intrinsic birefringence preferably has a content of 0.1-20 mass % with respect to 100 parts by weight of the polymer resin, more preferably 1-15 mass % and further preferably 1-10 mass %.

The additive having positive intrinsic birefringence in the invention may be dissolved in an organic solvent such as an alcohol, methylene chloride or dioxolane and then added to a solution (dope) of the polymer resin, or may be directly added to the dope composition.

The additive having positive intrinsic birefringence is preferably a compound represented by the following formula (A1), as it is an additive having an absorption maximum in a lower wavelength side in the ultraviolet region and showing a large intrinsic birefringence:

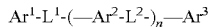  Formula (A1)

$Ar^1-L^1-(—Ar^2-L^2-)_n—Ar^3$ (wherein $Ar^1$, $Ar^2$ and $Ar^3$ each represents an aryl group, or an aromatic heterocyclic group; $L^1$ and $L^2$ each represent a single bond, or a divalent linkage group; n represents an integer of 3 or larger, and $Ar^2$s and $L^2$s may be mutually same or different).

In the following, the compound represented by the formula (A1) in the invention will be explained in detail.

In the formula (A1), $Ar^1$, $Ar^2$ and $Ar^3$ each represent an aryl group, or an aromatic heterocyclic group; $L^1$ and $L^2$ each represent a single bond, or a divalent linkage group; n represents an integer of 3 or larger, and $Ar^2$s and $L^2$s may be mutually same or different.

$Ar^1$, $Ar^2$ and $Ar^3$ each represent an aryl group, or an aromatic heterocyclic group, and an aryl group represented by $Ar^1$, $Ar^2$ or $Ar^3$ is preferably an aryl group with 6-30 carbon atoms, having a single ring or forming condensed rings with another ring. Also it may have a substituent when possible, and a substituent T to be explained later is applicable to such substituent.

In the formula (A1), the aryl group represented by $Ar^1$, $Ar^2$ or $Ar^3$ more preferably has 6-20 carbon atoms and particularly preferably has 6-12 carbon atoms, and can for example be phenyl, p-methylphenyl or naphthyl.

In the formula (A1), the aromatic heterocyclic group represented by $Ar^1$, $Ar^2$ or $Ar^3$ may be any aromatic heterocycle containing at least one of an oxygen atom, a nitrogen atom and a sulfur atom, and is preferably a 5- or 6-membered aromatic heterocycle containing at least one of an oxygen atom, a nitrogen atom and a sulfur atom. Also it may have a substituent when possible, and a substituent T to be explained later is applicable to such substituent.

Specific examples of the aromatic heterocyclic group represented by $Ar^1$, $Ar^2$ or $Ar^3$ in the formula (A1) include furan, pyrrole, thiophene, imidazole, pyrazole, pyridine, pyradine, pyridazine, triazole, triazine, indole, indazole, purin, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, tetrazaindene, pyrrolotriazole, and pyrazolotriazole. The aromatic heterocycle is preferably benzimidazole, benzoxazole, benzothiazole or benzotriazole.

In the formula (A1), $L^1$ and $L^2$ each represent a single bond, or a divalent linkage group, and the divalent linkage group is preferably a group represented by —$NR^7$— ($R^7$ representing an alkyl group or an aryl group that may have a substituent), —$SO_2$—, —CO—, an alkylene group, a substituted alkylene group, an alkenylene group, a substituted alkenylene group, an alkinylene group, —O—, —S—, —SO— or a group formed by combining two or more of these divalent groups, among which more preferred is —O—, —CO—, —$SO_2NR^7$—, —$NR^7SO_2$—, —$CONR^7$—, —$NR^7CO$—, —COO—, —OCO— or an alkinylene group, and most preferred is —$CONR^7$—, —$NR^7CO$—, —COO—, —OCO— or an alkinylene group. In the compound represented by the formula (A1) of the invention, $Ar^2$ is bonded with $L^1$ and $L^2$ and in case $Ar^2$ is a phenylene group, $L^1$-$Ar^2$-$L^2$ and $L^2$-$Ar^2$-$L^2$ are most preferably in mutually para-positions (1,4-positions).

n represents an integer of 3 or larger, preferably 3 to 7 and more preferably 3 to 5.

The compound of the formula (a1) is preferably a compound represented by a formula (A2), which will be explained in details in the following.

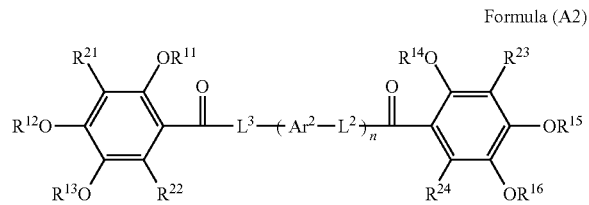

Formula (A2)

In the formula (A2), $R^{11}$, $R^{12}$, $R^{13}$, $R^{14}$, $R^{15}$, $R^{16}$, $R^{21}$, $R^{22}$, $R^{23}$ and $R^{24}$ each represent a hydrogen atom or a substituent; $Ar^2$ represents an aryl group or an aromatic heterocyclic group; $L^2$ and $L^3$ each represent a single bond or a divalent linkage group; n represents an integer of 3 or larger, and $Ar^2$s and $L^2$s may be mutually same or different.

Examples of $Ar^2$, $L^2$ and n are same as those in the formula (A1). $L^3$ represents a single bond, or a divalent linkage group, and the divalent linkage group is preferably a group represented by —$NR^7$— ($R^7$ representing an alkyl group or an aryl group that may have a substituent), an alkylene group, a substituted alkylene group, —O—, or a group formed by combining two or more of these divalent groups, among which more preferred is —O—, —$NR^7$—, —$NR^7SO_2$—, or —$NR^7CO$—.

$R^{11}$, $R^{12}$, $R^{13}$, $R^{14}$, $R^{15}$ and $R^{16}$ each independently represent a hydrogen atom or a substituent, preferably a hydrogen atom, an alkyl group or an aryl group, more preferably a hydrogen atom, an alkyl group with 1-4 carbon atoms (such as a methyl group, an ethyl group, a propyl group or an isopropyl group), or an aryl group with 6-12 carbon atoms (such as a phenyl group or a naphthyl group), and further preferably an alkyl group with 1-4 carbon atoms.

$R^{22}$, $R^{23}$ and $R^{24}$ each independently represent a hydrogen atom or a substituent, preferably a hydrogen atom, an allyl group, an alkoxy group or a hydroxyl group, more preferably a hydrogen atom or an alkyl group (preferably with 1-4 carbon atoms and more preferably a methyl group).

In the following, the aforementioned substituent T will be explained.

The substituent T is preferably a halogen atom (such as a fluorine atom, a chlorine atom, a bromine atom or an iodine atom), an alkyl group (preferably with 1 to 30 carbon atoms, such as methyl, ethyl, n-propyl, isopropyl, t-butyl, n-octyl, or 2-ethylhexyl), a cycloalkyl group (preferably a substituted or non-substituted cycloalkyl group with 3 to 30 carbon atoms, such as cyclohexyl, cyclopentyl or 4-n-dodecylcyclohexyl), a bicycloalkyl group (preferably a substituted or non-substituted bicycloalkyl group with 5 to 30 carbon atoms, namely a monovalent group formed by eliminating a hydrogen atom from a bicycloalkane with 5 to 30 carbon atoms, such as bicyclo[1,2,3]heptan-2-yl or bicyclo[2,2,2]octan-3-yl), an alkenyl group (preferably a substituted or non-substituted alkenyl group with 2 to 30 carbon atoms, such as vinyl or allyl), a cycloalkenyl group (preferably a substituted or non-substituted cycloalkenyl group with 3 to 30 carbon atoms, namely a monovalent group formed by removing a hydrogen atom from a cycloalkene with 3 to 30 carbon atoms, such as 2-cyclopenten-1-yl or 2-cyclohexen-1-yl), a bicycloalkenyl group (a substituted or non-substituted bicycloalkenyl group, preferably a substituted or non-substituted bicycloalkenyl group with 5 to 30 carbon atoms, namely a monovalent group formed by removing a hydrogen atom from a bicycloalkene having a double bond, such as bicyclo[2,2,1]hept-2-en-1-yl or bicyclo[2,2,2]oct-2-en-4-yl), an alkinyl group (preferably a substituted or non-substituted alkinyl group with 2 to 30 carbon atoms such as ethinyl or propalgyl), an aryl group (preferably a substituted or non-substituted aryl group with 6 to 30 carbon atoms, such as phenyl, p-tolyl or naphthyl), a heterocyclic group (preferably a monovalent group formed by removing a hydrogen atom from a 5- or 6-membered, substituted or non-substituted, and aromatic or non-aromatic heterocyclic compound, and more preferably a 5- or 6-membered aromatic heterocyclic group with 3 to 30 carbon atoms, such as 2-furyl, 2-thienyl, 2-pyrimidinyl or 2-benzothiazolyl), a cyano group, a hydroxyl group, a nitro group, a carboxyl group, an alkoxy group (preferably a substituted or non-substituted alkoxy group with 1 to 30 carbon atoms, such as methoxy, ethoxy, isopropoxy, t-butoxy, n-octyloxy, or 2-methoxyethoxy), an aryloxy group (preferably a substituted or non-substituted aryloxy group with 6 to 30 carbon atoms, such as phenoxy, 2-methylphenoxy, 4-t-butylphenoxy, 3-nitrophenoxy, or 2-tetradecanoylaminophenoxy), a silyloxy group (preferably a silyloxy group with 3 to 20 carbon atoms, such as trimethylsilyloxy, or t-butyldimethylsilyloxy), a heterocyclic oxy group (preferably a substituted or non-substituted heterocyclic oxy group with 2 to 30 carbon atoms, 1-phenyltetrazol-5-oxy or 2-tetrahydropyranyloxy), an acyloxy group (preferably a formyloxy group, a substituted or non-substituted alkylcarbonyloxy group with 2 to 30 carbon atoms, or a substituted or non-substituted arylcarbonyloxy group with 6 to 30 carbon atoms such as formyloxy, acetyloxy, pivaloyloxy, stearoyloxy, benzoyloxy, or p-methoxyphenylcarbonyloxy), a carbamoyloxy group (preferably a substituted or non-substituted carbamoyloxy group with 1 to 30 carbon atoms, such as N,N-dimethylcarbamoyloxy, N,N-diethylcarbamoyloxy, morpholinocarbonyloxy, or N,N-di-n-octylaminocarbonyloxy), an alkoxycarbonyloxy group (preferably a substituted or non-substituted alkoxycarbonyloxy group with 2 to 30 carbon atoms, such as methoxycarbonyloxy, ethoxycarbonyloxy, t-butoxycarbonyloxy or n-octylcarbonyloxy), an aryloxycarboyloxy group (preferably a substituted or non-substituted aryloxycarbonyloxy group with 7 to 30 carbon atoms, such as phenoxycarbonyloxy, p-methoxyphenoxycarbonyloxy, or p-n-hexadecyloxyphenoxycarbonyloxy), an amino group (preferably an amino group, a substituted or non-substituted alkylamino group with 1 to 30 carbon atoms, or a substituted or non-substituted anilino group with 6 to 30 carbon atoms, such as amino, methylamino, dimethylamino, anilino, N-methyl-anilino or diphenylamino), an acylamino group (preferably a formylamino group, a substituted or non-substituted alkylcarbonylamino group with 1 to 30 carbon atoms or a substituted or non-substituted arylcarbonylamino group with 6 to 30 carbon atoms, such as formylamino, acetylamino, pivaloylamino, lauroylamino or benzoylamino), an aminocarbonylamino group (preferably a substituted or non-substituted aminocarbonylamino group with 1 to 30 carbon atoms, such as carbamoyl amino, N,N-dimethylaminocarbonylamino, N,N-diethylaminocarbonylamino, or morpholinocarbonylamino), an alkoxycarbonylamino group (preferably a substituted or non-substituted alkoxycarbonylamino group with 2 to 30 carbon atoms, such as methoxycarbonylamino, ethoxycarbonylamino, t-butoxycarbonylamino, n-octadecyloxycarbonylamino, or N-methyl-methoxycarbonylamino), an aryloxycarbonylamino group (preferably a substituted or non-substituted aryloxycarbonylamino group with 7 to 30 carbon atoms, such as phenoxycarbonylamino, p-chlorophenoxycarbonylamino, or m-n-octyloxyphenoxycarbonylamino), a sulfamoylamino group (preferably a substituted or non-substituted sulfamoylamino group with 0 to 30 carbon atoms, such as sulfamoylamino, N,N-dimethylaminosulfonylamino or N-n-octylaminosulfonylamino), an alkyl- or aryl-sulfonylamino group (preferably a substituted or non-substituted alkylsulfonylamino group with 1 to 30 carbon atoms or a substituted or non-substituted arylsulfonylamino group with 6 to 30 carbon atoms, such as methylsulfonylamino, butylsulfonylamino, phenylsulfonylamino, 2,3,5-trichlorophenylsulfonylamino, or p-methylphenylsulfonylamino), a mercapto group, an alkylthio group (preferably a substituted or non-substituted alkylthio group with 1 to 30 carbon atoms, such as methylthio, ethylthio, or n-hexadecylthio), an arylthio group. (preferably a substituted or non-substituted arylthio group with 6 to 30 carbon atoms, such as phenylthio, p-chlorophenylthio, or m-methoxyphenylthio), a heterocyclic thio group (preferably a substituted or non-substituted heterocyclic thio group with 2 to 30 carbon atoms, such as 2-benzothiazolylthio, or 1-phenyltetrazol-5-ylthio), a sulfamoyl group (preferably a substituted or non-substituted sulfamoyl group with 0 to 30 carbon atoms, such as N-ethylsulfamoyl, N-(3-dodecyloxypropyl)sulfamoyl, N,N-dimethylsulfamoyl, N-acetylsulfamoyl, N-benzoylsulfamoyl, or N—(N'-phenylcarbamoyl)sulfamoyl), a sulfo group, an alkyl- or aryl-sulfinyl group (preferably a substituted or non-substituted alkylsulfinyl group with 1 to 30 carbon atoms, or a substituted or non-substituted arylsulfinyl group with 6 to 30 carbon atoms, such as methylsulfinyl, ethylsulfinyl, phenylsulfinyl, or p-methylphenylsulfinyl), an alkyl- or aryl-sulfonyl group (preferably a substituted or non-substituted alkylsulfonyl group with 1 to 30 carbon atoms or a substituted or non-substituted arylsulfonyl group 6 to 30 carbon atoms, such as methylsulfonyl, ethylsulfonyl, phenylsulfonyl, or p-methylphenylsulfonyl), an acyl group (preferably a formyl group, a substituted or non-substituted alkylcarbonyl group with 2 to 30 carbon atoms, or a substituted or non-substituted arylcarbonyl group with 7 to 30 carbon atoms, such as acetyl or pivaloylbenzoyl), an aryloxycarbonyl group (preferably a substituted or non-substituted with 7 to 30 carbon atoms, such as phenoxycarbonyl, o-chlorophenoxycarbonyl, m-nitrophenoxycarbonyl, or p-t-butylphenoxycarbonyl), an alkoxycarbonyl group (preferably a substituted or non-substituted alkoxycarbonyl group with 2 to 30 carbon atoms, such as methoxycarbonyl, ethoxycarbonyl, t-butoxycarbonyl, or n-octadecyloxycarbonyl), a carbamoyl group (preferably a substituted or non-substituted carbamoyl group with 1 to 30 carbon atoms, such as carbamoyl, N-methylcarbamoyl, N,N-dimethylcarbamoyl, N,N-di-n-octylcarbamoyl, or N-(methylsulfonyl)carbamoyl), an arylazo or heterocyclic azo group (preferably a substituted or non-substituted arylazo group with 6 to 30 carbon atoms, or a substituted or non-substituted heterocyclic azo group with 3 to 30 carbon atoms, such as phenylazo, p-chlorophenylazo, or 5-ethylthio-1,3,4-thiadiazol-2-ylazo), an imide group (preferably N-succinimide or N-phthalimide), a phosphino group (preferably a substituted or non-substituted phosphino group with 2 to 30 carbon atoms, such as dimethylphosphino, diphenylphosphino, or methylphenoxyphosphino), a phosphinyl group (preferably a substituted or non-substituted phosphinyl group with 2 to 30 carbon atoms, such as phosphinyl, dioctyloxyphosphinyl, or diethoxyphosphinyl), a phosphinyloxy group (preferably a substituted or non-substituted phosphinyloxy group with 2 to 30 carbon atoms, such as diphenoxyphosphinyloxy, or dioctyloxyphosphinyloxy), a phosphinylamino group (preferably a substituted or non-substituted phosphinylamino group with 2 to 30 carbon atoms, such as dimethoxyphosphinylamino, or dimethylaminophosphinylamino), or a silyl group (preferably a substituted or non-substituted silyl group with 3 to 30 carbon atoms, such as trimethylsilyl, t-butyldimethylsilyl or phenyldimethylsilyl).

Among the substituents mentioned above, a substituent having a hydrogen atom may be subjected to a substitution of such hydrogen atom with the above-mentioned substituent. Examples of such group include an alkylcarbonylaminosulfonyl group, an arylcarbonylaminosulfonyl group, an alkylsulfonylaminocarbonyl group, and an arylsulfonylaminocarbonyl group, such as methylsulfonylaminocarbonyl, p-methylphenylsulfonylaminocarbonyl, acetylaminosulfonyl or benzoylaminosulfonyl.

In case two or more substituents are present, they may be same or different, and, in case possible, they may be mutually bonded to form a ring.

In the following, specific examples of the compound represented by the formulas (A1) and (A2), but the present invention is not at all restricted by these examples.

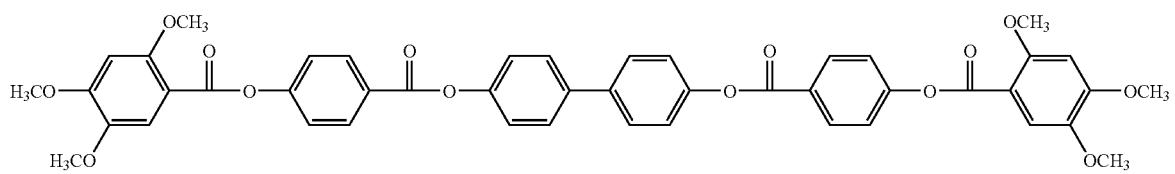

(1)

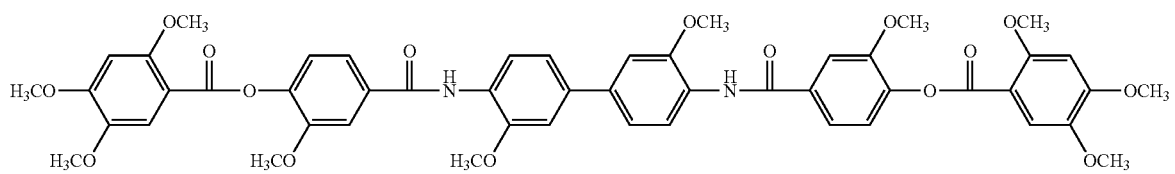

(2)

-continued
(3)
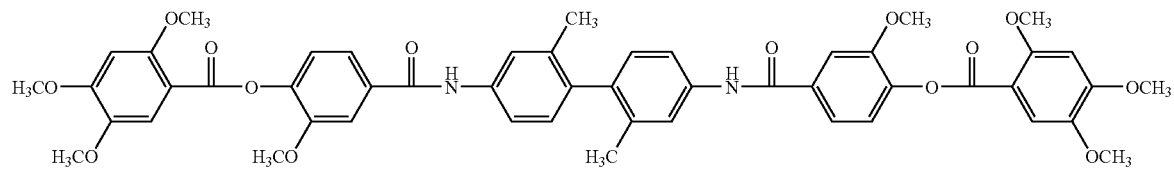
(4)
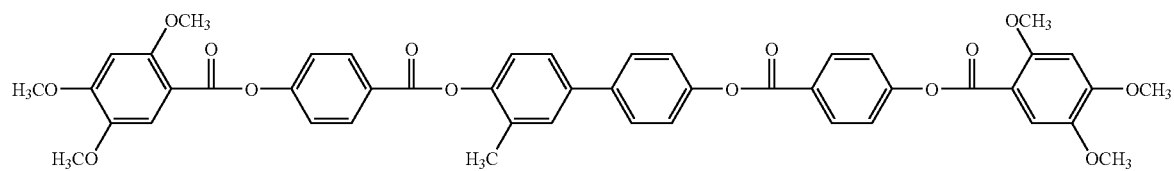
(5)
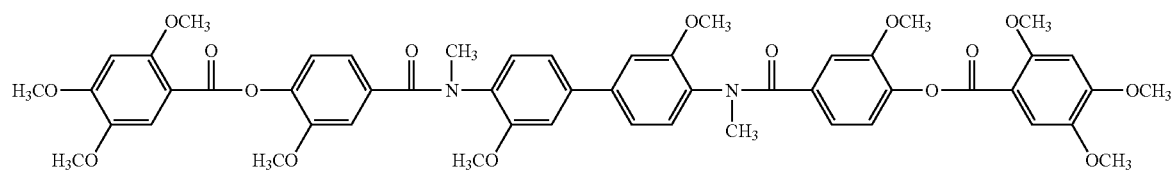
(6)
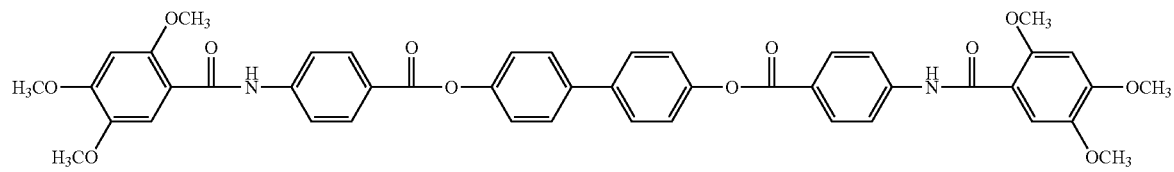
(7)
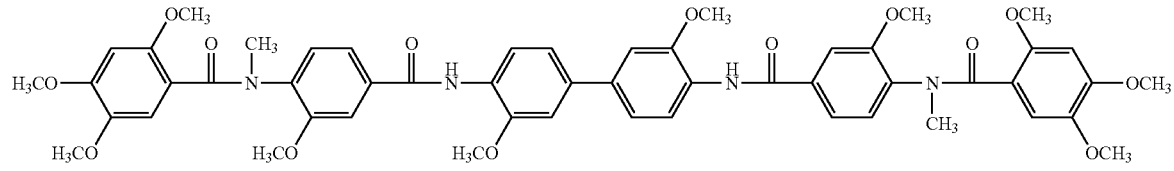
(8)
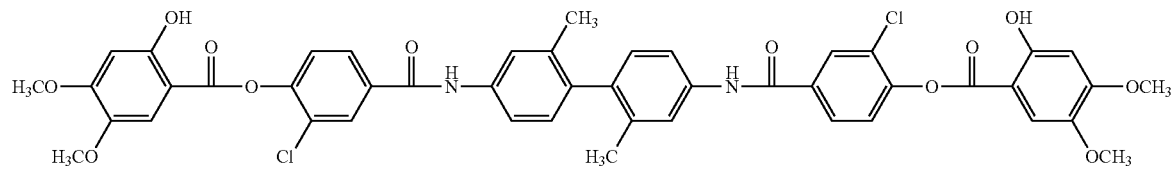
(9)
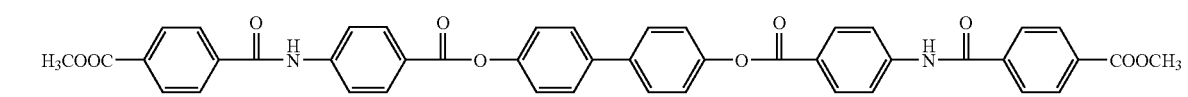
(10)
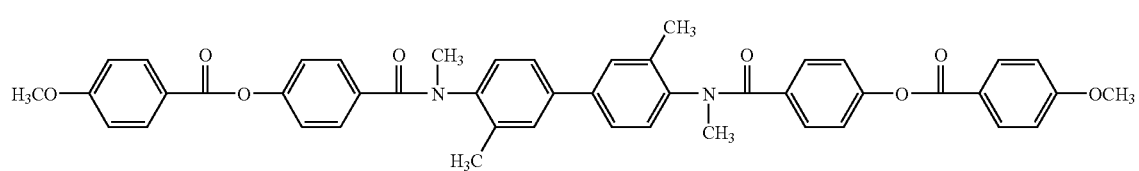

-continued
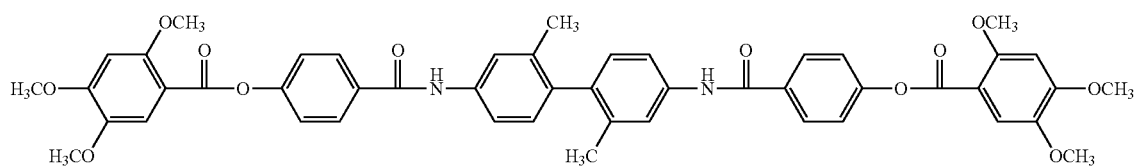
(11)
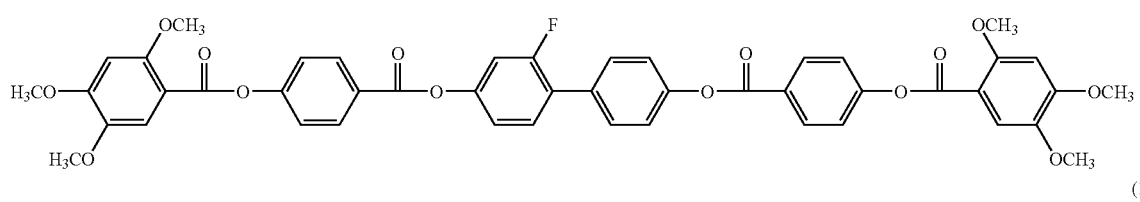
(12)
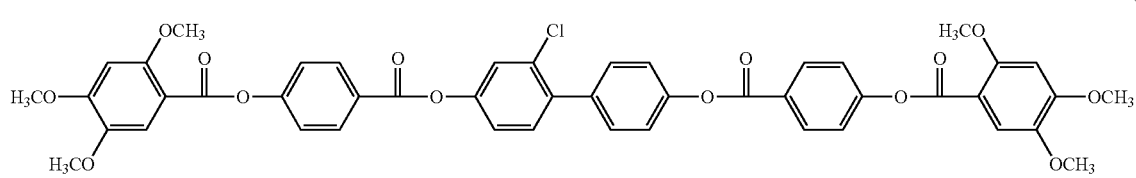
(13)
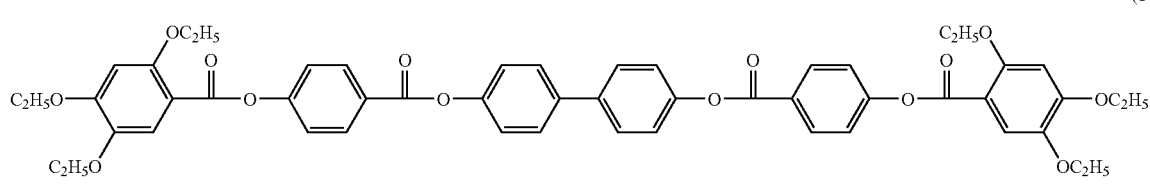
(14)
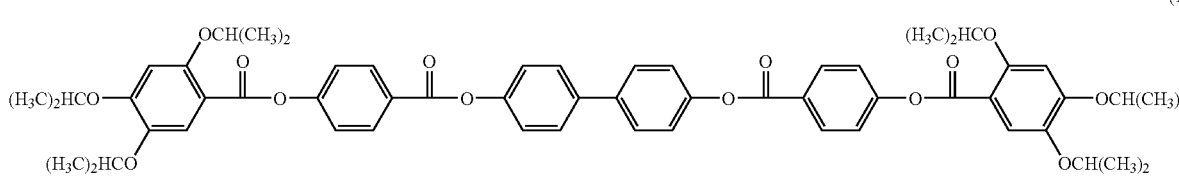
(15)
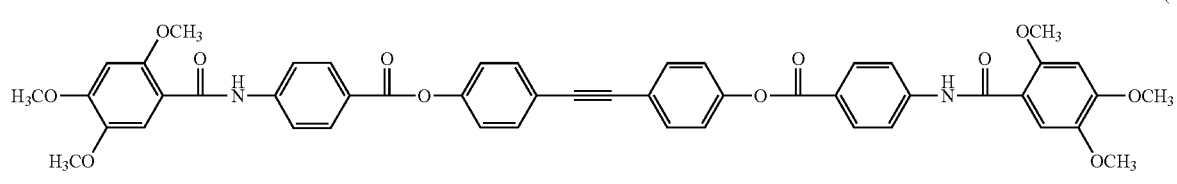
(16)
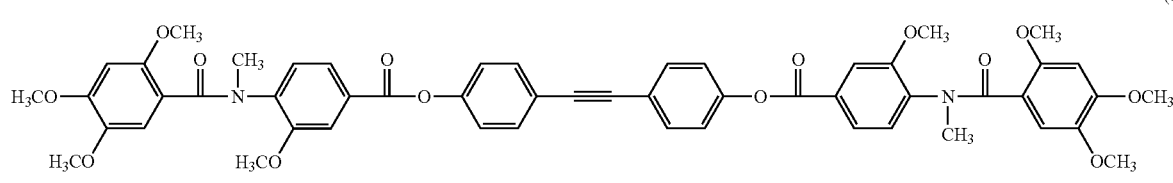
(17)
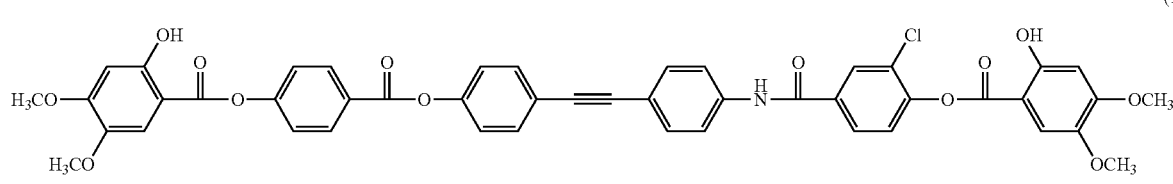
(18)
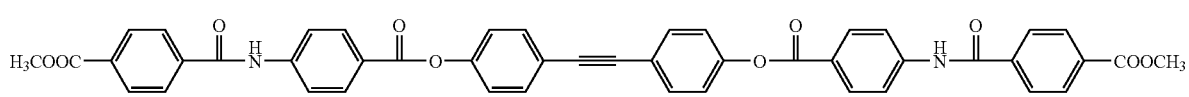
(19)

-continued
(20)
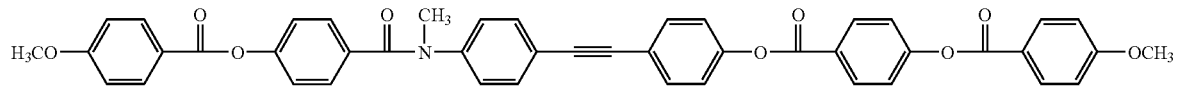
(21)
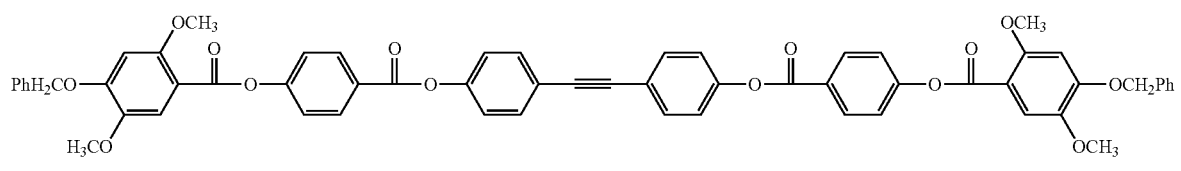
(22)
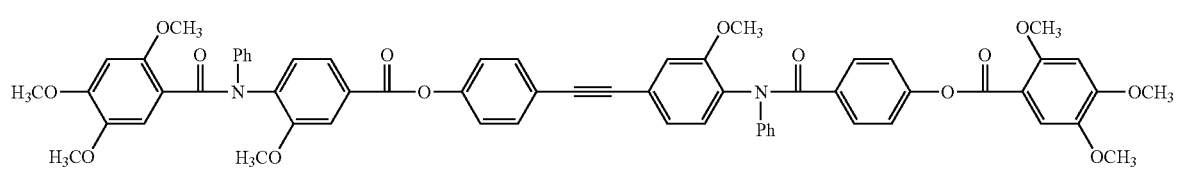
(23)
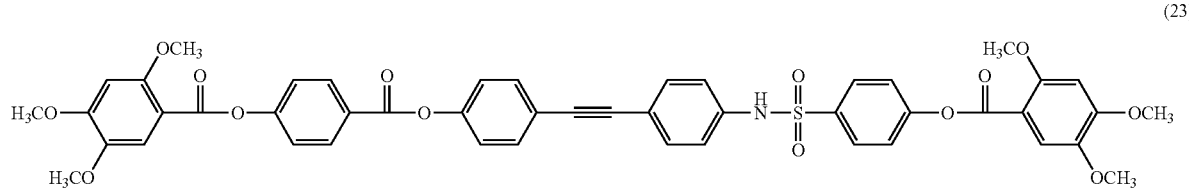
(24)
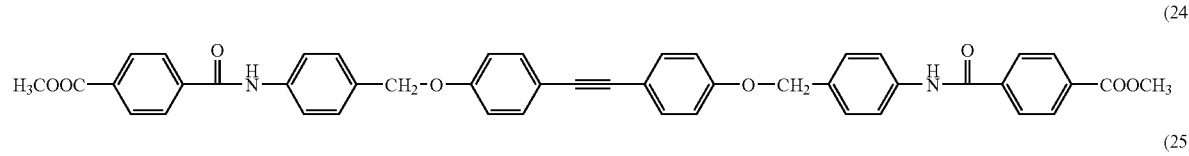
(25)
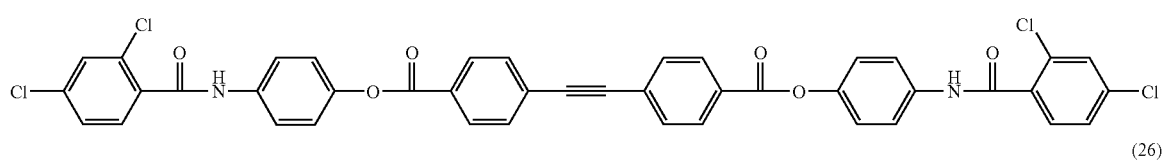
(26)
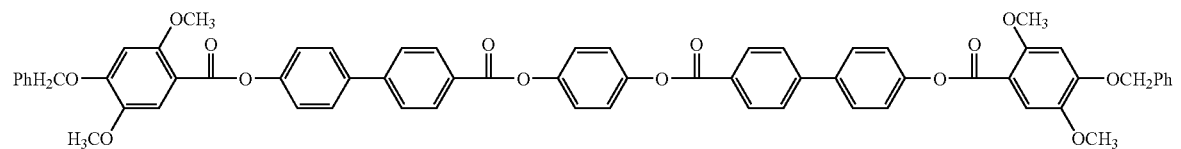
(27)
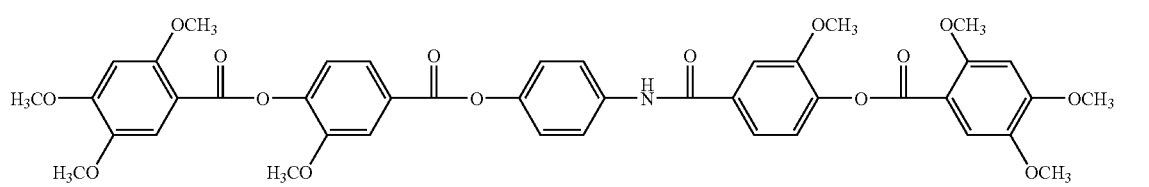
(28)
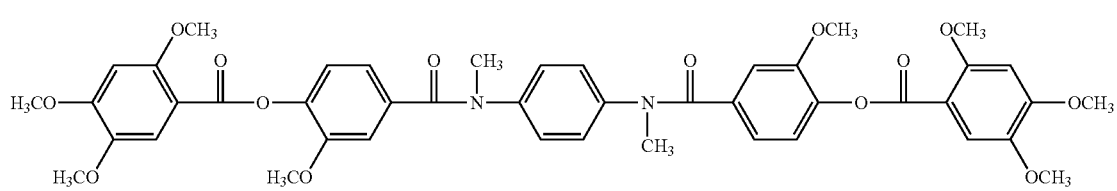

-continued
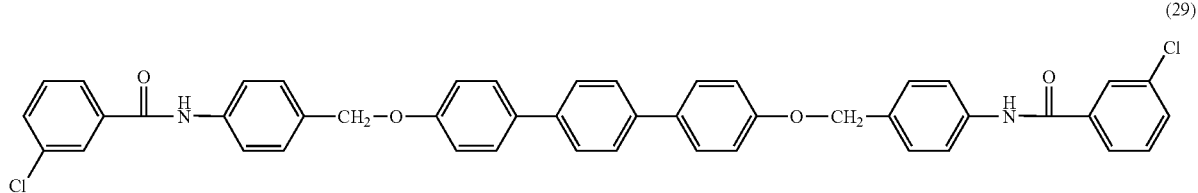
(29)
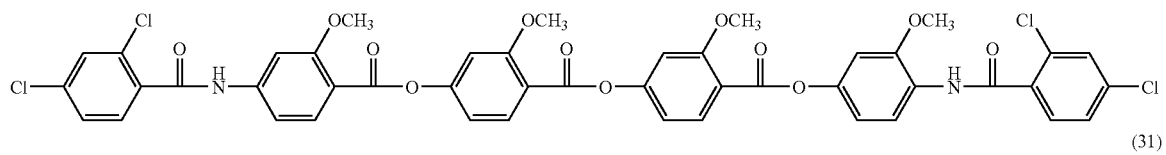
(30)
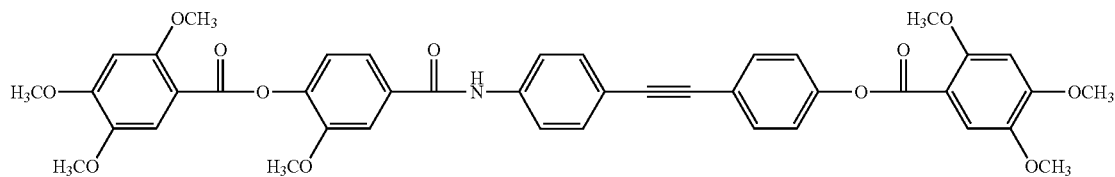
(31)
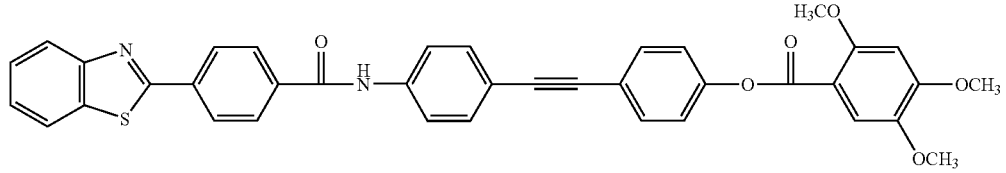
(32)
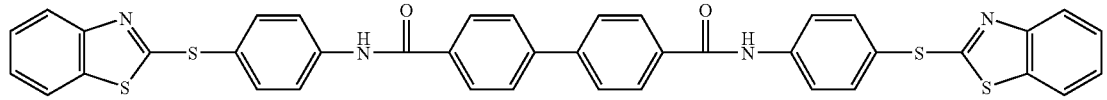
(33)
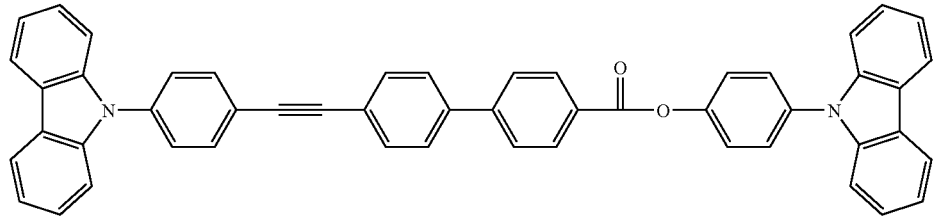
(34)
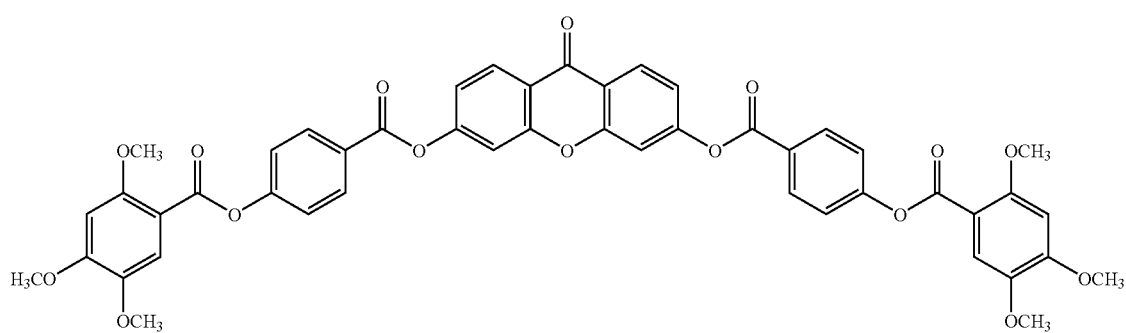
(35)
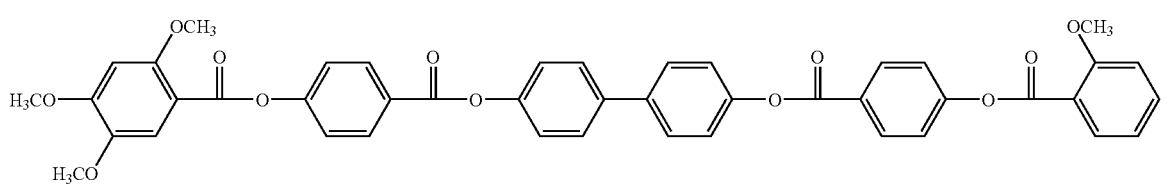
(36)

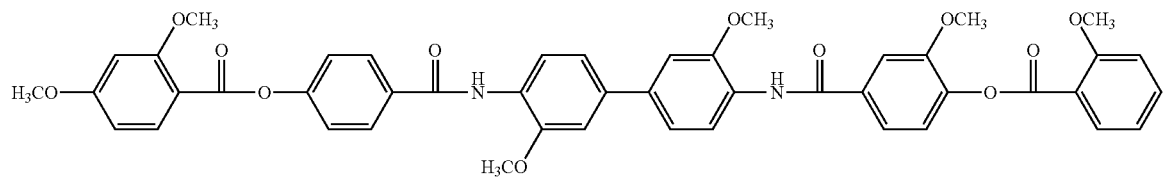

(37)

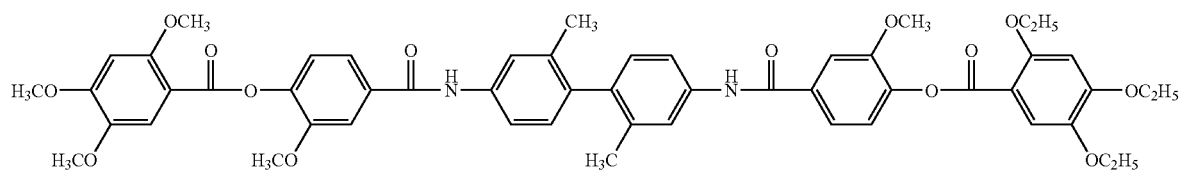

(38)

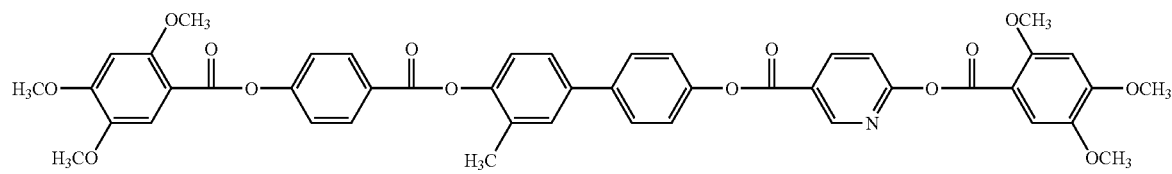

(39)

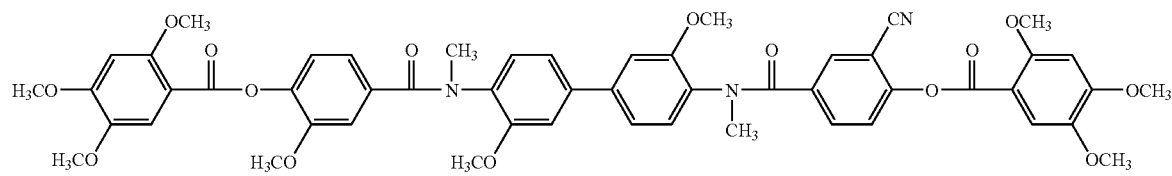

(40)

(Additive Having a Negative Intrinsic Birefringence)

In the following, an additive having a negative intrinsic birefringence to be employed in the present invention will be explained.

In the present specification, "negative intrinsic birefringent additive" is meant by such a material which has a characteristic showing an optically negative uni-axis, when the additive is oriented in a uniaxial order. For example, when this material is injected with light into a layer formed in uniaxial orientation, the material of an optical refractive index in the orientation direction becoming smaller than the optical refractive index in a direction orthogonal with the orientation direction is the negative intrinsic birefringent additive.

Especially in this invention, the additive is oriented following orientation of polymeric resin where this "negative intrinsic birefringent additive" becomes a matrix, and reveals a largest polarizable anisotropy in a direction almost orthogonal with the orientation direction. Herein, the orientation direction of the additive molecule may not strictly be in the same direction as the orientation of the polymeric resin, and it is important to have the largest polarizable anisotropy in the direction almost orthogonal with the orientation direction of polymeric chain. The orientation direction of a substituent group having large polarizable anisotropy is roughly divided into two, that is, of a case that the additive orients in a film in-plane direction as crossing with in the orientation direction of the polymeric resin and a case that the additive orients in a film thickness as crossing with in the orientation direction of the polymeric resin. In the optical film of this invention, an in-plane retardation has an inverse dispersion characteristic, and it is preferable for the retardation in the direction of a film thickness to have a regular dispersion characteristic. For this purpose, desirably, the substituent group having a large polarizable anisotropy is oriented in the film in-plane direction as crossing with the orientation direction of the polymeric resin. The orienting direction of the main polymer chain or the additive molecule can be measured by a polarized Raman spectroscopy or a polarized IR spectroscopy, and the polarization anisotropy of these substances can be measured by other methods, so that a relative relationship of the polymer chain and the additive can be easily recognized.

In the additive having a negative intrinsic birefringence to be employed in the invention, the intrinsic birefringence preferably has a large wavelength dispersion, and more specifically, it is preferably so selected that specific birefringences ($\Delta n$) at a wavelength of 450 nm ($\Delta n(450)$) and a wavelength of 550 nm ($\Delta n(550)$) satisfy a following relation:

$$|\Delta n(450)/\Delta n(550)|>1.02$$

More preferably it is so selected as to satisfy a following relation:

$$|\Delta n(450)/\Delta n(550)|>1.05$$

A value $|\Delta n(450)/\Delta n(550)|$ is preferably larger, but is generally less than 2.0 in case of a resin.

The additive may have any structure or any molecular weight as long as the above-mentioned condition is satisfied, but a compound having a high mutual solubility with the polymer resin and showing a large polarization anisotropy is preferable. Also the additive preferably has an absorption maximum within a wavelength range of 200-400 nm, more preferably having an absorption maximum within a wavelength range of 250-400 nm, and particularly preferably having an absorption maximum within a wavelength range of 300-400 nm. As specific examples of such additives, there are enumerated polystyrene, polystyrene based polymer (copolymer of styrene and/or styrene derivative and other monomer) polyacrylonitrile based polymer, polymethyl methacrylate based polymer, polycarbonate based polymer, cellulose ester based polymer, or their multi-(bipolymer, terpolymer) copolymer, styrene oligomer, benzyl methacrylate oligomer, cellulose ester based oligomer (excepting the additive having a positive intrinsic birefringent value). These substances may be used solely or in combination of more than two kinds.

As polystyrene based polymer, there are enumerated copolymer of styrene and/or styrene derivative and other monomer, and among them, desirable is copolymer with at least one kind selected from styrene and/or styrene derivative and acrylic nitrile, maleic anhydride, methyl methacrylate and butadiene In this invention, among them, desirable is at least one kind selected from polystyrene, polystyrene based polymer, polyacrylonitrile based polymer, polymethyl methacrylate based polymer, and from the viewpoint of intrinsic birefringent revealability being high, polystyrene and polystyrene based polymer are more desirable, and in a point of high heat resistance, copolymer with styrene and/or styrene derivative and maleic anhydride is especially desirable.

The additive having negative intrinsic birefringence preferably has a content of 0.1-20 mass % with respect to 100 parts by weight of the polymer resin, more preferably 1-15 mass % and further preferably 1-10 mass %.

The additive having negative intrinsic birefringence in the invention may be dissolved in an organic solvent such as an alcohol, methylene chloride or dioxolane and then added to a solution (dope) of the polymer resin, or may be directly added to the dope composition.

In the present invention, it is preferable that an absorption maximum of a longest wavelength side of the additive having positive intrinsic birefringence is positioned at a shorter wavelength than an absorption maximum of a longest wavelength side of the additive having negative intrinsic birefringence. A positive additive having the absorption maximum at a shorter wavelength shows a smaller change of refractive index with respect to wavelength, and a negative additive having the absorption maximum at a longer wavelength than in the aforementioned positive additive shows a larger change of refractive index with respect to wavelength. An optical compensation film prepared with these additives shows a larger difference of the refractive indexes in an orienting direction and in a direction perpendicular to the orientation (with respect to wavelength), thereby showing a larger change in Re with respect to wavelength. A film thus prepared can exhibit preferable characteristics of the invention that the retardation in planar direction has a substantially flat or inverse wavelength dispersion in the visible wavelength region.

In the following, an optical resin to be employed in the invention will be explained in detail.

An stretchable optical resin that can be employed in the invention is not particularly restricted and can be various transparent polymer resin, such as polycarbonate, polyester, polyvinyl chloride, cellulose acylate or a cycloolefin-type polymer. In particular, the stretchable optical resin preferably has a retardation having a substantially flat or inverse wavelength dispersion characteristics in the visible wavelength region. The optical resin having such characteristics is more preferably cellulose acylate, polycarbonate or a cycloolefin-type polymer, and the cellulose acylate is particularly preferably cellulose acetate.

(Cellulose Acylate)

A glucose unit of β-1,4 bonding, constituting cellulose, has free hydroxyl groups in 2-, 3- and 6-positions. Cellulose acylate is a polymerized substance (polymer) in which all the hydroxyl groups or a part thereof is esterified with an acyl group. An acyl substitution rate means a proportion of esterification of cellulose (100% esterification being a substitution rate 1) in each of 2-, 3- and 6-positions. A total acyl substitution rate, namely D2+D3+D6, is preferably 2.00-2.96, more preferably 2.22-2.95, and particularly preferably 2.40-2.94. Such cellulose acylate allows to prepare a solution with a preferable solubility, and to prepare a satisfactory solution particularly in a non-chlorinated organic solvent. It also allows to prepare a solution of a low viscosity, having a satisfactory filterability.

A substituent for the hydroxyl group of cellulose is preferably an acetyl group. Also an acyl group with two or more carbon atoms, substituting the hydroxyl group of cellulose, is not particularly restricted and may be an aliphatic group or an aryl group. It can for example be an alkylcarbonyl ester, an alkenylcarbonyl ester, an aromatic carbonyl ester or an aromatic alkylcarbonyl ester of cellulose, which may further have a substituent. Such preferred substituent can be, for example, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, or cinnamoyl. Among these, more preferable is propionyl, butanoyl, dodecanoyl, octadecanoyl, t-butanoyl, oleoyl, benzoyl, naphthylcarbonyl, or cinnamoyl, and particularly preferable is propionyl or butanoyl.

(Synthesizing Method for Cellulose Acylate)

A basic principle of synthesizing method for cellulose acylate is described in Nobuhiko Migita et al., *Mokuzai Kagaku*, p. 180-190 (Kyoritsu Shuppan, 1968). A representative synthesizing method is a liquid-phase acetylation utilizing carboxylic anhydride-acetic acid-sulfuric acid catalyst. More specifically, a cellulose raw material such as cotton linter or wood pulp is pre-treated with acetic acid of an appropriate amount, and is charged in a pre-cooled carboxylating solution to execute esterification, thereby synthesizing complete cellulose acylate (total of acyl substitutation rates of 2-, 3- and 6-positions being about 3.00). The carboxylating solution generally contains acetic acid as a solvent, a carboxylic anhydride as an esterifying agent, and sulfuric acid as a catalyst. The carboxylic anhydride is usually employed in a stoichiometrically excess amount with respect to a sum of cellulose to be reacted therewith and water present in the system. After the acylation reaction, an aqueous solution of a neutralizing agent (such as a carbonate salt, an acetate salt or an oxide of calcium, magnesium, iron, aluminum or zinc) in order to hydrolyze the excessive carboxylic anhydride remaining in the system and to neutralize a part of the esterifying catalyst. Then, thus obtained complete cellulose acylate is subjected to a saponifying-ripening process by maintaining at 50-90° C. in the presence of a small amount of an acetylation catalyst (generally sulfuric acid remaining in the system), thereby causing a change to cellulose acylate having an acyl substitution rate and a polymerization degree of a desired level. When desired cellulose acylate is obtained, the catalyst remaining in the system is completely neutralized with a neutralizing agent as described above, or the cellulose acylate solution is charged, without being neutralized, into water or dilute sulfuric acid (otherwise water or dilute sulfuric acid being charged in the cellulose acylate solution) to separate cellulose acylate, which is washed and subjected to a stabilization process for obtaining the cellulose acylate.

In the cellulose acylate film of the invention, a polymer component constituting the film is preferably substantially constituted of cellulose acylate meeting the aforementioned definition. "Substantially" means 55 mass % or more (preferably 70 mass % or more and more preferably 80 mass % or less) of the polymer component. A raw material for film manufacture is preferably cellulose acylate particles. The particles to be used, in 90 mass % or more, preferably have a particle size of 0.5-5 mm. Also the particles to be used, in 50 mass % or more, preferably have a particle size of 1-4 mm. The cellulose acylate particles preferably have a shape as close as possible to spherical.

The cellulose acylate preferably employed in the invention has a viscosity-average polymerization degree of 200-700, preferably 250-550, more preferably 250-400 and particularly preferably 250-350. The average polymerization degree can be measured by a limiting viscosity method (Kazuo Uda and Hideo Saito, Journal of the Society of Fiber Science and Technology, vol. 18, No. 1, p. 105-120, 1962). It is also detailedly described in JP-A-9-95538.

An elimination of low-molecular components is useful, as the viscosity becomes lower than in ordinary cellulose acylate, though the average molecular weight (polymerization degree) increases. Cellulose acylate with reduced low-molecular components can be obtained by removing low-molecular components from cellulose acylate synthesized in an ordinary method. The removal of the low-molecular components can be achieved by washing cellulose acylate with a suitable organic solvent. In case of producing cellulose acylate with reduced low-molecular components, an amount of the sulfuric acid catalyst in the acetylation is preferably regulated to 0.5-25 parts by mass with respect to 100 parts by mass of cellulose. The sulfuric acid catalyst employed within such range allows to synthesize cellulose acylate preferable also in the molecular weight distribution (with uniform molecular weight distribution). In the preparation of cellulose acylate of the invention, it preferably has a water content of 2 mass % or less, more preferably 1 mass % or less and particularly preferably 0.7 mass % or less. In general, cellulose acylate is known to contain water with a content of 2.5-5 mass %. A drying is necessary for attaining the water content of cellulose acylate of the invention, and the drying method is not particularly restricted as long as the desired water content can be attained.

With respect to the cellulose acylate to be employed in the invention, a raw material cotton and a synthesizing method thereof are described in detail in Journal of Technical Disclosure, Japan Institute of Invention and Innovation (Technical Disclosure No. 2001-1745, Mar. 15, 2001, JIII), pages 7-12.

(Manufacture of Optical Resin Film)

An optical resin film of the invention is produced by a solvent casting method. In the solvent casting method, the film is produced by using a solution (dope) having an optical resin dissolved in an organic solvent.

The organic solvent preferably includes a solvent selected from an ether having from 3 to 12 carbon atoms, a ketone having from 3 to 12 carbon atoms, an ester having from 3 to 12 carbon atoms, and a halogenated hydrocarbon having from 1 to 6 carbon atoms.

The ether, the ketone and the ester may each have a cyclic structure. A compound containing any two or more of functional groups of the ether, the ketone and the ester (that is, —O—, —CO—, and —COO—) can also be used as the organic solvent. The organic solvent may contain other functional group such as an alcoholic hydroxyl group. In the case of an organic solvent containing two or more kinds of functional groups, it is preferable that the number of carbon atom thereof falls within the foregoing preferred range of the number of carbon atom of the solvent containing any functional group.

Examples of the ether having from 3 to 12 carbon atoms include diisopropyl ether, dimethoxymethane, dimethoxyethane, 1,4-dioxane, 1,3-dioxolan, tetrahydrofuran, anisole, and phenetole.

Examples of the ketone having from 3 to 12 carbon atoms include acetone, methyl ethyl ketone, diethyl ketone, diisobutyl ketone, cyclohexanone, and methylcyclohexanone.

Examples of the ester having from 3 to 12 carbon atoms include ethyl formate, propyl formate, pentyl formate, methyl acetate, ethyl acetate, and pentyl acetate.

Examples of the organic solvent containing two or more kinds of functional groups include 2-ethoxyethyl acetate, 2-methoxyethanol, and 2-butoxyethanol.

The number of carbon atom of the halogenated hydrocarbon is preferably 1 or 2, and most preferably 1. The halogen of the halogenated hydrocarbon is preferably chlorine. A proportion of the hydrogen atom of the halogenated hydrocarbon as substituted with the halogen is preferably from 25 to 75% by mole, more preferably from 30 to 70% by mole, further preferably from 35 to 65% by mole, and most preferably from 40 to 60% by mole. Methylene chloride is a representative halogenated hydrocarbon.

As the organic solvent of the invention, the use of a mixture of methylene chloride with an alcohol is preferable. A rate of methylene chloride to the alcohol is preferably from 1% by weight to 50% by weight, more preferably from 10% by weight to 40% by weight, and most preferably from 12% by weight to 30% by weight. As the alcohol, methanol, ethanol, and n-butanol are preferable, and a mixture of two or more kinds of alcohols may be used.

The cellulose acylate solution can be prepared by a general method including the treatment at a temperature of 0° C. or higher (normal temperature or high temperature). The preparation of the solution can be carried out by using a preparation method of a dope and a device in the usual solvent casting method. Incidentally, in the case of the general method, it is preferred to use a halogenated hydrocarbon (in particular, methylene chloride) as the organic solvent.

The amount of the cellulose acylate is preferably adjusted such that it is contained in an amount of from 10 to 40% by weight in the resulting solution. The amount of the cellulose acylate is more preferably from 10 to 30% by weight. An arbitrary additive as described later may be added in the organic solvent (prime solvent).

The solution can be prepared by stirring the cellulose acylate and the organic solvent at the normal temperature (from 0 to 40° C.). The solution with high concentration may be stirred under a pressurizing and heating condition. Concretely, the cellulose acylate and the organic solvent are charged in a pressure vessel, and after closing the vessel, the mixture is stirred under a pressure while heating at a temperature in the range of from the boiling point of the solvent at the normal temperature to a temperature at which the solvent is not boiled.

The heating temperature is usually 40° C. or higher, preferably from 60 to 200° C., and more preferably from 80 to 110° C.

The respective components may be previously roughly mixed and then charged in the vessel.

Also, they may be successively charged in the vessel. The vessel must be constructed such that stirring can be achieved. The vessel can be pressurized by injecting an inert gas such as a nitrogen gas. Furthermore, an increase of the vapor pressure of the solvent due to heating may be utilized. Alternatively, after closing the vessel, the respective components may be added under a pressure.

In the case of heating, it is preferable that the heating is carried out from the outside of the vessel. For example, a jacket type heating device can be employed. Furthermore, the whole of the vessel can be heated by providing a plate heater in the outside of the vessel, piping and circulating a liquid.

It is preferred to provide a stirring blade in the inside of the vessel and perform stirring using it. As the stirring blade, one having a length such that it reaches the vicinity of the wall of the vessel is preferable. It is preferred to provide a scraping blade for renewing a liquid film on the wall of the vessel.

The vessel may be equipped with a measuring instrument such as a pressure gauge and a thermometer. The respective components are dissolved in the solvent within the vessel. A prepared dope is cooled and then taken out from the vessel, or is taken out from the vessel and then cooled by using a heat exchanger, etc.

The solution can also be prepared by a dissolution method under cooling. According to the dissolution method under cooling, it is possible to dissolve the cellulose acylate even in an organic solvent capable of hardly dissolving the cellulose acylate therein by a usual dissolution method. Incidentally, the dissolution method under cooling has an effect for rapidly obtaining a uniform solution even by using a solvent capable of dissolving the cellulose acylate therein by a usual dissolution method.

In the dissolution method under cooling, first of all, the cellulose acylate is added in an organic solvent at room temperature while stirring step by step. It is preferred to adjust the amount of the cellulose acylate such that the cellulose acylate is contained in an amount of from 10 to 40% by weight in this mixture. The amount of the cellulose acylate is more preferably from 10 to 30% by weight. In addition, an arbitrary additive as described later may be added in the mixture.

Next, the mixture is cooled to from $-100$ to $-10°$ C. (preferably from $-80$ to $-10°$ C., more preferably from $-50$ to $-20°$ C., and most preferably from $-50$ to $-30°$ C.). The cooling can be carried out in, for example, a dry ice-methanol bath (at $-75°$ C.) or a cooled diethylene glycol solution (at from $-30$ to $-20°$ C.). The mixture of the cellulose acylate and the organic solvent is solidified by cooling.

The cooling rate is preferably $4°$ C./min or more, more preferably $8°$ C./min or more, and most preferably $12°$ C./min or more. It is preferable that the cooling rate is fast as far as possible. However, $10,000°$ C./sec is a theoretical upper limit, $1,000°$ C./sec is a technical upper limit, and $100°$ C./sec is an upper limit for practical use. Incidentally, the cooling rate is a value obtained by dividing a difference between the temperature at the time of start of cooling and the final cooling temperature by a time for reaching the final cooling temperature from the start of cooling.

In addition, when the solid is heated to from 0 to $200°$ C. (preferably from 0 to $150°$ C., more preferably from 0 to $120°$ C., and most preferably from 0 to $50°$ C.), the cellulose acylate is dissolved in the organic solvent. The temperature elevation may be achieved by allowing it to stand at room temperature or by heating in a warm bath.

The heating rate is preferably $4°$ C./min or more, more preferably $8°$ C./min or more, and most preferably $12°$ C./min or more. It is preferable that the heating rate is fast as far as possible. However, $10,000°$ C./sec is a theoretical upper limit, $1,000°$ C./sec is a technical upper limit, and $100°$ C./sec is an upper limit for practical use. Incidentally, the heating rate is a value obtained by dividing a difference between the temperature at the time of start of heating and the final heating temperature by a time for reaching the final heating temperature from the start of heating.

In this way, a uniform solution is obtained. Incidentally, in the case where dissolution is insufficient, the cooling or heating operation may be repeated. Whether or not the dissolution is sufficient can be judged only by visually observing the appearance of the solution.

In the dissolution method under cooling, in order to avoid incorporation of water due to dew condensation at the time of cooling, it is desired to use a closed vessel. Furthermore, in the cooling or heating operation, when pressurization is carried out at the time of cooling or pressure reduction is carried out at the time of heating, the dissolution time can be shortened. In carrying out the pressurization or pressure reduction, it is desired to use a pressure vessel.

Incidentally, in a 20% by weight solution of cellulose acetate (degree of acetylation: 60.9%, viscosity average polymerization degree: 299) dissolved in methyl acetate by the dissolution method under cooling, according to the measurement by a differential scanning calorimeter (DSC), a pseudo phase transition temperature between a sol state and a gel state is present in the vicinity of $33°$ C., and the solution becomes in a uniform gel state at a temperature of not higher than this temperature. Accordingly, this solution must be kept at a temperature of the pseudo phase transition temperature or higher, and preferably at a temperature of (gel phase transition temperature) plus about $10°$ C. However, this pseudo phase transition temperature varies depending upon the degree of acetylation, viscosity average polymerization degree and solution concentration of cellulose acetate and the organic solvent as used.

A cellulose acylate film is produced from the prepared cellulose acylate solution (dope) by the solvent casting method. It is preferred to add the retardation raising agent in the dope.

The dope is cast on a drum or band, and the solvent is vaporized to form the film. It is preferred to adjust the concentration of the dope before casting such that the solids content is from 18 to 35%. It is preferred to finish the surface of the drum or band in a mirror state. It is preferred to cast the dope on a drum or band at a surface temperature of not higher than $10°$ C.

A drying method in the solvent casting method is described in U.S. Pat. Nos. 2,336,310, 2,367,603, 2,492,078, 2,492,977, 2,492,978, 2,607,704, 2,739,069 and 2,739,070, U.K. Patents Nos. 640,731 and 736,892, JP-B-45-4554, JP-B-49-5614, JP-A-60-176834, JP-A-60-203430, and JP-A-62-115035. Drying on the band or drum can be carried out by blowing air or an inert gas such as nitrogen.

The resulting film is peeled (stripped off) from the drum or band and dried by high-temperature air whose temperature is changed successively from $100°$ C. to $160°$ C., whereby the residual solvent can be vaporized. Such a method is described in JP-B-5-17844. According to this method, the time from casting until peeling can be shortened. In order to carry out this method, the dope must be gelled at the surface temperature of the drum or band at the time of casting.

At the peeling, a ratio of methylene chloride and alcohol in the residual solvent is preferably 15 to 90%, more preferably 25 to 85%, and most preferably 35 to 80%.

Using the prepared cellulose acylate solution (dope), two or more layers are cast, whereby a film can be formed. In this case, it is preferred to prepare the cellulose acylate film by the solvent casting method. The dope is cast on a drum or bad, and the solvent is vaporized to form a film. It is preferred to adjust the concentration of the dope before casting such that the solids content falls within the range of from 10 to 40%. It is preferred to finish the surface of the drum or band in a mirror state.

In the case of casting plural cellulose acylate solutions of two or more layers, a film may be prepared by casting solutions containing a cellulose acylate respectively from plural casting nozzles capable of casting plural cellulose acylate solutions and provided at intervals in the advancing direction of a support while laminating. For example, methods as described in JP-A-61-158414, JP-A-1-122419, and JP-A-11-198285 can be employed. Furthermore, a film can be formed by casting cellulose acylate solutions from two casting nozzles. For example, methods as described in JP-B-60-27562, JP-A-61-94724, JP-A-61-947245, JP-A-61-104813, JP-A-61-158413, and JP-A-6-134933 can be employed. A casting method of a cellulose acylate film by encompassing a flow of a high-viscosity cellulose acylate solution by a low-viscosity cellulose acylate solution and simultaneously extruding the high-viscosity and low-viscosity cellulose acylate solutions, as described in JP-A-56-162617, can be employed.

Furthermore, a film can be prepared by a method in which by using two casting nozzles, a film as molded on a support from a first casting nozzle is stripped off and second casting is carried out in the side coming into contact with the support surface. For example, a method as described in JP-B-44-20235 is enumerated.

As the cellulose acylate solutions to be cast, the same solution may be used, or different cellulose acylate solutions may be used. For bringing functions to the plural cellulose acylate layers, the cellulose acylate solutions each adaptive with the function may be extruded from the respective casting nozzles. In addition, the cellulose acylate solutions of the invention can be cast at the same time with other functional layers (for example, an adhesive layer, a dye layer, an antistatic layer, an antihalation layer, an ultraviolet absorbing layer, and a polarizing layer).

According a conventional single-layered solution, it is necessary to extrude a high-viscosity cellulose acylate solution in a high concentration for the purpose of attaining a necessary film thickness. In that case, there often occurred a problem that solids are generated due to poor stability of the cellulose acylate solution, thereby causing spitting or failure of flatness. As a method for overcoming this problem, by casting plural cellulose acylate solutions from casting nozzles, high-viscosity solutions can be simultaneously extruded on the support, and the flatness becomes improved so that a planar film can be prepared. Also, by using the concentrated cellulose acylate solutions, a reduction of drying load can be achieved, and the production speed of a film can be enhanced.

(Stretching Process)

In the cellulose acylate film of the invention, a retardation can be regulated by a stretching process. There is also known a method of stretching the film in a transversal direction, as described in JP-A Nos. 62-115035, 4-152125, 4-284211, 4-298310 and 11-48271. In this method, a produced film is stretched for increasing the retardation in planar direction of the cellulose acylate film.

The stretch-orienting process of film is executed at the normal temperature or under heating. A heating temperature is preferably equal to or lower than a glass transition temperature of the film. The stretching of the film may be a monoaxial stretching in the longitudinal or transversal direction only, or a simultaneous or successive biaxial stretching. The orientation is executed by a sketching of 1 to 200%, preferably 1 to 100% and particularly preferably 1 to 50%. The birefringence of an optical film is preferably such that the refractive index is larger in the transversal direction than in the longitudinal direction. It is therefore preferable to stretch the film larger in the transversal direction. The stretching process may be executed in the course of a film forming process or may be applied to a base film, which is wound after film formation. In the former case, the stretching process may be executed in a state containing a residual solvent, and may be executed advantageously with a residual solvent amount of 2 to 40%.

In order to improve mechanical physical properties, the following plasticizer can be used in the cellulose acylate film. As the plasticizer, a phosphoric acid ester or a carboxylic acid ester is used. Examples of the phosphoric acid ester include triphenyl phosphate (TPP) and tricresyl phosphate (TCP). As the carboxylic acid ester, a phthalic acid ester and a citric acid ester are representative. Examples of the phthalic acid ester include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citric acid ester include triethyl o-acetylcitrate (OACTE) and tributyl o-acetylcitrate (OACTB). Examples of other carboxylic acid esters include butyl oleate, methylacetyl licinolate, dibutyl sebacate, and a varierty of trimellitic acid esters. A phthalic acid ester based plasticizer (for example, DMP, DEP, DBP, DOP, DPP, and DEHP) is preferably used. DEP and DPP are especially preferable.

The amount of addition of the plasticizer is preferably from 0.1 to 25% by weight, more preferably from 1 to 20% by weight, and most preferably from 3 to 15% by weight of the amount of the cellulose acetate.

Furthermore, a degradation preventing agent (for example, an antioxidant, a peroxide decomposing agent, a radical inhibitor, a metal inactivating agent, an acid scavenger, and an amine) may be added in the cellulose acylate film. The degradation preventing agent is described in JP-A-3-199201, JP-A-5-197073, JP-A-5-194789, JP-A-5-271471, and JP-A-6-107854. The amount of addition of the degradation preventing agent is preferably from 0.01 to 1% by weight, and more preferably from 0.01 to 0.2% by weight of the solution (dope) as prepared. When the addition amount is less than 0.01% by weight, an effect of the degradation preventing agent is not substantially noticed. When the addition amount exceeds 1% by weight, bleedout of the degradation preventing agent onto the film surface may possibly be noticed. Especially preferred examples of the degradation preventing agent include butylated hydroxytoluene (BHT) and tribenzylamine (TBA).

(Matting Agent Fine Particle)

It is preferable that a fine particle is added as a matting agent in the cellulose acylate film of the invention. Examples of the fine particle which can be used in the invention include silicon dioxide, titanium dioxide, aluminum oxide, zirconium oxide, calcium carbonate, calcium carbonate, talc, clay, calcined kaolin, calcined calcium silicate, hydrated calcium silicate, aluminum silicate, magnesium silicate, and calcium phosphate. Of these fine particles, ones containing silicon are preferable because the turbidity is low, and silicon dioxide is especially preferable. The fine particle of silicon dioxide preferably has an average primary particle size of from 20 nm or less and an apparent specific gravity of 70 g/liter or more. One having a small average primary particle size as from 5 to 16 nm is more preferable because it can reduce the haze. The apparent specific gravity is preferably from 90 to 200 g/liter, and more preferably from 100 to 200 g/liter. When the apparent specific gravity is large, it becomes possible to prepare a dispersion with high concentration, and the haze and aggregation are improved, and therefore, such is preferable.

Such a fine particle usually forms a secondary particle having an average particle of from 0.1 to 3.0 μm and is present as an aggregate in the film, thereby forming irregularities of from 0.1 to 3.0 μm on the film surface. The average secondary particle size is from 0.2 μm to 1.5 μm, more preferably from 0.4 μm to 1.2 μm, and most preferably from 0.6 μm to 1.1 μm. With respect to the primary or secondary particle size, particles in the film were observed by a scanning electron microscope, and a diameter of a circle which is circumscribed on the particle was defined as the particle size. Furthermore, 200 parts are observed by changing the place, and an average value thereof is defined as the average particle size.

The silicon dioxide particles can be those commercially available, such as Aerosil R972, R972V, R974, R812, 200, 200V, 300, R202, OX50, or TT600 (trade names of Nippon Aerosil Co.). Also zirconium oxide particles are usable in commercially available product such as Aerosil R976 or R811 (trade names of Nippon Aerosil Co.).

Among these, Aerosil 200V or Aerosil R972V is particularly preferable, as it is silicon dioxide particles having a primary average particle size of 200 nm or less and an apparent specific gravity of 70 g/L or higher, and having a strong effect of reducing the frictional coefficient while maintaining a low turbidity in the optical film.

In the invention, in order to obtain a cellulose acylate film having particles of a small secondary average particle size, certain methods are conceivable in preparing a dispersion of fine particles. For example, a method is based on preparing a particle dispersion in advance by mixing a solvent and particles under agitation, then dissolving this particle dispersion under agitation in a cellulose acylate solution of a small amount prepared separately, and mixing it with a main cellulose acylate dope. This preparation method is preferable in satisfactory dispersibility of the silicon dioxide particles and in that the silicon dioxide particles do not easily re-agglomerate. Another method is based on adding and dissolving a small amount of cellulose ester under agitation in a solvent, then adding and dispersing fine particles therein in a disperser to obtain a particle-containing liquid, which is then sufficiently mixed with the dope in an in-line mixer. The invention is not limited to these methods, but a concentration of the silicon dioxide, in dispersing the silicon dioxide particles in a solvent or the like, is preferably 5-30 mass %, more preferably 10-25 mass % and most preferably 15-20 mass %. A higher concentration of dispersion is preferable as it lowers the turbidity of liquid with respect to the amount of addition, thereby reducing a haze and agglomerates.

An amount of the matting agent in the final cellulose acylate dope is preferably 0.01-1.0 g/m², more preferably 0.03-0.3 g/m², and most preferably 0.08-0.16 g/m².

A solvent to be employed can be a lower alcohol, preferably methyl alcohol, ethyl alcohol, propyl alcohol, isopropyl alcohol or butyl alcohol. Other solvents than the lower alcohol are not particularly restricted, but a solvent employed in the preparation of cellulose ester film is employed preferably.

A winder to be employed in the manufacture of the cellulose acylate film to be used in the invention can be an ordinarily employed winding machine, and the winding can be executed for example by a constant-tension winding, a constant-torque winding, a tapered-tension winding, or a winding under a programmed tension control with a constant internal stress.

(Glass Transition Temperature of Cellulose Acylate Film)

A glass transition temperature of cellulose acylate film can be measured by a method described in JIS K7121.

The cellulose acylate film of the invention preferably has a glass transition temperature of 80 to 200° C., more preferably 100 to 170° C. The glass transition temperature can be lowered by including a low-molecular compound such as a plasticizer, or a solvent.

(Film Thickness)

The cellulose acylate film of the invention preferably has a thickness (dry film thickness) of 40 to 110 μm, more preferably 50 to 100 μm.

<Cycloolefin-Type Polymer Film>

In the following, a cycloolefin-type polymer to be employed in the protective film for the polarizing plate of the invention will be explained in detail.

(Cycloolefin-Type Addition Polymer)

A cycloolefin-type polymer to be employed in the protective film for the polarizing plate of the invention is preferably a cycloolefin-type addition polymer, containing a structural unit (a) represented by a following formula (1) and a structural unit (b) represented by a following formula (2) in an appropriate ratio:

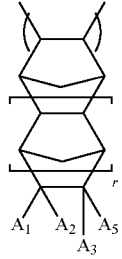

Formula (1)

(wherein, in the formula (1), $A_1$, $A_2$, $A_3$ and $A_4$ each independently represent a hydrogen atom, an alkyl group with 1-10 carbon atoms, an aryl group, a cycloalkyl group with 4-15 carbon atoms or a halogen atom; $A_1$-$A_4$ also include an alkylene group formed by $A_1$ and $A_2$, $A_1$ and $A_3$, or $A_2$ and $A_4$; and r represents an integer of 0-2).

Such structural unit (a) is formed by an addition polymerization of a cycloolefin compound represented by a following formula (2) (hereinafter called "specified monomer (1)":

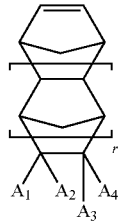

Formula (2)

(wherein, in the formula (2), $A_1$, $A_2$, $A_3$ and $A_4$ each independently represent a hydrogen atom, an alkyl group with 1-10 carbon atoms, an aryl group, a cycloalkyl group with 4-15 carbon atoms or a halogen atom; $A_1$-$A_4$ also include an alkylene group or an alkylidene group formed by $A_1$ and $A_2$, $A_1$ and $A_3$, or $A_2$ and $A_4$; and r represents an integer of 0-2).

Specific examples of the "specific monomer (1)" represented by the formula (2) include bicyclo[2.2.1]hepto-2-ene, 5-methyl-bicyclo[2.2.1]hepto-2-ene, 5-ethyl-bicyclo[2.2.1]hepto-2-ene, 5-propyl-bicyclo[2.2.1]hepto-2-ene, 5-butyl-bicyclo[2.2.1]hepto-2-ene, 5-pentyl-bicyclo[2.2.1]hepto-2-ene, 5-hexyl-bicyclo[2.2.1]hepto-2-ene, 5-heptyl-bicyclo[2.2.1]hepto-2-ene, 5-octyl-bicyclo[2.2.1]hepto-2-ene, 5-decyl-bicyclo[2.2.1]hepto-2-ene, 5-dodecyl-bicyclo[2.2.1] hepto-2-ene, 5,6-dimethyl-bicyclo[2.2.1]hepto-2-ene, 5-methyl-5-ethyl-bicyclo[2.2.1]hepto-2-ene, 5-phenyl-bicyclo [2.2.1]hepto-2-ene, 5-cyclohexyl-bicyclo[2.2.1]hepto-2-ene, 5-cyclooctyl-bicyclo[2.2.1]hepto-2-ene, 5-fluoro-bicyclo [2.2.1]hepto-2-ene, 5-chloro-bicyclo[2.2.1]hepto-2-ene, tricyclo[4.2.0.15,8]non-2-ene, 1-methyl-tricyclo[4.2.0.15,8] non-2-ene, 6-methyl-tricyclo[4.2.0.15,8]non-2-ene, tricyclo [5.2.1.02,6]dec-8-ene, 3-methyl-tricyclo[5.2.1.02,6]dec-8-ene, 4-methyl-tricyclo[5.2.1.02,6]dec-8-ene, tricyclo [6.2.1.02,7]undec-9-ene, 1-methyl-tricyclo[6.2.1.02,7] undec-9-ene, 3-methyl-tricyclo[6.2.1.02,7]undec-9-ene, 1-ethyl-tricyclo[6.2.1.02,7]undec-9-ene, 3-ethyl-tricyclo [6.2.1.02,7]undec-9-ene, tricyclo[8.2.1.02,9]tridec-11-ene, 1-methyl-tricyclo[8.2.1.02,9]tridec-11-ene, 5-methyl-tricyclo[8.2.1.02,9]tridec-11-ene, tetracyclo[4.4.0.12,5.17,10] dodec-3-ene, 8-methyl-tetracyclo[4.4.0.12,5.17,10]dodec-3-ene, and 8-ethyl-tetracyclo[4.4.0.12,5.17,10]dodec-3-ene.

The structural unit (a) can also be obtained by an addition polymerization of a cyclic diolefin compound such as 5-vinyl-bicyclo[2.2.1]hept-2-ene, 5-(1-butenyl)-bicyclo[2.2.1] hept-2-ene, tricyclo[5.2.1.02,6]deca-3,8-diene, 1-methyl-tricyclo[5.2.1.02,6]deca-3,8-diene, or 1-ethyl-tricyclo [5.2.1.02,6]deca-3,8-diene, and then hydrogenating a cycloolefinic unsaturated bond present in a side chain.

Among such "specified monomers (1)", bicyclo[2.2.1] hept-2-ene or tricyclo[5.2.1.02,6]dec-8-ene is preferred. Tricyclo[5.2.1.02,6]dec-8-ene is present in an endo structure and an exo structure as steric isomers, and, in the invention, the endo structure is preferable because of a higher tenacity in the finally obtained film, and tricyclo[5.2.1.02,6]dec-8-ene is preferably used with an endo structure content of 80% or higher. Similarly preferable is a method of addition polymerizing tricyclo[5.2.1.02,6]dec-8-ene of endo structure and then hydrogenating the cycloolefinic unsaturated bond remaining in the side chain. Also in this case, the content of endo structure is preferably 80% or higher. A cycloolefinic polymer obtained with such materials is excellent not only in transparency and heat resistance, but shows a low water absorption, a low dielectric property and a high tenacity. The "specified monomer (1)" may be employed singly or in two or more kinds.

The structural unit (b) represented by a following formula (3) can be formed by an addition polymerization of a cycyloolefin represented by a following formula (4) (hereinafter called "specified monomer (2)").

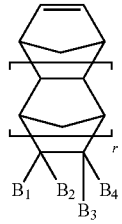

Formula (3)

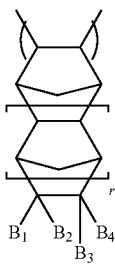

(wherein, in the formula (3), $B_1$-$B_4$ each independently represent a hydrogen atom, an alkyl group, a cycloalkyl group, an aryl group, a halogenated alkyl group, a hydrolysable silyl group or a polar group represented by —$(CH_2)_j$X, and at least one of $B_1$-$B_4$ includes a hydrolysable silyl group or a polar group represented by —$(CH_2)_j$X, in which X represents —C(O)OR$^1$ or —OC(O)R$^2$; R$^1$ and R$^2$ each represents a substituent selected from an alkyl group with 1-10 carbon atoms, an alkenyl group, a cycloalkyl group, an aryl group or a halogen-substituted member thereof; j represents an integer of 0-3; $B_1$-$B_4$ also include an alkylene group formed by $B_1$ and $B_3$ or $B_2$ and $B_4$, and an alkylidenyl group formed by $B_1$ and $B_2$ or $B_3$ and $B_4$; and p represents an integer of 0-2).

Formula (4)

(wherein $B_1$-$B_4$ have same meanings as in the formula (3); and p represents an integer of 0-2).

Specific examples of the "specified monomer (2)" include following compounds, but the invention is not limited to these specific examples:

5-methoxycarbonyl-bicyclo[2.2.1]hept-2-ene, 5-ethoxycarbonyl-bicyclo[2.2.1]hept-2-ene, 5-butoxycarbonyl-bicyclo [2.2.1]hept-2-ene, 5-methyl-5-methoxycarbonyl-bicyclo [2.2.1]hept-2-ene, 5-methyl-5-ethoxycarbonyl-bicyclo [2.2.1]hept-2-ene, 5-methyl-5-propoxycarbonyl-bicyclo [2.2.1]hept-2-ene, 5-methyl-5-butoxycarbonyl-bicyclo [2.2.1]hept-2-ene, 5-ethyl-5-methoxycarbonyl-bicyclo [2.2.1]hept-2-ene, 5-methyl-5-trifluoromethoxycarbonyl-bicyclo[2.2.1]hept-2-ene, ethyl 5-methyl-bicyclo[2.2.1]hept-2-en-5-ylmethylcarboxylate, 1-methyl-bicyclo[2.2.1]hept-3-ene acrylate, 1-methyl-bicyclo[2.2.1]hept-3-ene methacrylate, 5,6-di(methoxycarbonyl)-bicyclo[2.2.1]hept-2-ene, 8-methyl-8-methoxycarbonyl-tetracyclo[4.4.0.12, 5.17,10]dodec-3-ene, 8-methyl-8-ethoxycarbonyl-tetracyclo [4.4.0.12,5.17,10]dodec-3-ene, 5-trimethoxysilyl-bicyclo [2.2.1]hept-2-ene, 5-dimethoxychlorosilyl-bicyclo[2.2.1] hept-2-ene, 5-methoxychloromethylsilyl-bicyclo[2.2.1] hept-2-ene, 5-dimethoxychlorosilyl-bicyclo[2.2.1]hept-2-ene, 5-methoxyhydridemethylsilyl-bicyclo[2.2.1]hept-2-ene, 5-dimethoxyhydridesilyl-bicyclo[2.2.1]hept-2-ene, 5-methoxydimethylsilyl-bicyclo[2.2.1]hept-2-ene, 5-triethoxysilyl-bicyclo[2.2.1]hept-2-ene, 5-diethoxychlorosilyl-bicyclo[2.2.1]hept-2-ene, 5-ethoxychloromethylsilyl-bicyclo[2.2.1]hept-2-ene, 5-diethoxyhydridesilyl-bicyclo[2.2.1] hept-2-ene, 5-ethoxydimethylsilyl-bicyclo[2.2.1]hept-2-ene, 5-ethoxydiethylsilyl-bicyclo[2.2.1]hept-2-ene, 5-propoxydimethylsilyl-bicyclo[2.2.1]hept-2-ene, 5-tripropoxysilyl-bicyclo[2.2.1]hept-2-ene, 5-triphenoxysilyl-bicyclo[2.2.1] hept-2-ene, 5-trimethoxysilylmethyl-bicyclo[2.2.1]hept-2-ene, 5-dimethylchlorosilyl-bicyclo[2.2.1]hept-2-ene, 5-methyldichlorosilyl-bicyclo[2.2.1]hept-2-ene, 5-trichlorosilyl-bicyclo[2.2.1]hept-2-ene, 5-diethylchlorosilyl-bicyclo[2.2.1]hept-2-ene, 5-ethyldichlorosilyl-bicyclo[2.2.1] hept-2-ene, 5-(2-trimethoxysilyl)ethyl-bicyclo[2.2.1]hept-2-ene, 5-(2-dimethoxyclilorosilyl)ethyl-bicyclo[2.2.1]hept-2-ene, 5-(1-trimethoxysilyl)ethyl-bicyclo[2.2.1]hept-2-ene, 5-(2-trimethoxysilyl)propyl-bicyclo[2.2.1]hept-2-ene, 5-(1-trimethoxysilyl)propyl-bicyclo[2.2.1]hept-2-ene, 5-triethoxysilylethyl-bicyclo[2.2.1]hept-2-ene, 5-dimethoxymethylsilylmethyl-bicyclo[2.2.1]hept-2-ene, 5-trimethoxypropylsilyl-bicyclo[2.2.1]hept-2-ene, 5-methyl-5-(3-triethoxysilyl)propoxycarbonyl-bicyclo[2.2.1] hept-2-ene, 8-ethoxysilyl-tetracyclo[4.4.0.12,5.17,10]

dodec-3-ene, 8-methyldimethoxysilyl-tetracyclo[4.4.0.12, 5.17,10]dodec-3-ene, 5-[1'-methyl-2',5'-dioxa-1'-silacyclopentyl]-bicyclo[2.2.1]hept-2-ene, 5-[1'-methyl-3',3',4',4'-tetraphenyl-2',5'-dioxa-1'-silacyclopentyl]-bicyclo[2.2.1]hept-2-ene, 5-[1'-methyl-3',3',4',4'-tetramethyl-2',5'-dioxa-1'-silacyclopentyl]-bicyclo[2.2.1]hept-2-ene, 5-[1'-phenyl-2',5'-dioxa-1'-silacyclopentyl]-bicyclo[2.2.1]hept-2-ene, 5-[1'-ethyl-2',5'-dioxa-1'-silacyclopentyl]-bicyclo[2.2.1]hept-2-ene, 5-[1',3'-dimethyl-2',5'-dioxa-1'-silacyclopentyl]-bicyclo[2.2.1]hept-2-ene, 5-[1'-methyl-3',4'-dimethyl-2',5'-dioxa-1'-silacyclopentyl]-bicyclo[2.2.1]hept-2-ene, 5-[1'-methyl-2',6'-dioxa-1'-silacyclohexyl]-bicyclo[2.2.1]hept-2-ene, 5-[1'-ethyl-2',6'-dioxa-1'-silacyclohexyl]-bicyclo[2.2.1]hept-2-ene, 5-[1',3'-dimethyl-2',6'-dioxa-1'-silacyclohexyl]-bicyclo[2.2.1]hept-2-ene, 5-[1'-methyl-4',4'-dimethyl-2',6'-dioxa-1'-silacyclohexyl]-bicyclo[2.2.1]hept-2-ene, 5-[1'-methyl-4',4'-dimethyl-2',6'-dioxa-1'-silacyclohexyl]methyl-bicyclo[2.2.1]hept-2-ene, 5-[1'-methyl-4',4'-dimethyl-2',6'-dioxa-1'-silacyclohexyl]ethyl-bicyclo[2.2.1]hept-2-ene, 5-[1'-phenyl-4',4'-dimethyl-2',6'-dioxa-1'-silacyclohexyl]-bicyclo[2.2.1]hept-2-ene, 5-[1'-methyl-4'-phenyl-2',6'-dioxa-1'-silacyclohexyl]methyl-bicyclo[2.2.1]hept-2-ene, 5-[1'-methyl-4'-spiro-cyclohexyl-2',6'-dioxa-1'-silacyclohexyl]methyl-bicyclo[2.2.1]hept-2-ene, 5-[1'-methyl-4'-ethyl-4'-butyl-2',6'-dioxa-1'-silacyclohexyl]methyl-bicyclo[2.2.1]hept-2-ene, 5-[1'-methyl-3',3'-dimethyl-5'-methylene-2',6'-dioxa-1'-silacyclohexyl]-bicyclo[2.2.1]hept-2-ene, 5-[1'-phenyl-2',6'-dioxa-1'-silacyclohexyl]-bicyclo[2.2.1]hept-2-ene, 5-[1'-methyl-3'-phenyl-2',6'-dioxa-1'-silacyclohexyl]-bicyclo[2.2.1]hept-2-ene, 5-[1'-methyl-4',4'-dimethyl-2',6'-dioxa-1'-silacyclohexyl]-7-oxa-bicyclo[2.2.1]hept-2-ene, 5-[1'-methyl-2',6'-dioxa-1'-silacyclohexyl]-7-oxa-bicyclo[2.2.1]hept-2-ene, 5-[1'-methyl-2',7'-dioxa-1'-silacycloheptyl]-bicyclo[2.2.1]hept-2-ene, 8-[1'-methyl-4',4'-dimethyl-2',6'-dioxa-1'-silacyclohexyl]-tetracyclo[4.4.0.12,5.17,10]dodec-3-ene, 8-[1'-methyl-2',6'-dioxa-1'-silacyclohexyl]-tetracyclo[4.4.0.12,5.17,10]dodec-3-ene, and 8-methyl-8-carboxymethyl-9-carboxymethyl-tetracyclo[4.4.0.12,5.17,10]dodec-3-ene. Such "specified monomer (2)" may be employed singly or in a combination of two or more kinds.

In the cycloolefin-type polymer of the invention, the structural unit (b) represents a proportion of 5-95 mol. % in the entire structural units, preferably 10-90 mol. % and more preferably 20-80 mol. %. An excessively small proportion of the structural unit (b) in the cycloolefin-type polymer may result in an inferior adhesion/contact with polyvinyl alcohol employed in the polarizer. On the other hand, an excessively large proportion increases hygroscopicity, thereby deteriorating the dimensional stability. The structural unit (b) may be present in any arrangement in the cycloolefin-type polymer such as a random arrangement or a block arrangement, but is preferably in a random arrangement. Also a cycloolefin-type addition polymer, containing a structural unit (b) having a reactive substituent such as a hydrolysable silyl group, an ester group, an acryloyl group or a methacryloyl group as a side-chain substituent, allows to provide, by a crosslinking agent to be explained later, a film of the cycloolefin-type polymer of the invention in a crosslinked state.

In the cycloolefin-type polymer of the invention, there can be further introduced a structural unit (c) obtained by an addition polymerization of a "specified α-olefin compound".

Specific examples of the "specified α-olefin compound" include ethylene, propylene, 1-butene, 1-hexene, 1-octene, trimethylsilylethylene, triethylsilylethylene, and styrene, preferably ethylene.

Introduction, into the polymer, of the repeating unit (c) based on "specified α-olefin compound" allows to control the glass transition temperature of the cycloolefin-type polymer of the invention. In the cycloolefin-type polymer of the invention, the repeating unit (c) represents a proportion of 0-30 mol. %, preferably 0-20 mol. %. A proportion of the repeating unit (c) exceeding 30 mol. % lowers the glass transition temperature of the cycloolefin-type polymer of the invention to 170° C. or less, thereby undesirably deteriorating the heat resistance.

The molecular weight of the cycloolefin-type polymer of the invention is represented by a conversion in polystyrene, and the cycloolefin-type polymer of the invention has a number-average molecular weight of 10,000-300,000 and a weight-average molecular weight of 20,000-700,000, preferably a number-average molecular weight of 20,000-200,000 and a weight-average molecular weight of 50,000-500,000, and more preferably a number-average molecular weight of 50,000-150,000 and a weight-average molecular weight of 100,000-300,000. A number-average molecular weight less than 10,000 or a weight-average molecular weight less than 20,000 results in a deficient tenacity in a film, thus easily causing a crack. On the other hand, a number-average molecular weight exceeding 300,000 or a weight-average molecular weight exceeding 700,000 increases the viscosity of the solution, thereby deteriorating the operability in film formation by a solution cast method and a surface property of the obtained film.

Also the cycloolefin-type polymer of the invention has, in an uncrosslinked state, a glass transition temperature of 180-450° C., preferably 200-400° C. In the polymer, a glass transition temperature less than 180° C. results in an insufficient heat resistance, while a glass transition temperature exceeding 450° C. results in an insufficient tenacity in a film, thus easily causing cracks.

The cycloolefin-type polymer of the invention is produced by principally utilizing the "specified monomer (1)", also employing the "specified monomer (2)", if necessary, for crosslinking or for providing an adhesion/contact property, and employing the "specified α-olefin compound", if necessary, for controlling the glass transition temperature. The producing method will be explained in the following.

A polymerization catalyst may be a single complex catalyst or a multi-component catalyst of palladium, nickel, cobalt, titanium or zirconium as shown [1], [2] and [3] in the following, but the present invention is not limited to these examples:

[1] A single complex catalyst of Pd, Ni and the like, such as: $[Pd(CH_3CN)_4][BF_4]_2$, $[Pd(PhCN)_4][SbF_4]$, $[(\eta3\text{-crotyl})Pd(cyclooctadiene)][PF_6]$, $[(\eta3\text{-crotyl})Ni(cycloocta-1,5\text{-diene})][B(3,5\text{-}(CF_3)_2C_6F_3)_4]$, $[(\eta3\text{-crotyl})Ni(cycloocta-1,5\text{-diene})][PF_6]$, $[(\eta3\text{-allyl})Ni(cycloocta-1,5\text{-diene})][B(C_6F_5)_4]$, $[(\eta3\text{-crotyl})Ni(cycloocta-1,5\text{-diene})][SbF_6]$, toluene-$Ni(C_6F_5)_2$, benzene-$Ni(C_6F_5)_2$, mesitylene-$Ni(C_6F_5)_2$, or ethyl ether-$Ni(C_6F_5)_2$:

[2] A multi-component catalyst formed by a combination of a palladium complex having σ or σ,π bond and an organic aluminum compound or an ultra strong acid, such as a combination of di-μ-chloro-bis(6-methoxybicyclo[2.2.1]hept-2-en-end-5σ,2π)Pd and a compound selected from methyl almoxane (MAO), $AgSbF_6$ and $AgBF_4$, a combination of $[(\eta3\text{-aryl})PdCl]_2$ and $AgSbF_6$ or $AgBF_4$, or a combination of $[(1,5\text{-cyclooctadiene})Pd(CH_3)Cl]$, $PPh_3$ and $NaB[3,5\text{-}(CF_3)_2C_6H_3]_4$:

[3] A multi-component catalyst containing 1) a transition metal compound selected from a nickel compound, a cobalt compound, a titanium compound and a zirconium compound, 2) a compound selected from an ultra strong acid, a Lewis acid and an ionic boron compound, and 3) an organic aluminum compound, shown in the following:

1) transition metal compound 1)-1; nickel compound or cobalt compound: at least a compound selected from a group of an organic carboxylic acid salt, an organic phosphorous acid salt, an organic phosphoric acid salt, an organic sulfonic acid salt, and a β-diketone compound of nickel or cobalt, such as nickel 2-ethylhexanoate, nickel naphthenate, cobalt naphthenate, nickel oleate, nickel dodecanoate, cobalt dodecanoate, cobalt neodecanoate, nickel dodecylbenzensulfonate, nickel bis(acetylacetonate), or nickel bis(ethylacetoacetate); a compound formed by denaturing an above-mentioned organic carboxylic acid salt of nickel with an ultra strong acid such as hexafluoroantimonic acid, tetrafluoroboric acid, trifluoroacetic acid or hexafluoroacetone; a diene- or triene-coordinated nickel complex, such as dichloro(1,5-cyclooctadiene)nickel, [(η3-crotyl)(1,5-cyclooctadiene)nickel]hexafluorophosphate or a tetrafluoroborate thereof, a tetrakis[3,5-bis(trifluoromethyl)]borate complex, 5,9-(cyclododecatriene) nickel, bis(norbornadiene) nickel, or bis(1,5-cyclooctadiene) nickel; a nickel complex formed by coordinating a ligand having a P, N or O atom to nickel, such as bis(triphenylphosphine)nickel dichloride, bis(triphenylphosphine)nickel dibromide, bis(triphenylphosphine)cobalt dibromide, bis[N-(3-t-butylsalicylidene)phenyl aminate]nickel, Ni[PhC(O)CH](Ph), Ni(OC($C_6H_4$)PPh)(H)(PCy$_3$), Ni[OC(O)($C_6H_4$)P](H)(PPh$_3$), a reaction product of bis(1,5-cyclooctadiene)nickel and PhC(O)CH=PPh$_3$, or 6-(i-Pr)$_2$C$_6$H$_3$N=CHC$_6$H$_3$(O)(Anth)](Ph)(PPh$_3$)Ni (in the foregoing, Anth stands for 9-anthracenyl, Ph for phenyl and Cy for cyclohexyl);

1)-1; titanium compound or zirconium compound: [t-BuN-SiMe(Me$_4$Cp)]TiCl$_2$, (Me$_4$Cp)(O-iPr$_2$C$_6$H$_3$)$_2$TiCl, (Me$_4$Cp)TiCl$_3$, (Me$_4$Cp)Ti(OBu)$_3$, [t-BuNSiMe(Me$_4$Cp)Flu]TiMe$_2$, [t-BuNSiMe(Me$_4$Cp)Flu]TiCl$_2$Et(Ind)$_2$ZrCl$_2$, Ph$_2$C(Ind)(Cp)ZrCl$_2$, iPr(Cp)(Flu)ZrCl$_2$, iPr(3-tert-But-Cp)(Ind)ZrCl$_2$, iPr(Cp)(Ind)ZrCl$_2$, Me$_2$Si(Ind)$_2$ZrCl$_2$ or Cp$_2$ZrCl$_2$ (in the foregoing, Cp stands for cyclopentadienyl, Ind for indenyl, and Flu for fluorenyl):

2) A compound selected from an ultra strong acid, a Lewis acid and an ionic boron compound: the ultra strong acid can be, for example, hexafluoroantimonic acid, hexafluorophosphoric acid, hexafluoroarsenic acid, trifluoroacetic acid, fluorosulfuric acid, trifluoromethanesulfonic acid, tetrafluoroboric acid, tetrakis(pentafluorophenyl)boric acid, tetrakis[3,5-bis(trifluoromethyl)phenyl]boric acid, p-toluenesulfonic acid or pentafluoropropionic acid; the Lewis acid can be, for example, a boron such as a complex of boron trifluoride with an ether, an amine or a phenol, a complex of aluminum trifluoride with an ether, an amine or a phenol, tris(pentafluorophenyl)borane, or tris[3,5-bis(trifluoromethyl)pneyl]borane, an aluminum compound such as aluminum trichloride, aluminum tribromide, ethyl aluminum dichloride, ethyl aluminum sesquichloride, diethyl aluminum fluoride, or tri(pentafluorophenyl)aluminum, an organic halogen compound showing a Lewis acidity such as hexafluoroacetone, hexachloroacetone, chloranil or hexafluoromethyl ethyl ketone, or another compound showing Lewis acidity such as titanium tetrachloride or antimony pentafluoride; the ionic boron compound can be, for example, triphenylcarbenium tetrakis(pentafluorophenyl)borate, triphenylcarbenium tetrakis[3,5-bis(trifluoromethyl)phenyl]borate, triphenylcarbenium tetrakis(2,4,6-trifluoropohenyl)borate, triphenylcarbenium tetraphenylborate, tributylammonium tetrakis(pentafluorophenyl)borate, N,N-dimethylanilinium tetrakis(pentafluorophenyl)borate, N,N-diethylanilinium tetrakis(pentafluorophenyl)borate, or N,N-diphenylanilinium tetrakis(pentafluorophenyl)borate:

3) Organic aluminum compound: an alkyl almoxane compound such as methyl almoxane, ethyl almoxane, or butyl almoxane; an alkyl aluminum compound or a halogenated alkyl aluminum compound such as trimethyl aluminum, triethyl aluminum, triisobutyl aluminum, diisobutyl aluminum hydride, diethyl aluminum chloride, diethyl aluminum fluoride, ethyl aluminum sesquichloride or ethyl aluminum dichloride, or a mixture of the above-mentioned alkyl almoxane compound and the above-mentioned alkyl aluminum compound.

Such single complex catalyst or a component of the multi-component catalyst is employed with a following range. A transition metal compound such as a nickel compound, a palladium compound, a cobalt compound, a titanium compound or a zirconium compound is employed with 0.02-100 millimole atom per 1 mole of the monomer; an organic aluminum compound is employed with 1-5,000 moles per 1 mole atom of the transition metal compound; and an ultra strong acid, a Lewis acid or an ionic boron compound is employed with 0-100 moles per 1 mole atom of the transition metal compound.

The cycloolefin-type polymer of the invention can be obtained by a polymerization reaction within a temperature range of −20 to 120° C., utilizing a single complex catalyst or a multi-component catalyst constituted of the aforementioned components, in a solvent of one or more kinds selected from an alicyclic hydrocarbon solvent such as cyclohexane, cyclopentane or methylcyclopentane, an aliphatic hydrocarbon solvent such as hexane, heptane or octane, an aromatic hydrocarbon solvent such as toluene, benzene, xylene or mesitylene, and a halogenated hydrocarbon solvent such as dichloromethane, 1,2-dichloroethane, 1,1-dichloroethane, tetrachloroethane, chlorobenzene or dichlorobenzene.

(Cycloolefin-Type Ring-Opening Polymer)

As the cycloolefin-type polymer of the invention, a ring-opening polymer having a monomer unit represented by following formulas (5) and (6) may also be employed advantageously.

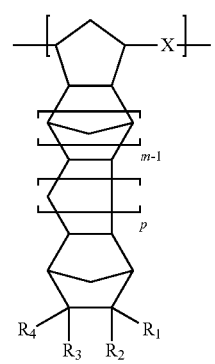

Formula (5)

(wherein, in the formula (5), m represents an integer of 1 or larger; p represents an integer of 0, 1 or larger; X represents a vinylene group (—CH═CH—) or an ethylene group (—CH$_2$CH$_2$—); and $R_1$-$R_4$ each independently represent a hydrogen atom, a halogen atom, a substituted or non-substituted hydrocarbon group with 1-30 carbon atoms that may include a linkage group containing an oxygen atom, a nitrogen atom, a sulfur atom or a silicon atom, or a polar group; also $R_1$ and $R_2$, $R_3$ and $R_4$ or $R_2$ and $R_3$ may be mutually bonded to form a carbon ring or a heterocyclic ring of a single-ring structure or a multi-ring structure condensed with another ring, the formed ring being aromatic or non-aromatic).

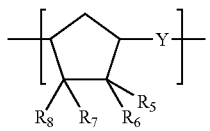

Formula (6)

(wherein, in the formula (6), Y represents a vinylene group (—CH═CH—) or an ethylene group (—CH$_2$CH$_2$—); and $R_5$-$R_8$ each independently represent a hydrogen atom, a halogen atom, a substituted or non-substituted hydrocarbon group with 1-30 carbon atoms that may include a linkage group containing an oxygen atom, a nitrogen atom, a sulfur atom or a silicon atom, or a polar group; also $R_5$ and $R_6$, $R_7$ and $R_8$ or $R_6$ and $R_7$ may be mutually bonded to form a carbon ring or a heterocyclic ring (excluding a structure represented by the formula (1)) of a single-ring structure or a multi-ring structure condensed with another ring, the formed ring being aromatic or non-aromatic).

A polymer of the formula (5) or (6) is synthesized as a (co)polymer (hereinafter called "specified polymer") of following monomers (a) to (d).

(a) a ring-opening polymer of a compound represented by a following formula (7) (hereinafter also called "specified monomer d");

(b) a ring-opening polymer of the specified monomer d and a compound (hereinafter also called a "copolymerizable monomer") capable of copolymerizing the specified monomer d;

(c) a hydrogenated product of the open-opening polymer (a) or (b); and (d) a compound obtained by a Friedel-Crafts cyclization of the open-opening polymer (a) or (b) or a hydrogenated product thereof.

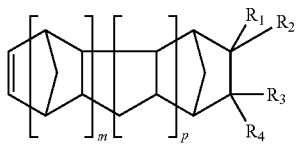

Formula (7)

(wherein, in the formula (7), m represents an integer of 1 or larger; p represents an integer of 0, 1 or larger; and $R_1$-$R_4$ each independently represent a hydrogen atom, a halogen atom, a substituted or non-substituted hydrocarbon group with 1-30 carbon atoms that may include a linkage group containing an oxygen atom, a nitrogen atom, a sulfur atom or a silicon atom, or a polar group; also $R_1$ and $R_2$, $R_3$ and $R_4$ or $R_2$ and $R_3$ may be mutually bonded to form a carbon ring or a heterocyclic ring of a single-ring structure or a multi-ring structure condensed with another ring, the formed ring being aromatic or non-aromatic.

The specified polymer is preferably formed by employing a compound represented by a following formula (8) as a copolymerizable monomer (hereinafter also called "specified monomer b") and copolymerizing the specified monomer d and the specified monomer b. The specified polymer of such structure provides the finally obtained specified retardation film with more excellent mechanical properties such as a tenacity, and facilitates obtaining, by a stretching process, a desired phase difference in the specified retardation film.

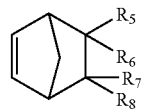

Formula (8)

(wherein, in the formula (8), $R_5$-$R_8$ each independently represent a hydrogen atom, a halogen atom, a substituted or non-substituted hydrocarbon group with 1-30 carbon atoms that may include a linkage group containing an oxygen atom, a nitrogen atom, a sulfur atom or a silicon atom, or a polar group; also $R_5$ and $R_6$, $R_7$ and $R_8$ or $R_6$ and $R_7$ may be mutually bonded to form a carbon ring or a heterocyclic ring (excluding a structure represented by the formula (5)) of a single-ring structure or a multi-ring structure condensed with another ring, the formed ring being aromatic or non-aromatic).

Also preferably the specified polymer is a ring-opening polymer of the specified monomer d and the specified monomer e, and include a structural unit (hereinafter also called "structural unit d") derived from the specified monomer a represented by the formula (5), and a structural unit (hereinafter also called "structural unit e") derived from the specified monomer e represented by the formula (6). The specified polymer of such structure is preferred in obtaining a satisfactory balance of a heat resistance and a thermal working property for example in a stretching process.

The halogen atom in the formulas (7) and (8) can be a fluorine atom, a chlorine atom or a bromine atom.

The hydrocarbon group with 1-30 carbon atoms can be, for example, an alkyl group such as a methyl group, an ethyl group or a propyl group; a cycloalkyl group such as a cyclopentyl group or a cyclohexyl group; or an alkenyl group such as a vinyl group, an allyl group or a propenyl group.

In the formula (5)-(8), the substituted or non-substituted hydrocarbon group may be connected to the ring structure either directly or through a linkage group.

The linkage group can be, for example, a divalent hydrocarbon group with 1-10 carbon atoms [such as an alkylene group represented by —(CH$_2$)$_q$— in which q represents an integer of 1-10]; or a linkage group including an oxygen atom, a nitrogen atom, a sulfur atom or a silicon atom [such as a carbonyl group (—CO—), an oxycarbonyl group (—C (CO)—), a sulfone group (—SO$_2$—), an ether bond (—CO—), a thioether bond (—S—), an imino group (—NH—), an amide bond (—NHCO—, —CONH—), a siloxane bond (—OSi—), 8-methyl-8-n-propoxycarbonyl-tetracyclo[4.4.0.1 2,5.1 7,10]-3-dodecene, 8-methyl-8-iso-poxycarbonyl-tetracyclo[4.4.0.1 2,5.1 7,10]-3-dodecene, 8-fluoro-8-pentafluoroethyl-9,9-bis(trifluoromethyl)-tetracyclo[4.4.0.1 2,5.1 7,10]-3-dodecene, 8,9-difluoro-8-heptafluoro-isopropyl-9-trifluoromethyl-tetracyclo[4.4.0.1 2, 5.1 7,10]-3-dodecene, 8-chloro-8,9,9-trifluoro-tetracyclo [4.4.0.1 2,5.1 7,10]-3-dodecene, 8,9-dichloro-8,9-bis (trifluoromethyl)-tetracyclo[4.4.0.1 2, 5.1 7,10]-3-dodecene, 8-(2,2,2-trifluoroethoxycarbonyl)-tetracyclo[4.4.0.1 2,5.1 7, 10]-3-dodecene, 8-methyl-8-(2,2,2-trifluoroethoxycarbonyl)-tetracyclo[4.4.0.1 2,5.1 7,10]-3-dodecene, 8-(4-biphenylcarbonyloxymethyl)-tetracyclo[4.4.0.1 2,5.1 7,10]-3-dodecene, 8-(4-biphenylcarbonyloxyethyl)-tetracyclo [4.4.0.1 2,5.1 7,10]-3-dodecene, 8-methyl-8-(4- biphenylcarbonyloxymethyl)-tetracyclo[4.4.0.1²,⁵.1⁷,¹⁰]-3-dodecene, 8-(2-biphenylcarbonyloxymethyl)-tetracyclo[4.4.0.1²,⁵.1⁷,¹⁰]-3-dodecene, 8-methyl-8-(4-biphenylcarbonyloxymethyl)-tetracyclo[4.4.0.1²,⁵.1⁷,¹⁰]-3-dodecene, 8-(3-biphenylcarbonyloxymethyl)-tetracyclo[4.4.0.1²,⁵.1⁷,¹⁰]-3-dodecene, 8-methyl-8-(3-biphenylcarbonyloxymethyl)-tetracyclo[4.4.0.1²,⁵.1⁷,¹⁰]-3-dodecene, 8-(1-naphthylcarbonyloxymethyl)-tetracyclo[4.4.0.1²,⁵.1⁷,¹⁰]-3-dodecene, 8-methyl-8-(1-naphthylcarbonyloxymethyl)-tetracyclo[4.4.0.1²,⁵.1⁷,¹⁰]-3-dodecene, 8-(2-naphthylcarbonyloxymethyl)-tetracyclo[4.4.0.1²,⁵.1⁷,¹⁰]-3-dodecene, 8-methyl-8-(2-naphthylcarbonyloxymethyl)-tetracyclo[4.4.0.1²,⁵.1⁷,¹⁰]-3-dodecene, 8-(9-anthracenylcarbonyloxymethyl)-tetracyclo[4.4.0.1²,⁵.1⁷,¹⁰]-3-dodecene, 8-methyl-8-(9-anthracenylcarbonyloxymethyl)-tetracyclo[4.4.0.1²,⁵.1⁷,10]-3-dodecene, or a Diels-Alder addition product of 1,2-(2H,3H-[1,3]epicyclopenta-1,2-dihydroacenaphthylene and cyclopentadiene, but the specified monomer a is not limited to these compounds. Also these compounds may be employed singly or in a combination of two or more kinds as the specified monomer a.

Among these, preferable is a compound having at least a polar group within the molecule, and particularly preferable is a compound in which, in the formula (5), $R_1$ and $R_3$ each is a hydrogen atom or a hydrocarbon group with 1-10 carbon atoms, $R_2$ and $R_4$ each is a hydrogen atom or a monovalent organic group, and at least either of $R_2$ and $R_4$ is a hydrogen atom or a polar group other than a hydrocarbon group, in improving a contact and an adhesion property with other materials.

In the obtained specified polymer, a content of the polar group is to be determined by desired performances required in the finally obtained specified retardation film and is not particularly restricted, but, in all the structural units derived from the specified monomer a, the structural unit derived from the specified monomer a having the polar group is normally present by 1 mol. % or higher, preferably 5 mol. % or higher and more preferably 10 mol. % or higher, and all the structural units derived from the specified monomer a may be those having the polar group.

Also the specified monomer d preferably has, in at least either of $R_2$ and $R_4$ in the formula (7), a polar group represented by a following formula (9), for an easy control of the glass transition temperature and the water absorption of the obtained specified polymer:

—(CH$_2$)$_n$COOR$_{10}$   Formula (9)

(wherein n represents an integer of 0-5; and $R_{10}$ represents a monovalent organic group).

In the formula (9), specific examples of the monovalent organic group represented by $R_{10}$ include an alkyl group such as a methyl group, an ethyl group or a propyl group; an aryl group such as a phenyl group, a naphthyl group, an anthracenyl group or a biphenylyl group; and a monovalent group including an aromatic ring or a heterocycle such as a furan ring or an imide ring, for example diphenylsulfone or a fluorene such as tetrahydrofluorene.

In the formula (9), n represents an integer of 0-5, preferably 0-2 and more preferably 0. A smaller n value is preferred because of a higher glass transition temperature of the obtained specified polymer, and a specified monomer a of n=0 is preferred because of an easy synthesis thereof.

Furthermore, the specified monomer d is preferably such that, in the formula (7), an alkyl group is further bonded to a carbon atom bonded to the polar group represented by the formula (9), thereby allowing to obtain a satisfactory balance of a thermal resistance and a water absorption of the obtained specified polymer. The alkyl group preferably has 1-5 carbon atoms, more preferably 1-2 carbon atoms and particularly preferably, 1 carbon atom.

Also the specified monomer d preferably has m=1 and p=0 in the formula (7), in obtaining a specified polymer of a high glass transition temperature.

Specific examples of the specified monomer e include:
bicyclo[2.2.1]hept-2-ene,
tricyclo[5.2.1.0²,⁶]dec-8-ene,
tricyclo[6.2.1.0²,⁷]undec-9-ene,
5-methylbicyclo[2.2.1]hept-2-ene,
5-ethylbicyclo[2.2.1]hept-2-ene,
5-methoxycarbonylbicyclo[2.2.1]hept-2-ene,
5-methyl-5-methoxycarbonylbicyclo[2.2.1]hept-2-ene,
5-phenoxycarbonylbicyclo[2.2.1]hept-2-ene,
5-methyl-5-phenoxycarbonylbicyclo[2.2.1]hept-2-ene,
5-cyanobicyclo[2.2.1]hept-2-ene,
5-ethylidenebicyclo[2.2.1]hept-2-ene,
5-phenylbicyclo[2.2.1]hept-2-ene,
5-(2-naphthyl)-bicyclo[2.2.1]hept-2-ene (α and β structures),
5-fluorobicyclo[2.2.1]hept-2-ene,
5-fluoromethylbicyclo[2.2.1]hept-2-ene,
5-trifluoromethylbicyclo[2.2.1]hept-2-ene,
5-pentafluoroethylbicyclo[2.2.1]hept-2-ene,
5,5-difluorobicyclo[2.2.1]hept-2-ene,
5,6-difluorobicyclo[2.2.1]hept-2-ene,
5,5-bis(trifluoromethyl)bicyclo[2.2.1]hept-2-ene,
5,6-bis(trifluoromethyl)bicyclo[2.2.1]hept-2-ene,
5-methyl-5-trifluoromethylbicyclo[2.2.1]hept-2-ene,
5,5,6-trifluorobicyclo[2.2.1]hept-2-ene,
5,5,6-tris(fluoromethyl)bicyclo[2.2.1]hept-2-ene,
5,5,6,6-tetrafluorobicyclo[2.2.1]hept-2-ene,
5,5,6,6-tetrakis(trifluoromethyl)bicyclo[2.2.1]hept-2-ene,
5,5-difluoro-6,6-bis(trifluoromethyl)bicyclo[2.2.1]hept-2-ene,
5,6-difluoro-5,6-bis(trifluoromethyl)bicyclo[2.2.1]hept-2-ene,
5,5,6-trifluoro-5-trifluoromethylbicyclo[2.2.1]hept-2-ene,
5-fluoro-5-pentafluoroethyl-6,6-bis(trifluoromethyl)bicyclo[2.2.1]hept-2-ene,
5,6-difluoro-5-heptafluoro-isopropyl-6-trifluoromethylbicyclo[2.2.1]hept-2-ene,
5-chloro-5,6,6-trifluorobicyclo[2.2.1]hept-2-ene,
5,6-dichloro-5,6-bis(trifluoromethyl)bicyclo[2.2.1]hept-2-ene,
5,5,6-trifluoro-6-trifluoromethoxybicyclo[2.2.1]hept-2-ene,
5,5,6-trifluoro-6-heptafluoropropoxybicyclo[2.2.1]hept-2-ene,
5-(4-phenylphenyl)bicyclo[2.2.1]hept-2-ene,
4-(bicyclo[2.2.1]hept-5-en-2-yl)phenylsulfonylbenzene,
5-(4-biphenylcarbonyloxymethyl)bicyclo[2.2.1]hept-2-ene,
5-(4-biphenylcarbonyloxyethyl)bicyclo[2.2.1]hept-2-ene,
5-(4-biphenylcarbonyloxypropyl)bicyclo[2.2.1]hept-2-ene,
5-methyl-5-(4-biphenylcarbonyloxymethyl)bicyclo[2.2.1]hept-2-ene,
5-(2-biphenylcarbonyloxymethyl)bicyclo[2.2.1]hept-2-ene,
5-(2-biphenylcarbonyloxyethyl)bicyclo[2.2.1]hept-2-ene,
5-methyl-5-(2-biphenylcarbonyloxymethyl)bicyclo[2.2.1]hept-2-ene,
5-(3-biphenylcarbonyloxymethyl)bicyclo[2.2.1]hept-2-ene,
5-(3-biphenylcarbonyloxyethyl)bicyclo[2.2.1]hept-2-ene,
5-(1-naphthylcarbonyloxymethyl)bicyclo[2.2.1]hept-2-ene,
5-(1-naphthylcarbonyloxyethyl)bicyclo[2.2.1]hept-2-ene,
5-methyl-5-(1-naphthylcarbonyloxymethyl)bicyclo[2.2.1]hept-2-ene, 5-(2-naphthylcarbonyloxymethyl)bicyclo[2.2.1]hept-2-ene,
5-(2-naphthylcarbonyloxyethyl)bicyclo[2.2.1]hept-2-ene,
5-methyl-5-(2-naphthylcarbonyloxymethyl)bicyclo[2.2.1]
   hept-2-ene,
5-(9-anthracenylcarbonyloxymethyl)bicyclo[2.2.1]hept-2-
   ene,
5-(9-anthracenylcarbonyloxyethyl)bicyclo[2.2.1]hept-2-
   ene,
5-methyl-5-(9-anthracenylcarbonyloxymethyl)bicyclo
   [2.2.1]hept-2-ene, and
a Diels-Alder addition product acenaphthylene and cyclopendatine, but the specified monomder e is not limited to these examples. Also such compounds may be employed singly or in a combination of two or more kinds, as the specified monomer e.

The specified polymer obtained by copolymerizing the specified monomer d and the specified monomer e may also be copolymerized with another copolymerizable monomer other than the specified monomer d and the specified monomer e.

Such another copolymerizable monomer can be, for example, a cycloolefin such as cyclobutene, cyclopentene, cycloheptene, cyclooctene or dicyclopentadiene. The cycloolefin preferably has 4-20 carbon atoms, more preferably 5-12 carbon atoms. Also the specified monomer a and, if necessary, the specified monomer b may be polymerized in the presence for example of an unsaturated hydrocarbon polymer having an olefinic unsaturated bond in a main chain, such as polybutadiene, polyisoprene, a styrene-butadiene copolymer, an ethylene-non-conjugate diene copolymer or polynorbornene, and a specified polymer thus obtained is useful as a raw material for a resin of a high impact strength.

The specified polymer preferably has an inherent viscosity ($\eta_{inh}$), measured in chloroform at 30° C., of 0.2-5 dl/g, more preferably 0.3-4 dl/g and particularly preferably 0.5-3 dl/g. A value exceeding 5 dl/g may excessively elevate the viscosity of the solution, thereby deteriorating the working property, while a value less than 0.2 dl/g may deteriorate the strength of the film.

As to the molecular weight of the specified polymer measured by gel-permeation chromatography (GPC) and converted into polystyrene, a number-average molecular weight (Mn) is normally 8,000-1,000,000, preferably 10,000-500,000, more preferably 20,000-100,000 and particularly preferably 30,000-100,000, and a weight-average molecular weight (Mw) is normally 20,000-3,000,000, preferably 30,000-1,000,000, more preferably 40,000-500,000 and particularly preferably 40,000-300,000.

Also the specified polymer has a molecular weight distribution (Mw/Mn) of 1.5-10, preferably 2-8, more preferably 2.5-5 and particularly preferably 2.5-4.5.

A glass transition temperature (Tg) of the specified polymer can be suitably regulated for example by regulating types of the structural unit a and the structural unit b in the specified polymer or a ratio thereof, or by an addition of an additive, but is normally 100-250° C., preferably 110-200° C., and more preferably 120-180° C. A Tg less than 100° C. lowers the temperature of thermal deformation, thus possibly deteriorating the heat resistance. Also in the finally obtained film, optical characteristics thereof may be significantly influenced by the temperature. Also a Tg exceeding 250° C. may cause a thermal deterioration of a thermoplastic norbornene-type resin in a working step such as a stretching under heating close to Tg.

In the specified polymer including the structural units d and e, a ratio thereof (d/e) is preferably 95/5-5/95 in molar ratio, more preferably 95/5-60/40. A proportion of the structural unit d exceeding the aforementioned range may be unable to provide an improvement tenacity or desire optical characteristics, and a proportion of the structural unit d less than the aforementioned range may lower the glass transition temperature, thereby resulting in an insufficient heat resistance.

Also in the specified polymer including the structural units d and e, a ratio (composition ratio) of the structural units d and e preferably shows little fluctuation in the entire range of the molecular weight distribution. More specifically, with respect to the ratio of the specified monomer a and the specified monomer e used in the polymerization, the composition ratio at an arbitrary molecular weight is retained within a fluctuation range of ±50%, preferably within ±30% and more preferably within ±20%, thereby providing a more uniform specified retardation film. Also the fluctuation within such range allows to obtain a higher uniformity in the phase difference after orienting stretch.

In the following, there will be explained conditions for producing the specified polymer, obtained by a ring-opening copolymerization of the specified monomer d and, if necessary, the specified monomer e or another copolymerizable monomer, or by a hydrogenation of the ring-opening copolymer obtained by the ring-opening copolymerization of such monomers.

(Catalyst for Ring-Opening Polymerization)

The ring-opening polymerization of the monomers is executed in the presence of a metathesis catalyst.

The metathesis catalyst is formed by a combination of (a) at least a compound selected from those of W, Mo or Re, and (b) at least a compound of an element, in the periodic table, of group IA (such as Li, Na or K), group IIA (such as Mg or Ca), group IIB (such as Zn, Cd or Hg), group IIIB (such as B or Al), group IVA (such as Ti or Zr) or IVB (such as Si, Sn or Pb) and having at least a bond of such element and carbon or a bond of such element and hydrogen. For elevating the activity of the catalyst, an additive (c) to be explained later may be added.

Specific examples of the compound of W, Mo or Re suitable as the component (a) include those described in JP-A-1-240517 such as $WCl_6$, $MoCl_5$ and $ReOCl_3$.

Specific examples of the component (b) include those described in JP-A-1-240517 such as $n\text{-}C_4H_9Li$, $(C_2H_5)_3Al$, $(C_2H_5)_2AlCl$, $(C_2H_5)_{1.5}AlCl_{1.5}$, $(C_2H_5)AlCl_2$, methylalmoxane and LiH.

Specific examples of the component (c) include an alcohol, an aldehyde, a ketone, an amine and compounds described in JP-A-1-240517.

The metathesis catalyst is used in such a range, in a molar ratio of the component (a) and the specified monomer d and the specified monomer e (hereinafter both collectively represented as specified monomers), that the ratio of the component (a): specified monomers is normally 1:500-1:50000, preferably 1:1000-1:10000.

A proportion (a):(b) of the components (a) and (b) in a metal atomic ratio is within a range of 1:1-1:50, preferably 1:2-1:30.

A proportion (c):(a) of the components (a) and (c) in a molar ratio is within a range of 0.005:1-15:1, preferably 0.05:1-7:1.

(Molecular Weight Regulating Agent)

The molecular weight of the specified polymer can be regulated by a polymerization temperature, a type of the catalyst and a type of the solvent, but is preferably regulated, in the invention, by the presence of a molecular weight regulating agent in the reaction system. A preferred molecular weight regulating agent can be an α-olefin such as ethylene, propene, 1-butene, 1-pentene, 1-hexene, 1-heptene, 1-octene, 1-nonene, or 1-decene, or styrene, among which 1-butene, or 1-hexene is preferable.

Such molecular weight regulating agent may be employed singly or in a combination of two or more kinds. The molecular weight regulating agent is employed in an amount of 0.005-0.6 moles per 1 mole of the specified monomers subjected to the polymerization, preferably 0.02-0.5 moles.

(Solvent for Ring-Opening Polymerization)

A solvent to be employed in the ring-opening polymerization can be an alkane such as pentane, hexane, heptane, octane, nonane or decane; a cycloalkane such as cyclohexane, cycloheptane, cyclooctane, decaline or norbornane; an aromatic hydrocarbon such as benzene, toluene, xylene, ethylbenzene or cumene; a halogenated hydrocarbon such as chlorobutane, bromohexane, chloromethylene, dichloroethane, hexamethylene dibromide, chlorobenzene, chloroform or tetrachloroethylene; a saturated carboxylic acid ester such as ethyl acetate, n-butyl acetate, iso-butyl acetate or methyl propionate; or an ether such as dimethoxyethane, dibutyl ether or tetrahydrofuran, and such solvent may be employed singly or in a mixture of two or more kinds. Among these, the above-mentioned aromatic hydrocarbon is preferred.

The solvent is employed in such an amount that a ratio of solvent:specified monomers (in mass ratio) becomes 1:1-10:1, preferably 1:1-5:1.

(Hydrogenation)

The ring-opening copolymer obtained by the ring-opening polymerization may be directly used as the specified polymer, but is preferably formed as a hydrogenated substance in which the olefinic unsaturated bond remaining in the ring-opening copolymer is hydrogenated.

Such hydrogenated substance shows an excellent thermal stability, and provides a film not easily deteriorated in the properties thereof by heating, at the film formation, at the stretching process or in the use thereof as a product. In such hydrogenated substance, a hydrogenation rate to the olefinic unsaturated bonds is 50% or higher, preferably 70% or higher, more preferably 90% or higher and particularly preferably 98% or higher. Also in case the ring-opening copolymer subjected to the hydrogenation includes an aromatic ring in the molecule, such aromatic is preferably not substantially hydrogenated after the hydrogenation.

The hydrogenation is executed by an ordinary method, namely by adding a hydrogenation catalyst to a solution of the ring-opening copolymer and causing hydrogen gas to react therwith at a pressure from a normal pressure to 300 atm., preferably 3-200 atm. at a temperature of 0-200° C., preferably 20-180° C.

A hydrogenation catalyst can be one employed in an hydrogenation reaction of an ordinary olefinic compound. Such hydrogenation catalyst is known in an inhomogeneous catalyst and a homogeneous catalyst. In case of hydrogenating a ring-opening polymer having a substituent containing an aromatic ring within the molecule, there is preferably selected such a condition that the unsaturated bond of the aromatic ring is substantially not hydrogenated. The inhomogeneous catalyst can be a solid catalyst supporting a precious metal such as palladium, platinum, nickel, rhodium, or ruthenium on a carrier such as carbon, silica, alumina, or titania. Also the homogeneous catalyst can be nickel naphthenate/triethyl aluminum, nickel acetacetonate/triethyl aluminum, cobalt octenoate/n-butyllithium, titanocene dichloride/diethyl aluminum monochloride, rhodium acetate, chlorotris(triphenylphosphine)rhodium, dichlorotris(triphenylphosphine)ruthenium, chlorohydrocarbonyltris(triphenylphosphine)ruthenium, or dichlorocarbonyltris(triphenylphosphine)ruthenium. The catalyst may be in a powder form or in a granular form.

Such hydrogenation catalyst is employed in such an amount that a mass ratio of ring-opening polymer:hydrogenation catalyst becomes $1:1\times10^{-6}$ to 1:2.

(Film Manufacture)

In the present invention, a thermoplastic norbornene-type resin formed by the specified polymer can be formed into a film for example by a melt molding method or a solution cast (solvent cast) method, but the solvent casting method is preferable in obtaining an unprocessed film with a high uniformity in thickness and a satisfactory surface smoothness. The solvent cast method can be executed, for example, by dissolving or dispersing the thermoplastic norbornene-type resin in a solvent to obtain a film forming liquid containing the thermoplastic norbornene-type resin at an appropriate concentration, then pouring or coating the film forming liquid on a suitable carrier, and, after drying, peeling a film from the carrier.

In dissolving or dispersing the thermoplastic norbornene-type resin in a solvent, the thermoplastic norbornene-type resin has a concentration of 0.1-90 mass %, preferably 1-50 mass % and more preferably 10-35 mass %. With a concentration less than 0.1 mass %, an unprocessed film of a required thickness may be difficult to obtain, and, at the drying for removing the solvent, bubbles may be formed along with the solvent evaporation, whereby an unprocessed film of a satisfactory surface smoothness is difficult to obtain. On the other hand, a concentration exceeding 90 mass % excessively elevates the viscosity of the film forming liquid, whereby a film uniform in thickness and surface state may be difficult to obtain.

Also the film forming liquid has a viscosity at the room temperature of 1-1,000,000 mPa·s, preferably 10-100,000 mPa·s, more preferably 100-50,000 mPa·s and particularly preferably 1,000-40,000 mPa·s.

A solvent to be employed for preparing the film forming liquid can be an aromatic solvent such as benzene, toluene or xylene; a cellosolve solvent such as methyl cellosolve, ethyl cellosolve, or 1-methoxy-2-propanol; a ketone solvent such as diacetone alcohol, acetone, cyclohexanone, methyl ethyl ketone, 4-methyl-2-pentanone, cyclohexanone, ethylcyclohexanone, or 1,2-dimethylcyclohexane; an ester solvent such as methyl lactate or ethyl lactate; a halogen-containing solvent such as 2,2,3,3-tetrafluoro-1-propanol, methylene chloride or chloroform; an ether solvent such as tetrahydrofuran or dioxane; or an alcohol solvent such as 1-pentanol or 1-butanol.

In addition to the aforementioned solvents, any solvent having an SP value (solubility parameter) of 10-30 (MPa1/2), preferably 10-25 (MPa1/2), more preferably 15-25 (MPa1/2) and particularly preferably 15-20 (MPa1/2) may be employed to produce a film satisfactory in the surface uniformity and the optical characteristics.

The solvents mentioned above may be employed singly or in a combination of two or more kinds. In case of employing two or more solvents in combination, the obtained mixed solvent preferably has an SP value within the above-described range. The SP value of a mixed solvent can be determined from a mass ratio of the solvents constituting the mixed solvent. For example a SP value of a mixed solvent formed by two solvents is given by SP=W1·SP1+W2·SP2, wherein W1 and W2 are mass proportions of such two solvents and SP1 and SP2 are SP values thereof.

In case of employing a mixed solvent as the solvent for film formation, a good solvent and a poor solvent for the thermoplastic norbornene-type resin may be combined to obtain an unprocessed film having a light diffusing function. More specifically, with SP values for a thermoplastic norbornene-type resin of SPx, a good solvent of SPy for the thermoplastic norbornene-type resin and a poor solvent of SPz for the thermoplastic norbornene-type resin, a light diffusing property can be given to the obtained unprocessed film by maintaining a difference of SPx and SPy preferably at 7 or less, more preferably 5 or less and particularly preferably 3 or less, also maintaining a difference of SPx and SPz preferably at 7 or more, more preferably 8 or more and particularly preferably 9 or more, and maintaining a difference of SPy and SPz at 3 or more, more preferably 5 or more and particularly preferably 7 or more. As a result, the finally obtained specified retardation film can have a light diffusing function.

In the mixed solvent, the poor solvent preferably has a proportion of 50 mass % or less, more preferably 30 mass % or less, particularly preferably 15 mass % or less, and most preferably 10 mass % or less. Also the poor solvent and the good solvent have a difference in boiling points thereof, preferably of 1° C. or larger, more preferably 5° C. or larger, particularly preferably 10° C. or larger and most preferably 20° C. or larger, and it is particularly preferred that the poor solvent has a higher boiling point than that of the good solvent.

The thermoplastic norbornene-type resin may be dissolved or dispersed in the solvent at the room temperature or at a higher temperature, and a film forming liquid in which the thermoplastic norbornene-type resin is uniformly dissolved or dispersed can be obtained under sufficient agitation.

Also a colorant such as a dye or a pigment may be added, if necessary, to the film forming liquid, thereby providing a colored unprocessed film.

Also a leveling agent may be added to the film forming liquid, in order to improve the surface smoothness of the obtained unprocessed film. Such leveling agent can be a commonly known one of various types, such as a fluorinated nonionic surfactant, a special acrylic resin-based leveling agent, or a silicone-type leveling agent.

A carrier for forming a liquid layer of the film forming liquid can be a metal drum, a steel belt, a polyester film such as of polyethylene terephthalate (PET) or polyethylene naphthalate (PEN), or a polytetrafluoroethylene belt. The film forming liquid can be coated by a method utilizing a die or a coater, a spraying method, a brushing method, a roll coating method, a spin coating method or an immersion method.

Also the film forming liquid may be coated plural times to control the thickness and the surface smoothness of the obtained unprocessed film.

In case of employing a polyester film as the carrier, a surface treated film may be used for this purpose.

The surface treatment can be executed by an ordinary hydrophilizing method, such as a method of coating or laminating an acrylic resin or a resin containing a sulfonate salt, or a method of improving hydrophilicity of the film surface for example by a corona discharge.

In the solvent cast method, a method for removing the solvent in the liquid layer is not particularly restricted and may be an ordinary drying method, for example a method of passing the liquid layer by plural rollers through a drying oven. However, in case bubbles are generated by the solvent evaporation in the course of drying, the characteristics of the finally obtained specified retardation film are significantly deteriorated, and, it is therefore preferable, in order to avoid such phenomenon, to divide the drying step into two or more plural steps and to control a temperature or an air amount in each step.

In the unprocessed film thus obtained, a residual solvent amount is normally 10 mass % or less, preferably 5 mass % or less, more preferably 1 mass % or less and particularly 0.5 mass % or less. A residual solvent amount exceeding 10 mass % in the unprocessed film results in an undesirably large dimensional change in time, when the specified retardation film, obtained by a stretching of the unprocessed film, is actually used. Also the residual solvent lowers the glass transition temperature, thereby undesirably reducing the heat resistance.

In order to execute the stretching process to be explained later in a favorable manner, it may become necessary to suitably regulate the residual solvent amount in the unprocessed film within the aforementioned range. More specifically, in order to develop a phase difference stably and uniformly in the film by the stretch-orienting process, the residual solvent amount in the unprocessed film may be adjusted normally to 10-0.1 mass %, preferably 5-0.1 mass %, and more preferably 1-0.1 mass %. Stated differently, a small amount of solvent remaining in the unprocessed film may facilitate the stretching process or the control of the phase difference.

In the invention, the unprocessed film has a thickness normally in a range of 1-500 μm (1,000-50,000 nm), preferably 1-300 μm (1,000-300,000 nm), more preferably 1-200 μm (1,000-200,000 nm), and most preferably 1-100 μm (1,000-100,000 nm). With a thickness less than 1 μm, the unprocessed film becomes practically difficult to handle. On the other hand, with a thickness exceeding 500 μm, the unprocessed film shows so-called "winding curl" after being wound in a roll and may become difficult to handle in a post-process.

The thickness of the unprocessed film has a thickness distribution normally within ±20% with respect to an average value, preferably within ±10%, more preferably within ±5% and particularly preferably within ±3%. Also a thickness variation per 1 cm is normally 10% or less, preferably 5% or less, more preferably 1% or less and particularly preferably 0.5% or less. The thickness distribution of the unprocessed film, controlled within the above-mentioned range, allows to prevent an unevenness in the phase difference in the stretching process on the unprocessed film.

The stretching method for producing the specified retardation film can be a monoaxial stretching method or a biaxial stretching method already known.

More specifically, a transversal monoaxial stretching by a tenter, a compression stretching between rollers, a longitudinal monoaxial stretching or a biaxial stretching combining a longitudinal monoaxial stretching and a transversal monoaxial stretching utilizing two sets of rollers of different peripheral lengths, or an inflation stretching may be employed.

In case of monoaxial stretching, the stretching speed is normally 1-5,000%/min, preferably 50-1,000%/min, more preferably 100-1,000%/min and particularly preferably 100-500%/min.

In case of biaxial stretching, the stretching may be executed simultaneously in two directions, or by executing a monoaxial stretching and then executing a stretching in a direction different from the initial stretching direction. In such case, a crossing angle of the two stretching axes, for controlling the shape of a refractive index ellipsoid of the stretched film, is not particularly restricted as it is determined by desired characteristics, but is usually within a range of 120-60°. Also the stretching rate may be same or different among the stretching directions, and is normally 1-5,000%/min, preferably 50-1,000%/min, more preferably 100-1,000%/min and particularly preferably 100-500%/min.

A process temperature in the orienting-stretch process is not particularly restricted, but, with respect to the glass transition temperature Tg of the employed thermoplastic norbornene-type resin, is normally within a range of Tg±30° C., preferably within Tg±15° C., and more preferably within a range from Tg−5° C. to Tg+15° C. A process temperature within the above-mentioned range allows to suppress an unevenness in the phase difference, and facilitates the control of the refractive index ellipsoid.

A stretching magnification, though not particularly restricted as it is to be determined by the desired characteristics, is normally 1.01-10 times, preferably 1.03-5 times, and more preferably 1.03-3 times. With a stretching magnification exceeding 10 times, the phase difference may become difficult to control.

The stretched film may be directly cooled, but is preferably subjected to a heat-setting by maintaining in an atmosphere of Tg−20° C. to Tg for a period of at least 10 seconds, preferably 30 seconds to 60 minutes, and more preferably 1-60 minutes. Such process allows to obtain a stable retardation film, showing little change in time of the phase difference in the transmitted light.

The specified retardation film shows a dimensional shrink rate under heating, when heated for 500 hours at 100° C., of normally 10% or less, preferably 5% or less, more preferably 3% or less and particularly preferably 1% or less.

The dimensional shrink rate can be controlled within the above-mentioned range by a selection of the specified monomer a, the specified monomer b and other copolymerizable monomers used as the raw materials for the thermoplastic norbornene-type resin, also also by a casting method and a stretching method.

The unprocessed film not subjected to the orienting-stretch process shows a dimensional shrink rate under heating, when heated for 500 hours at 100° C., of normally 5% or less, preferably 3% or less, more preferably 1% or less and particularly preferably 0.5% or less.

The thus stretched film induces a phase difference in a transmitted light because the molecules are oriented by stretching, and such phase difference can be controlled by regulating a type of the thermoplastic norbornene-type resin, a stretching magnification, a stretching temperature and a thickness of the film before stretching (unprocessed film). For example, with respect to the stretching magnification, a film of a given thickness before stretching tends to provide a larger absolute phase difference in the transmitted light in a larger stretching magnification, so that the stretching magnification may be so changed as to obtain a film providing a desired phase difference in the transmitted light. Also with respect to the thickness of the film before stretching (unprocessed film), a larger film thickness before stretching tends to provide, with a given stretching magnification, a larger absolute phase difference in the transmitted light, so that the film thickness before stretching may be so changed as to obtain a film providing a desired phase difference in the transmitted light. Also with respect to the stretching temperature, a lower stretching temperature tends to provide a larger absolute phase difference in the transmitted light, so that the stretching temperature may be so changed as to obtain a a film providing a desired phase difference in the transmitted light.

Also the thickness of the specified retardation film may be controlled by regulating a film thickness before stretching and a stretching magnification. More specifically, the thickness of the retardation film can be made smaller by decreasing the film thickness before stretching or by increasing the stretching magnification.

In such specified retardation film, a number of bright spots converted in $1 m^2$ of film is 10 or less, preferably 7 or less, more preferably 5 or less and particularly preferably 3 or less, and most preferably 0 or 1.

The "bright spot" means a local light leakage observable visually, when the specified retardation film is observed in a state sandwiched between polarizing plates on a cross-Nicol state, and is usually counted when having an external diameter of 1 μm or larger (a diameter in case of a circular shape and a longitudinal size in case of other shapes). Naturally a smaller one may be measured as a bright spot depending on the required performance. Such bright spot is assumed to be induced by a local unevenness of phase difference in a small area. More specifically, an extraneous substance or a bubble, eventually present in the unprocessed film and even in a size not visually recognizable, may induce a stress concentration in the stretching process in a nearby area, whereby the phase difference in such area becomes different from that of a surrounding area and such difference in the phase difference induces a light leakage.

Also in the specified retardation film, a number of extraneous substances converted in $1 m^2$ of film is 10 or less, more preferably 5 or less and particularly preferably 3 or less, and most preferably 0 or 1.

The "extraneous substance" means a substance substantially hindering the light transmission, when the specified retardation film is transmitted by light. Such extraneous substance eventually present in the specified retardation film influences the intensity of the transmitted light, and may induce a lack of pixel or a deterioration of performance when the film is employed in a liquid crystal display device or the like.

A size of the extraneous substance to be measured is usually 1 μm or larger in external diameter (a diameter in case of a circular shape and a longitudinal size in case of other shapes), but a smaller one may also be measured depending on the required performance.

(Retardation)

In the present specification, $Re(\lambda)$ and $Rth(\lambda)$ represent an in-plane retardation and a retardation in the thickness direction at a wavelength of $\lambda$, respectively. The $Re(\lambda)$ and $Rth(\lambda)$ are each determined by making light incident from a prescribed direction and measuring a refractive index in the subject direction by using a birefringence meter. For example, the $Re(\lambda)$ is measured by making light having a wavelength of $\lambda$ nm incident into the normal line direction in KOBRA 21ADH (manufactured by Oji Science Instruments). The Rth ($\lambda$) is computed by KOBRA 21 ADH on the basis of retardation values, as measured in three directions in total, of the foregoing $Re(\lambda)$, a retardation value as measured by making light having a wavelength of $\lambda$ nm incident from a direction inclined by +40° against the normal line direction of the film while making the in-plane slow axis (judged by KOBRA 21ADH) serve as a tilt axis (rotational axis), and a retardation value as measured by making light having a wavelength of $\lambda$ nm incident from a direction inclined by −40° against the normal line direction of the film while making the in-plane slow axis serve as a tilt axis (rotational axis). Here, as hypothetical values of average refractive index, values described in *Polymer Handbook* (John Wiley & Sons, Inc.) and various catalogues of optical films can be employed. When an average refractive index value is not known, it can be measured by an Abbe's refractometer. Average refractive index values of major optical films are exemplified below. Cellulose acylate (1.48), cycloolefin polymer (1.52), polycarbonate (1.59), polymethyl methacrylate (1.49), polystyrene (1.59) By inputting a hypothetical value of the average refractive index and a film thickness, KOBRA 21ADH computes nx, ny and nz.

Re(546) of the cellulose acylate film of the invention is preferably from 20 to 200 nm, more preferably from 25 to 100 nm, and most preferably from 30 to 80 nm. Rth(546) is preferably from 70 to 400 nm, more preferably from 90 to 350 nm, and most preferably from 110 to 320 nm.

Furthermore, an Rth(546)/Re(546) ratio is preferably from 1 to 10, and more preferably from 2 to 9.

A fluctuation of Re or Rth in the transversal direction is preferably 5% or less.

Also an angle between a slow axis of the film and a casting direction is preferably within a range of 85° to 95°, and an angular fluctuation range in the transversal direction is preferably 5° or less.

(Surface Treatment of Cellulose Acylate Film)

The cellulose acylate film is preferably subjected to a surface treatment, which is specifically a corona discharge treatment, a glow discharge treatment, a flame treatment, an acid treatment, an alkali treatment or a ultraviolet irradiation treatment. It is also preferable to form an undercoat layer as described in JP-A-7-333433.

In case of use as a transparent protective film for a polarizing plate, in consideration of adhesion to the polarizer, an acid treatment or an alkali treatment, namely a saponification treatment to the cellulose acylate film, is particularly preferable.

A surface energy is preferably 55 mN/m or larger, more preferably 60-75 mN/m.

In the following, the treatment will be explained further by an example of an alkali saponification treatment.

The alkali saponification treatment for the cellulose acylate film is preferably executed by a process of immersing a film surface in an alkali solution, and executing a neutralization with an acidic solution, followed by a washing with water and a drying.

The alkali solution can be a solution of potassium hydroxide or sodium hydroxide, of which normality of hydroxide ions is preferably within a range of 0.1 to 3.0 N, more preferably 0.5 to 2.0 N. A temperature of the alkali solution is preferably within a range from the room temperature to 90° C., and more preferably 40-70° C.

A surface energy of a solid can be measured by a contact angle method, a moist-heat method or an adsorption method, as described in "Nure no kiso to ouyou (basis and application of wetting)" (published by Realize Co., Dec. 1, 1989). The contact angle method is preferably employed for the cellulose acylate film of the invention.

More specifically, two solutions with known surface energies are dropped on the cellulose acylate film, and, at a crossing point of the surface of the liquid drop and the film surface, an angle formed between a tangential line to the liquid drop and the film surface and containing the liquid drop is defined as a contact angle, from which the surface energy of the film can be calculated.

(Water Content of Cellulose Acylate Film)

The water content of the cellulose acylate film can be evaluated by measuring an equilibrium water content at a fixed temperature and relative humidity. The equilibrium water content is determined by after allowing a sample to stand at the foregoing temperature and relative humidity for 24 hours, measuring the amount of water of the sample which has reached an equilibrium state by the Karl Fisher's method and dividing the amount of water (g) by the sample weight (g).

The water content of the cellulose acylate film of the invention at 25° C. and 80% is preferably not more than 3% by mass, more preferably not more than 2.5% by weight, and most preferably not more than 2% by weight.

(Moisture Permeability)

A moisture permeability is measured according to a method described in JIS Z0208 on each specimen, and is calculated as a water amount (g) evaporating in 24 hours per an area of 1m$^2$.

The moisture permeability of cellulose acylate film can be regulated by various methods.

The moisture permeability can be lowered by adding a hydrophobic compound to the cellulose acylate film, thereby lowering a water absorption thereof.

In the cellulose acylate film of the invention, a moisture permeability measured by the method of JIS Z0208, condition A, is preferably 20-250 g/m$^2$, more preferably 40-225 g/m$^2$, and most preferably 100-200 g/m$^2$.

(Moisture-Absorption Expansion Coefficient)

A moisture-absorption expansion coefficient indicates a change in length of the specimen, when a relative humidity is changed under a constant temperature.

In order to prevent an increase in the transmittance in a frame shape, the cellulose acylate film preferably has a moisture-absorption expansion coefficient of $30\times10^{-5}$/% RH or less, more preferably $15\times10^{-5}$/% RH or less, and most preferably $10\times10^{-5}$/% RH or less. The moisture-absorption expansion coefficient is preferably smaller, but is normally $1.0\times10^{-5}$/% RH or larger.

The moisture-absorption expansion coefficient was measured by a following method. A specimen of a width of 5 mm and a length of 20 mm was cut out from a prepared polymer film (phase difference plate), and was suspended by fixing an end in an environment of 25° C., 20% RH(R0). A weight of 0.5 g was suspended on the other end and, after 10 minutes, a length (L0) was measured. Then the humidity was changed to 80% RH at the same temperature of 25° C. and a length (L1) was measured. The moisture-absorption expansion coefficient was calculated by a following equation. The measurement was conducted on 10 specimens prepared from a same sample film, and an average value of the results was adopted.

moisture-absorption expansion coefficient [% RH]={(L1−L0)/L0}/(R1−R0)

In order to reduce the dimensional change by moisture absorption, it is preferable to reduce the residual solvent at the film formation, thereby reducing a free volume in the polymer film.

A usual method for reducing the residual solvent is to execute drying at a higher temperature for a longer time, but an excessively long time naturally deteriorates the productivity. Therefore an amount of the residual solvent to the cellulose acylate film is preferably within a range of 0.01 to 1 mass %, more preferably 0.02 to 0.07 mass %, and most preferably 0.03 to 0.05 mass %.

Such control of the residual solvent allows to producing a polarizing plate having an optical compensation ability inexpensively with a high productivity.

The amount of residual solvent was measured by dissolving a sample of a predetermined amount in chloform, and by using a gas chromatograph (GC18A, manufactured by Shimadzu Corp.).

The solution cast method produces a film by a solution (dope) formed by dissolving a polymer material in an organic solvent. A drying in the solution cast method is divided, as will be explained later, into a drying on a drum (or a band), and a drying while the film is conveyed. The drying on drum (or band) is preferably executed gradually at a temperature not exceeding the boiling point of the used solvent (temperature exceeding the boiling point inducing a bubble formation). Also the drying during film conveying is preferably executed within a range of ±30° C. with respect to the glass transition point of the polymer material, more preferably within ±20° C.

Another preferred method for reducing the dimensional change by moisture absorption is to add a compound having a hydrophobic group. A material having a hydrophobic group can be any material having a hydrophobic group such as an alkyl group or a phenyl group within a molecule, but a material meeting such requirement within the plasticizer or the anti-deterioration agent to be added to the cellulose acylate film can be employed particularly advantageously. Such preferred material can be, for example, triphenyl phosphate (TPP) or tribenzylamine (TBA).

An amount of such compound having a hydrophobic group is preferably within a range of 0.01-30 mass % with respect to the prepared solution (dope), more preferably 0.1-20 mass %.

(Dimensional Change Rate)

A dimensional change rate of a cellulose acylate film can be determined by a dimensional change measurement with a pin gauge between before and after a standing at a constant temperature, and by a following equation:

dimensional change rate (%)=[(L2−L1)/L1]×100 wherein L1 is a dimension before standing and L2 is a dimension after standing.

The cellulose acylate film of the invention preferably has a dimensional change rate, after standing for 24 hours at 90° C., of −0.5 to 0.5%, more preferably −0.3 to 0.3% and most preferably −0.2 to 0.2%.

(Elastic Modulus of Cellulose Acylate Film)

An elastic modulus of the cellulose acylate film can be determined by a tensile test. The cellulose acylate film of the invention preferably has an elastic modulus, in at least one of the transversal direction and the casting direction, of 1.0 to 6.0 GPa, more preferably 2.0 to 5.5 GPa and most preferably 2.5 to 5.0 GPa.

(Photoelasticity)

The cellulose acylate film of the invention preferably has a photoelastic coefficient of $60 \times 10^{-8}$ cm$^2$/N or less, and more preferably $20 \times 10^{-8}$ cm$^2$/N or less. The photoelastic coefficient can be measured by an ellipsometer.

(Surface Treatment of Film)

The stretched polymer film of the invention is preferably subjected to a hydrophilic treatment on a surface thereof, in order to secure adhesion to a polarizer, an optically anisotropic layer, or an orientation layer provided between the optically anisotropic layer and the stretched polymer film of the invention.

The surface treatment can be executed by a method of forming an adhesive layer as described in JP-A Nos. 2000-24167, 10-130402, 2002-148436, 2002-90546 and 2001-350017. Also a hydrophilicity can be provided by a surface treatment such as a corona discharge as described in JP-A-2001-350018.

(Structure of Polarizing Plate)

At first, a protective film and a polarizer constituting the polarizing plate of the invention will be explained.

The polarizing plate of the invention is formed by adhering an protective film on each side of a polarizer, and at least one of the protective films is preferably constituted of a stretched optical resin film of the invention.

In addition to the polarizer and the protective films, there may also be included an adhesive layer, a separable film, and a protective film as constituents. Also the protective film is preferably provided, on a surface thereof, with a hard coat layer, an antiglare layer, an antireflective layer and the like. These layers will be explained later.

(1) Protective Film

A polarizing plate of the invention has two protective films in total, each side of a polarizer having one protective film, and at least one of the two protective films is the cellulose acylate film of the invention. Furthermore, it is preferable that at least one of the two protective films has also a function as a retardation film. When the polarizing plate of the invention is used in a liquid crystal display device, it is preferable that at least one of two polarizing plates to be disposed on the both sides of a liquid crystal cell is the polarizing plate of the invention.

It is preferable that the protective film which is used in the invention is a polymer film made of a norbornene resin, polyethylene terephthalate, polyethylene naphthalate, polycarbonate, polystyrene, polyallylate, polysulfone, a cellulose acylate, etc. It is the most preferable that the protective film which is used in the invention is a cellulose acylate film.

(2) Polarizer

The polarizer of the invention is preferably constructed of polyvinyl alcohol (PVA) and a dichroic molecule. A polyvinylene based polarizer obtained by dehydrating or dechlorinating PVA or polyvinyl chloride to form a polyene structure and orienting it can also be used.

PVA is a polymer raw material resulting from saponification of polyvinyl acetate and may contain a component copolymerizable with vinyl acetate, such as unsaturated carboxylic acids, unsaturated sulfonic acids, olefins, and vinyl ethers. Furthermore, modified PVA containing an acetoactyl group, a sulfonic acid group, a carboxyl group, an oxyalkylene group, etc. can be used.

Though the degree of saponification of PVA is not particularly limited, it is preferably from 80 to 100% by mole, and especially preferably from 90 to 100% by mole from the viewpoints of solubility, etc. Further, though the degree of polymerization of PVA is not particularly limited, it is preferably from 1,000 to 10,000, and especially preferably from 1,500 to 5,000.

As described in Japanese Patent No. 2,978,219, for the purpose of improving the durability, the syndiotacticity of PVA is preferably 55% or more. However, as described in Japanese Patent No. 3,317,494, PVA having a syndiotacticity of from 45 to 52.5% can also be preferably used.

It is preferable that after film formation of PVA, a dichroic molecule is introduced to construct a polarizer. As a method for producing a PVA film, in general, a method in which a stock solution of a PVA based resin dissolved in water or an organic solvent is cast to form a film is preferably employed. The concentration of the polyvinyl alcohol based resin in the stock solution is usually from 5 to 20% by weight. By subjecting this stock solution to film formation, a PVA film having a film thickness of from 100 to 200 μm can be produced. The production of the PVA film can be carried out by referring to Japanese Patent No. 3,342,516, JP-A-09-328593, JP-A-2001-302817, and JP-A-2002-144401.

Though the crystallinity of the PVA film is not particularly limited, a PVA film having an average crystallinity (Xc) of from 50 to 75% by weight as described in Japanese Patent No. 3,251,073 can be used. A PVA film having a crystallinity of not more than 38% as described in JP-A-2002-236214 can also be used for the purpose of reducing in-plane hue scatter.

It is preferable that the birefringence (Δn) of the PVA film is small. A PVA film having a birefringence of not more than $1.0 \times 10^{-3}$ as described in Japanese Patent No. 3,342,516 can be preferably used. However, as described in JP-A-2002-228835, for the purpose of obtaining a high degree of polarization while avoiding cutting at the time of stretching the PVA film, the birefringence of the PVA film may be regulated at from 0.002 to 0.01; and as described in JP-A-2002-060505, a value of [(nx+ny)/2−nz] may be regulated at from 0.0003 to 0.01. The retardation (in-plan) of the PVA film is preferably from 0 nm to 100 nm, and more preferably from 0 nm to 50 nm. Furthermore, the Rth (in the film thickness direction) of the PVA film is preferably from 0 nm to 500 nm, and more preferably from 0 nm to 300 nm.

Besides, for the polarizing plate of the invention, a PVA film having a 1,2-glycol binding amount as described in Japanese Patent No. 3,021,494; a PVA film having the number of optical foreign matters of 5 µm or more of not more than 500 per 100 cm$^2$ as described in JP-A-2001-316492; a PVA film having an unevenness in hot-water cutting temperature of not more than 1.5° C. in the TD direction of the film as described in JP-A-2002-030163 and a PVA film resulting from further mixing from 1 to 100 parts by weight of a trihydric to hexahydric polyhydric alcohol such as glycerin therewith; and a PVA film resulting from film formation of a solution of PVA having a 15% by weight or more of a plasticizer mixed therewith as described in JP-A-06-289225 can be preferably used.

Though the film thickness of the PVA film before stretching is not particularly limited, it is preferably from 1 µm to 1 mm, and especially preferably from 20 to 200 µm from the viewpoints of stability of film retention and uniformity of stretching. A thin PVA film in which a stress as generated at the time of stretching in water by from 4 to 6 times becomes 10 N or less as described in JP-A-2002-236212 may be used.

As the dichroic molecule, a high-order iodine ion such as $I_3^-$ and $I_5^-$ or a dichroic dye can be preferably used. In the invention, a high-order iodine ion is especially preferably used. The high-order iodine ion can be formed by dipping PVA in a solution of iodine dissolved in a potassium iodide aqueous solution and/or a boric acid aqueous solution, thereby adsorbing and orienting PVA as described in *Henkoban-no-Oyo* (Application of Polarizing Plate), eidited by Ryo Nagata and published by CMC Publishing Co., Ltd. and *Kogyo Zairyo* (Industrial Materials), Vol. 28, No. 7, pages 39 to 45.

When a dichroic dye is used as the dichroic molecule, an azo based dye is preferable, and a bisazo based dye and a trisazo based dye are especially preferable. As the dichroic dye, a water-soluble dichroic dye is preferable. For that reason, it is preferred to introduce a hydrophilic substituent (for example, a sulfonic acid group, an amino group, and a hydroxyl group) into the dichroic molecule and use it as a free acid or an alkali metal salt, an ammonium salt or an amine salt.

Specific examples of such a dichroic dye include benzidine based dichroic dyes (for example, C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, and C.I. Direct Green 1); diphenylurea based dichroic dyes (for example, C.I. Direct Yellow 44, C.I. Direct Red 23, and C.I. Direct Red 79); stilbene based dichroic dyes (for example, C.I. Direct Yellow 12); dinaphthylamine based dichroic dyes (for example, C.I. Direct Red 31); and J-acid based dichroic dyes (for example, C.I. Direct Red 81, C.I. Direct Violet 9, and C.I. Direct Blue 78).

Besides, C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and the like; dichroic dyes as described in JP-A-62-70802, JP-A-1-161202, JP-A-1-172906, JP-A-1-172907, JP-A-1-183602, JP-A-1-248105, JP-A-1-265205, and JP-A-7-261024; and the like can also be preferably used. For the purpose of producing a dichroic molecule having a variety of hues, two or more kinds of these dichroic dyes may be blended. When the dichroic dye is used, the adsorption thickness may be 4 µm or more as described in JP-A-2002-082222.

When the content of the subject dichroic molecule in the film is too low, the degree of polarization is low, while when it is too high, the single plate transmittance is lowered. Accordingly, the content of the dichroic molecule in the film is usually adjusted so as to fall within the range of from 0.01% by weight to 5% by weight based on the polyvinyl alcohol based polymer which constructs the matrix of the film.

The film thickness of the polarizer is preferably from 5 µm to 40 µm, and more preferably from 10 µm to 30 µm. It is also preferable that a ratio of the thickness of the polarizer to the thickness of the protective film falls within the range of [0.01≦A (thickness of polarizer)/B (thickness of protective film)≦0.16].

Though the crossing angle between the slow axis of the protective film and the absorption axis of the polarizer may be an arbitrary value, it is preferably parallel or an azimuth of 45±20°.

(Production Step of Polarizing Plate)

Next, the production step of the polarizing plate of the invention will be described.

The production step of the polarizer in the invention is preferably constructed of a swelling step, a dyeing step, a film hardening step, a stretching step, a drying step, a sticking step of protective film, and a drying step after the sticking step. The order of the dyeing step, the film hardening step and the stretching step may be arbitrarily varied, and some steps may be combined and carried out at the same time. Furthermore, water washing can be preferably carried out after the film hardening step as described in Japanese Patent No. 3,331,615.

In the invention, it is especially preferred to successively carry out a swelling step, a dyeing step, a film hardening step, a stretching step, a drying step, a sticking step of protective film, and a drying step after the sticking step in this order. Furthermore, an on-line plane condition inspection step may be provided during or after the foregoing steps.

It is preferable that the swelling step is carried out by using only water. However, as described in JP-A-10-153709, for the purposes of stabilizing the optical performance and avoiding the generation of wrinkles of a base material of the polarizing plate in the production line, the degree of swelling of the base material of the polarizing plate can also be controlled by swelling the base material of the polarizing plate with a boric acid aqueous solution.

Furthermore, the temperature and time of the swelling step can be arbitrarily determined and are preferably from 10° C. to 60° C. and from 5 seconds to 2,000 seconds, respectively.

As the dyeing step, a method as described in JP-A-2002-86554 can be employed. Furthermore, as the dyeing method, not only dipping means but also arbitrary means such as coating or spraying of iodine or a dye solution are employable. Moreover, as described in JP-A-2002-290025, a method for achieving dyeing by controlling the concentration of iodine, the dyeing bath temperature and the stretching magnification in the bath while stirring the solution in the bath.

When a high-order iodine ion is used as the dichroic molecule, in order to obtain a polarizing plate with high contrast, it is preferred to use a solution having iodine dissolved in a potassium iodide aqueous solution in the dyeing step. In this case, it is preferable that the iodine-potassium iodine aqueous solution has an amount of iodine in the range of from 0.05 to 20 g/L, an amount of potassium iodide in the range of from 3 to 200 g/L, and a weight ratio of iodine to potassium iodide in the range of from 1 to 2,000. The dyeing time is preferably from 10 to 1,200 seconds, and the solution temperature is preferably from 10 to 60° C. More preferably, the amount of iodine is from 0.5 to 2 g/L, the amount of potassium iodide is from 30 to 120 g/L, the weight ratio of iodine to potassium iodide is from 30 to 120, the dyeing time of from 30 to 600 seconds, and the solution temperature is from 20 to 50° C.

Furthermore, as described in Japanese Patent No. 3,145,747, a boron based compound such as boric acid and borax may be added in the dyeing solution.

In the film hardening step, it is preferred to contain a crosslinking agent by dipping in a crosslinking agent solution or coating the solution. Furthermore, as described in JP-A-11-52130, the film hardening step can also be dividedly carried out.

As the crosslinking agent, a crosslinking agent as described in U.S. Reissue Pat. No. 232,897 can be used. As described in Japanese Patent No. 3,357,109, for the purpose of improving the dimensional stability, a polyhydric aldehyde can be used as the crosslinking agent. Of these, boric acids are most preferably used.

When boric acid is used as the crosslinking agent which is used in the film hardening step, a metal ion may be added in a boric acid-potassium iodide aqueous solution. Zinc chloride is preferable as the metal ion. However, as described in JP-A-2000-35512, a zinc halide such as zinc iodide and a zinc salt such as zinc sulfate and zinc acetate can also be used in place of the zinc chloride.

In the invention, it is preferred to prepare a boric acid-potassium iodide aqueous solution having zinc chloride added thereto and dipping a PVA film therein to achieve film hardening. It is preferable that the amount of boric acid is from 1 to 100 g/L, that the amount of potassium iodide is from 1 to 120 g/L, that the amount of zinc chloride is from 0.01 to 10 g/L, that the film hardening time is from 10 to 1,200 seconds, and that the solution temperature is from 10 to 60° C. More preferably, the amount of the boric acid is from 10 to 80 g/L, the amount of potassium iodide is from to 100 g/L, the amount of zinc chloride is from 0.02 to 8 g/L, the film hardening time is from 30 to 600 seconds, and the solution temperature of from 20 to 50° C.

As the stretching step, a longitudinal uniaxial stretching system as described in U.S. Pat. No. 2,454,515 or a tenter system as described in JP-A-2002-86554 can be preferably employed. The stretching magnification is preferably from 2 times to 12 times, and more preferably from 3 times to times. Furthermore, it can be preferably carried out that the relation among the stretching magnification, the thickness of the raw film and the thickness of the polarizer is regulated at [(thickness of polarizer after sticking the protective film)/(thickness of the raw film)×(total stretching magnification)>0.17] as described in JP-A-2002-040256; and that the relation between the width of the polarizer at the time of leaving a final bath and the width of the polarizer at the time of sticking the protective film is regulated at [0.80≦(width of the polarizer at the time of sticking the protective film)/(width of the polarizer at the time of leaving a final bath)≦0.95] as described in JP-A-2002-040247.

As the drying step, a method which is known by JP-A-2002-86554 can be employed. The temperature range is preferably from 30° C. to 100° C., and the drying time is preferably from 30 seconds to 60 minutes. Furthermore, a thermal treatment in which the discoloration temperature in water is 50° C. or high as described in Japanese Patent No. 3,148,513 and aging in an atmosphere in which the temperature and relative humidity are controlled as described in JP-A-07-325215 and JP-A-07-325218 can also be preferably carried out.

The sticking step of protective film is a step for sticking two protective films on the both surfaces of the foregoing polarizer which has left the drying step. A method in which an adhesive solution is fed immediately before sticking and the polarizer and the protective films are superimposed and stuck by a pair of rollers is preferably employed. Furthermore, as described in JP-A-2001-296426 and JP-A-2002-86554, in order to suppress record groove-like irregularities caused due to stretching of the polarizer, it is preferred to adjust the water content of the polarizer at the time of sticking. In the invention, a water content of from 0.1% to 30% is preferably used.

An adhesive between the polarizer and the protective film is not particularly limited. Examples thereof include PVA based resins (including modified PVAs containing an acetoacetyl group, a sulfonic acid group, a carboxyl group, an oxyalkylene group, etc.) and boron compound aqueous solutions. Of these, PVA based resins are preferable. The thickness of the adhesive layer after drying is preferably from 0.01 to 5 μm, and especially preferably from 0.05 to 3 μm.

Furthermore, in order to improve the adhesive strength between the polarizer and the protective film, it is preferable that the protective film is subjected to a surface treatment and then provided for adhesion. Though the surface treatment method is not particularly limited, examples thereof include known methods such as a saponification method using an alkaline solution and a corona treatment method. Furthermore, after the surface treatment, an easily adhesive layer such as a gelatin undercoating layer may be provided. As described in JP-A-2002-267839, a contact angle between the protective film surface and water is preferably not more than 50°.

The drying condition after sticking follows a method as described in JP-A-2002-86554. However, the temperature range is preferably from 30° C. to 100° C., and the drying time is preferably from 30 seconds to 60 minutes. Furthermore, it is preferred to carry out aging in an atmosphere in which the temperature and relative humidity are controlled as described in JP-A-07-325220.

With respect to the contents of elements in the polarizer, it is preferable that the contents of iodine, boron, potassium and zinc are from 0.1 to 3.0 g/m$^2$, from 0.1 to 5.0 g/m$^2$, from 0.1 to 2.00 g/m$^2$ and from 0 to 2.00 g/m$^2$, respectively. Furthermore, the content of potassium in the polarizer may be not more than 0.2% by weight as described in JP-A-2001-166143; and the content of zinc in the polarizer may be from 0.04% by weight to 0.5% by weight as described in JP-A-2000-035512.

As described in Japanese Patent No. 3,323,255, in order to enhance the dimensional stability of the polarizing plate, it is also possible to add and use an organotitanium compound and/or an organozirconium compound in any one step of the dyeing step, the stretching step and the film hardening step, thereby containing at least one compound selected from an organotitanium compound and an organozirconium compound. Furthermore, for the purpose of adjusting the hue of the polarizing plate, a dichroic dye may be added.

(Characteristics of Polarizing Plate)

(1) Transmittance and Degree of Polarization

The single plate transmittance of the polarizing plate of the invention is preferably from 42.5% to 49.5%, and more preferably from 42.8% to 49.0%. The degree of polarization as defined by the expression 4 is preferably in the range of from 99.900% to 99.999%, and more preferably from 99.940% to 99.995%. The parallel transmittance is preferably in the range of from 36% to 42%, and the crossed transmittance is preferably in the range of from 0.001% to 0.05%. The dichroic ratio as defined by the following expression 5 is preferably in the range of from 48 to 1,215, and more preferably from 53 to 525.

The foregoing transmittance is defined by the following expression on the basis of JIS Z8701.

$$T = K \int S(\lambda) y(\lambda) \tau(\lambda) d\lambda$$

In the foregoing expression, K, $S(\lambda)$, $y(\lambda)$, and $\tau(\lambda)$ are as follows.

$$K = \frac{100}{\int S(\lambda) y(\lambda) d\lambda} \quad (3)$$

$S(\lambda)$: Spectral distribution of standard light to be used in the color display $y(\lambda)$: Color matching function of the XYZ system $\tau(\lambda)$: Spectral transmittance The degree of polarization is defined by the following expression 4.

$$\text{Degree of } polaraizaion(\%) = 100 \times \sqrt{\frac{\text{Parallel transmission} - \text{cross transmission}}{\text{Parallel transmission} - \text{cross transmission}}} \quad (4)$$

The dichroic ratio is defined by the following expression 5.

$$\text{Dichroic ratio } (Rd) = \frac{\log\left[\frac{\text{Single plate transmission}}{100}\left(1 - \frac{\text{Degree of polarization}}{100}\right)\right]}{\log\left[\frac{\text{Single plate transmission}}{100}\left(1 + \frac{\text{Degree of polarization}}{100}\right)\right]} \quad (5)$$

The iodine concentration and single plate transmittance may be in the ranges as described in JP-A-2002-258051.

The parallel transmittance may be less in wavelength dependency as JP-A-2001-083328 and JP-A-2002-022950. When the polarizing plate is disposed in the crossed Nicols configuration, the optical characteristic may be in the range as described in JP-A-2001-091736; and the relation between the parallel transmittance and the crossed transmittance may be in the range as described in JP-A-2002-174728.

As described in JP-A-2002-221618, a standard deviation of the parallel transmittance at every 10 nm of a wavelength of light of from 420 to 700 nm may be not more than 3, and a minimum value of (parallel transmittance)/(crossed transmittance) at every 10 nm of a wavelength of light of from 420 to 700 nm.

It is also preferable that the parallel transmittance and the crossed transmittance at a wavelength of the polarizing plate of 440 nm, the parallel transmittance and the crossed transmittance at a wavelength of the polarizing plate of 550 nm, and the parallel transmittance and the crossed transmittance at a wavelength of the polarizing plate of 610 nm may be in the ranges as described in JP-A-2002-258042 and JP-A-2002-258043.

(2) Hue

The hue of the polarizing plate of the invention is preferably evaluated by using a lightness index L* and chromaticness indices a* and b* in the L*a*b* colorimetric system as recommended as a CIE uniform perception space.

L*, a* and b* are defined by the following expression 6 by using the foregoing X, Y and Z.

$$L^* = 116(Y/Y_0)^{\frac{1}{3}} - 16 \quad (6)$$

$$a^* = 500\left[(X/X_0)^{\frac{1}{3}} - (Y/Y_0)^{\frac{1}{3}}\right]$$

$$b^* = 200\left[(Y/Y_0)^{\frac{1}{3}} - (Z/Z_0)^{\frac{1}{3}}\right]$$

In the foregoing expression, $X_0$, $Y_0$, and $Z_0$ each represents a tristimulus value of the illumination light source; and in the case of standard light C, $X_0=98.072$, $Y_0=100$, and $Z_0=118.225$, and in the case of standard light $D_{65}$, $X_0=95.045$, $Y_0=100$, and $Z_0=108.892$.

a* of a single polarizing plate is preferably in the range of from −2.5 to 0.2, and more preferably from −2.0 to 0. b* of a single polarizing plate is preferably in the range of from 1.5 to 5, and more preferably from 2 to 4.5. a* of parallel transmitted light of two polarizing plates is preferably in the range of from −4.0 to 0, and more preferably from −3.5 to −0.5. b* of parallel transmitted light of two polarizing plates is preferably in the range of from 2.0 to 8, and more preferably from 2.5 to 7. a* of crossed transmitted light of two polarizing plates is preferably in the range of from −0.5 to 1.0, and more preferably from 0 to 2. b* of crossed transmitted light of two polarizing plates is preferably in the range of from −2.0 to 2, and more preferably from −1.5 to 0.5.

The hue may be evaluated by the chromaticity coordinates (x, y) as calculated from the foregoing X, Y and Z. For example, it is preferably carried out to make the chromaticity ($X_p$, $Y_p$) of the parallel transmitted light of two polarizing plates and the chromaticity ($x_c$, $y_c$) of the crossed transmitted light of two polarizing plates fall within the ranges as described in JP-A-2002-214436, JP-A-2001-166136, and JP-A-2002-169024, respectively or to make the relation between the hue and the absorbance fall within the range as described in JP-A-2001-311827.

(3) Viewing Angle Characteristic

In the case where the polarizing plate is disposed in the crossed Nicols configuration and light having a wavelength of 550 nm is made incident, when vertical light is made incident and when light is made incident from the azimuth of 45° against the polarization axis at an angle of 40° against the normal line, it is also preferred to make the transmittance ratio and the xy chromaticity difference fall within the ranges as described in JP-A-2001-166135 and JP-A-2001-166137, respectively. Furthermore, it can be preferably carried out that a ratio ($T_{60}/T_0$) wherein $T_0$ represents a light transmittance of a polarizing plate laminate as disposed in the crossed Nicols configuration in the vertical direction and $T_{60}$ represents a light transmittance in a direction as inclined by 60° from the normal line of the laminate is regulated at not more than 10,000 as described in JP-A-10-068817; that when natural light is made incident into the polarizing plate at an arbitrary angle from the normal line to an angle of elevation of 80°, a difference of transmittance of transmitted light within a wavelength region of 20 m in the wavelength range of its transmission spectrum of from 520 to 640 nm is regulated at not more than 6% as described in JP-A-2002-139625; and that a difference of luminance of transmitted light in an arbitrary place far from the film by 1 cm is regulated at not more than 30% as described in JP-A-08-248201.

(4) Durability (4-1) Wet Heat Durability

It is preferable that in the case of standing in an atmosphere at 60° C. and 95% RH for 500 hours, a rate of change in each of the light transmittance and the degree of polarization before and after standing is not more than 3% on the basis of the absolute value, as disclosed in JP-A-2001-116922. In particular, it is preferable that a rate of change in the light transmittance is not more than 2% and that a rate of change in the degree of polarization is not more than 1.0% on the basis of the absolute value. Furthermore, it is preferable that after standing at 80° C. and 90% RH for 500 hours, the degree of polarization is 95% or more and the single plate transmittance is 38% or more as described in JP-A-07-077608.

(4-2) Dry Durability

It is preferable that in the case of standing in a dry atmosphere at 80° C. for 500 hours, a rate of change in each of the light transmittance and the degree of polarization before and after standing is not more than 3% on the basis of the absolute value. In particular, a rate of change in the light transmittance is preferably not more than 2%; and a rate of change in the degree of polarization is preferably not more than 1.0%, and more preferably not more than 0.1% on the basis of the absolute value.

(4-3) Other Durability

In addition, it can be preferably carried out that after standing at 80° C. for 2 hours, a rate of shrinkage is regulated at not more than 0.5% as described in JP-A-06-167611; that the x value and y value after allowing a polarizing plate laminate as disposed in the crossed Nicols configuration on the both surfaces of a glass plate in an atmosphere at 69° C. for 750 hours are regulated so as to fall within the ranges as described in JP-A-10-068818; and that a change in a spectral intensity ratio at 105 cm$^{-1}$ and 157 cm$^{-1}$ by the Raman spectroscopy after standing in an atmosphere at 80° C. and 90% RH for 200 hours is regulated so as to fall within the ranges as described in JP-A-08-094834 and JP-A-09-197127.

(5) Degree of Orientation

When the degree of orientation of PVA is high, a good polarization performance is obtained. An order parameter value as calculated by a measure such as polarization Raman scattering and polarization FT-IR is preferably in the range of from 0.2 to 1.0. Furthermore, it can be preferably carried out that a difference between a coefficient of orientation of a high molecular segment of the entire amorphous region of the polarizer and a coefficient of orientation (0.75 or more) of the occupied molecule is regulated to be at least 0.15 as described in JP-A-59-133509; and that a coefficient of orientation of the amorphous region of the polarizer is regulated to be from 0.65 to 0.85, or a degree of orientation of a high-order iodine ion such as $I_3^-$ and $I_5^-$ is regulated to be from 0.8 to 1.0 in terms of an order parameter value as described in JP-A-04-204907.

(6) Other Characteristics

Also, it can be preferably carried out that when heated at 80° C. for 30 minutes, a shrinkage force in the direction of the absorption axis per unit width is regulated at not more 4.0 N/cm as described in JP-A-2002-006133; that in the case of allowing the polarizing plate to stand under a heating condition at 70° C. for 120 hours, both a rate of dimensional change in the direction of the absorption axis of the polarizing plate and a rate of dimensional change in the direction of the polarization axis of the polarizing plate are regulated to fall within ±0.6% as described in JP-A-2002-236213; and that the water content of the polarizing plate is regulated at not more than 3% by weight as described in JP-A-2002-090546. In addition, it can be preferably carried out that the surface roughness in a direction vertical to the stretching axis is regulated at not more than 0.04 μm on the basis of the centerline average roughness as described in JP-A-2000-249832; that a refractive index no in the direction of the transmitting axis is regulated at more than 1.6 as described in JP-A-10-268294; and that the relation between the thickness of the polarizing plate and the thickness of the protective film is regulated so as to fall within the range as described in JP-A-10-1114111.

(Functionalization of Polarizing Plate)

The polarizing plate of the invention is preferably used as a viewing angle enlarging film for LCD, a retardation film (for example, a λ/4 plate) to be applied in a reflection type LCD, an antireflection film for improving the visibility of a display, a luminance improving film, or a functionalized polarizing plate complexed with an optical film having a functional layer such as a hard coat layer, a forward scattering layer, and an antiglare layer.

Figure 1B:
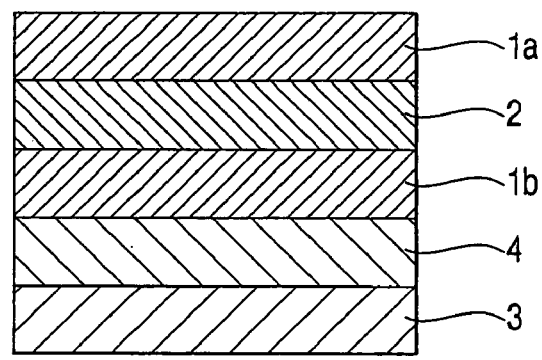

A constructional example of the polarizing plate of the invention complexed with the foregoing functional optical film is shown in FIG. 1. As a protective film 1 in one side of a polarizing plate 5, a functional optical film 3 and a polarizer 2 may be bonded to each other via an adhesive layer (FIG. 1A); and a functional optical film 3 may be bonded to a polarizing plate 5 having protective films 1a, 1b on the both surfaces of a polarizer 2 via an adhesive layer 4 (FIG. 1B). In the former case, an arbitrary transparent protective film may be used for the protective film of the other side. Furthermore, in the polarizing plate of the invention, it is preferable that an optical functional layer is stuck onto the protective film via an adhesive layer, thereby constructing the functional optical film 3 as shown in FIG. 1A. The release strength between the respective layers such as a functional layer and a protective film is regulated as 4.0 N/25 mm or more as described in JP-A-2002-311238. It is preferable that the functional optical film is disposed in the side of a liquid crystal module or in the opposite side to the liquid crystal module, namely the display side or backlight side depending upon a desired function.

(Functional Optical Film)

The functional optical film which is used upon being complexed with the polarizing plate of the invention will be hereunder described.

(1) Viewing Angle Enlarging Film

The polarizing plate of the invention can be used in combination with a viewing angle enlarging film as proposed in display modes such as TN (twisted nematic), IPS (in-plane switching), OCB (optically compensatory band), VA (vertically aligned), and ECB (electrically controlled birefringence) modes.

As the viewing angle enlarging film for TN mode, WV films (manufactured by Fuji Photo Film Co., Ltd.) as described in *Journal of Printing Science and Technology*, Vol. 36, No. 3 (1999), pages 40 to 44, the issue of *Monthly Display* for August 2002, pages 20 to 24, JP-A-4-229828, JP-A-6-75115, JP-A-6-214116, JP-A-8-50206, etc. are preferably combined and used.

A preferred construction of the viewing angle enlarging film for TN mode is one having an oriented layer (alignment layer) and an optically anisotropic layer in this order on the foregoing transparent polymer film. The viewing angle enlarging film may be stuck to the polarizing plate via an adhesive and used. However, it is especially preferable from the viewpoint of realizing a reduction in the thickness that the viewing angle enlarging film is used while serving as one of the protective films of the polarizer as described in *SID '00 Dig.*, page 551 (2000).

The oriented layer can be provided by a measure such as a rubbing treatment of an organic compound (preferably a polymer), oblique vapor deposition of an inorganic compound, and formation of a layer having micro grooves. In addition, an oriented layer whose orientation function is generated by imparting an electrical field, imparting a magnetic field, or irradiating light is known. However, an oriented layer as formed by a rubbing treatment of a polymer is especially preferable. The rubbing treatment is preferably carried out by rubbing the surface of a polymer layer by paper or a cloth several times in a fixed direction. It is preferable that the absorption axis of the polarizer and the rubbing direction are substantially parallel to each other. With respect to the kind of the polymer to be used in the oriented layer, polyimide, polyvinyl alcohol, a polymerizable group-containing polymer as described in JP-A-9-152509, and the like can be preferably used. The thickness of the oriented layer is preferably from 0.01 to 5 μm, and more preferably from 0.05 to 2 μm.

It is preferable that the optically anisotropic layer contains a liquid crystalline compound. It is especially preferable that the liquid crystalline compound which is used in the invention is a discotic compound (discotic liquid crystal). The discotic liquid crystal molecule has a structure in which a disc-like core segment is present and side chains radially extend therefrom, as triphenylene derivatives represented by the following formula. In order to impart stability with time, it is also preferably carried out to further introduce a group capable of causing reaction by heat, light, etc. Preferred examples of the foregoing discotic liquid crystal are described in JP-A-8-50206.

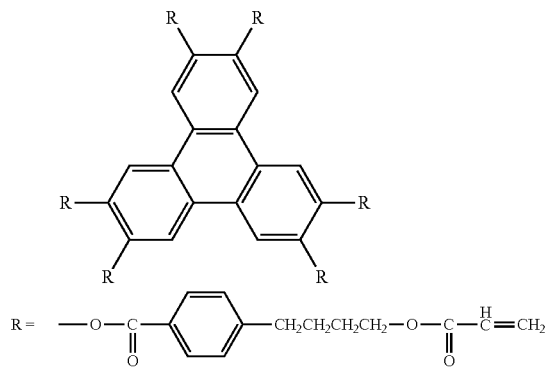

The discotic liquid crystal molecule is oriented substantially parallel to the film plane with a pre-tilt angle against the rubbing direction in the vicinity of the oriented layer, and in the opposite air surface side, the discotic liquid crystal molecule stands up and is oriented in a substantially vertical form against the plane. The whole of the discotic liquid crystal layer takes hybrid orientation, and viewing angle enlargement of TFT-LCD of a TN mode can be realized by this layer structure.

The foregoing optically anisotropic layer is generally obtained by coating a solution of a discotic compound and other compound (additionally, for example, a polymerizable monomer and a photopolymerization initiator) dissolved in a solvent on the oriented layer, drying, heating to the discotic nematic phase forming temperature, polymerizing upon irradiation of UV light or by other means, and then cooling. The discotic nematic liquid crystal phase-solid phase transition temperature of the discotic liquid crystalline compound which is used in the invention is preferably from 70 to 300° C., and especially preferably from 70 to 170° C.

Furthermore, as other compound that the discotic compound to be added in the foregoing optically anisotropic layer, any compound can be used so far as it has compatibility with the discotic compound and can give a preferred change of the tilt angle to the liquid crystalline discotic compound or does not hinder the orientation. Of these, polymerizable monomers (for example, compounds containing a vinyl group, a vinyloxy group, an acryloyl group, or a methacryloyl group), additives for orientation control in the air interface side (for example, fluorine-containing triazine compounds), and polymers (for example, cellulose acetate, cellulose acetate propionate, hydroxypropyl cellulose, and cellulose acetate butyrate) can be enumerated. Such a compound can be generally used in an amount of addition of from 0.1 to 50% by weight, and preferably from 0.1 to 30% by weight to the discotic compound.

The thickness of the optically anisotropic layer is preferably from 0.1 to 10 μm, and more preferably from 0.5 to 5 μm.

A preferred embodiment of the viewing angle enlarging film is constructed of a cellulose acylate film as a transparent base material film, an oriented layer provided thereon, and an optically anisotropic layer made of a discotic liquid crystal as formed on the subject oriented layer, in which the optically anisotropic layer is crosslinked upon irradiation with UV light.

Furthermore, in addition to the above, in the case where the viewing angle enlarging film is combined with the polarizing plate of the invention, for example, it can be preferably carried out that a retardation plate having an optical axis in a direction crossing the plate surface to exhibit anisotropy against birefringence is laminated as described in JP-A-07-198942; and that a rage of dimensional change of the protective film is made substantially equal to a rate of dimensional change of the optically anisotropic layer as described in JP-A-2002-258052. Furthermore, it can be preferably carried out that the water content of the polarizing plate to be stuck to the viewing angle enlarging film is regulated at not more than 2.4% as described in JP-A-12-258632; and that the contact angle between the surface of the viewing angle enlarging film and water is regulated at not more than 70° as described in JP-A-2002-267839.

The viewing angle enlarging film for liquid crystal cell of an IPS mode is used for optically compensating the liquid crystal molecule which orients parallel to the base material surface and improving a viewing angle characteristic of the crossed transmittance of the polarizing plate at the time of black display in the state that no electrical field is applied. In the IPS mode, black display is revealed in the state that no electrical field is applied, and the transmission axes of a pair of upper and lower polarizing plates are crossed to each other. However, when observed obliquely, the crossed angle of the transmission exes is not 90°, and light leakage is generated, resulting in a lowering of the contrast. When the polarizing plate of the invention is used in a liquid crystal cell of an IPS mode, for the purpose of lowering the light leakage, it is preferably used in combination with a viewing angle enlarging film having an in-plane retardation close to 0 and having retardation in the thickness direction as described in JP-A-10-54982.

The viewing angle enlarging film for liquid crystal cell of an OCB mode is used for optically compensating the liquid crystal molecule which orients vertically in the center of the liquid crystal layer by the application of an electrical field and orients obliquely in the vicinity of the interface of the base material and improve a viewing angle characteristic of black display. When the polarizing plate of the invention is used in a liquid crystal cell of an OCB mode, it is preferably used in combination with a viewing angle enlarging film in which a disc-like liquid crystalline compound is subjected to hybrid orientation as described in U.S. Pat. No. 5,805,253.

The viewing angle enlarging film for liquid crystal cell of a VA mode improves a viewing angle characteristic of black display in the state that the liquid crystal molecule orients vertically to the base material surface in the state that no electrical field is applied. Such a viewing angle enlarging film is preferably used in combination with a film having an in-plane retardation close to 0 and having retardation in the thickness direction as described in U.S. Pat. No. 2,866,372, a film in which a disc-like compound orients parallel to the base material, a film in which stretched films having the same in-plane retardation value are laminated and disposed such that the slow axes are crossed to each other, or a laminate of films made of a rod-like compound such as a liquid crystal molecule for the purpose of preventing deterioration of the crossed transmittance of the polarizing plate in the oblique direction.

Also a norbornene-type resin film or a film having a phase difference by stretching polycarbonate resin can be employed advantageously as a viewing angle-expanding film or a part thereof.

(2) Retardation Film

It is preferable that the polarizing plate of the invention has a retardation layer. As the retardation layer in the invention, a λ/4 plate is preferable, and when the polarizing plate of the invention is stacked with a λ/4 plate, it can be used as a circularly polarizing plate. The circularly polarizing plate has a function to convert the incident light into circularly polarized light and is preferably utilized in a reflection type liquid crystal display device, a semi-transmission type liquid crystal display device, or an organic EL element.

In order to obtain substantially complete circularly polarized light in the wavelength range of visible light, it is preferable that the λ/4 plate which is used in the invention is a retardation film having a retardation (Re) of substantially ¼ of the wavelength in the wavelength range of visible light. The "retardation of substantially ¼ of the wavelength in the wavelength range of visible light" means a range which meets the relation in which in the wavelength of from 400 to 700 nm, the longer the wavelength, the larger the retardation is, a retardation value as measured at a wavelength of 450 nm (Re450) is from 80 to 125 nm, and a retardation value as measured at a wavelength of 590 nm (Re590) is from 120 to 160 nm. [(Re590−R450)≧5 nm] is more preferable, and [(Re590−R450)≦10 nm] is especially preferable.

The λ/4 plate which is used in the invention is not particularly limited so far as it meets the foregoing condition. Examples thereof include known λ/4 plates such as λ/4 plates resulting from laminating plural polymer films as described in JP-A-5-27118, JP-A-10-68816, and JP-A-10-90521; λ/4 plates resulting from stretching a single polymer film as described in WO 00/65384 and WO 00/26705; and λ/4 plates having at least one optically anisotropic layer on a polymer film as described in JP-A-2000-284126 and JP-A-2002-31717. Furthermore, the direction of the slow axis of the polymer film and the orientation direction of the optically anisotropic layer can be disposed in an arbitrary direction adaptive with the liquid crystal cell.

In the circularly polarizing plate, though the slow axis of the λ/4 plate and the transmission axis of the foregoing polarizer can be crossed to each other at an arbitrary angle, they are preferably crossed to each other at an angle within the range of 45°±20°. However, the slow axis of the λ/4 plate and the transmission axis of the foregoing polarizer may be crossed to each other at an angle outside the foregoing range.

When the λ/4 plate is constructed by stacking a λ/4 plate and a λ/2 plate, it is preferred to stick the both plates in such a manner that an angle between the in-plane slow axes of the λ/4 plate and the λ/2 plate and the transmission axis of the polarizing plate is 75° and 15°, respectively, as disclosed in Japanese Patent No. 3236304 and JP-A-10-68816.

(Adhesive)

In the following, an adhesive preferably employed in the invention will be explained.

A usable adhesive may be formed by a base polymer based on acrylic acid, methacrylic acid, butyl rubber or silicone. A base polymer formed by a (meth)acrylate ester such as butyl (meth)acrylate, ethyl(meth)acrylate, isooctyl(meth)acrylate or 2-ethylhexyl(meth)acrylate, or a copolymerized based polymer utilizing two or more of such (meth)acrylate esters can be employed advantageously, though such examples are not restrictive. In an adhesive, a polar monomer is usually copolymerized in such base polymer. The polar monomer can be, for example, a monomer having a carboxyl group, a hydroxyl group, an amide group, an amino group or an epoxy group, such as (meth)acrylic acid, 2-hydroxyethyl(meth)acrylate, 2-hydroxypropyl(meth)acrylate, (meth)acrylamide, N,N-dimethylaminoethyl(meth)acrylate or glycidyl(meth)acrylate.

The adhesive usually contains a crosslinking agent, which can be a compound capable of forming a carboxylic acid metal salt with a divalent or multi-valent metal ion, an amide bond with a polyamine compound, an ester bond with a polyepoxy compound or a polyol, or an amine bond with a polyisocyanate compound, and such compound is mixed, either singly or in a mixture of two or more kinds, as a crosslinking agent in the base polymer.

The adhesive layer of the invention preferably has a thickness of 2-50 μm. On a surface of the adhesive layer, opposite to the polarizing plate, a separable film is usually attached for protecting the adhesive layer. The separable film is formed for example by a polyester film, rendered releasable for example with a silicone resin. The separable film is peeled off at the adhesion to a liquid crystal cell or to another optical functional film.

(Liquid Crystal Display Utilizing Polarizing Plate)

In the following, a liquid crystal display utilizing the polarizing plate of the invention will be explained. A liquid crystal display of the invention includes, on both sides of a liquid crystal cell, two polarizing plates at least one of which is a polarizing plate of the invention.

Figure 2:
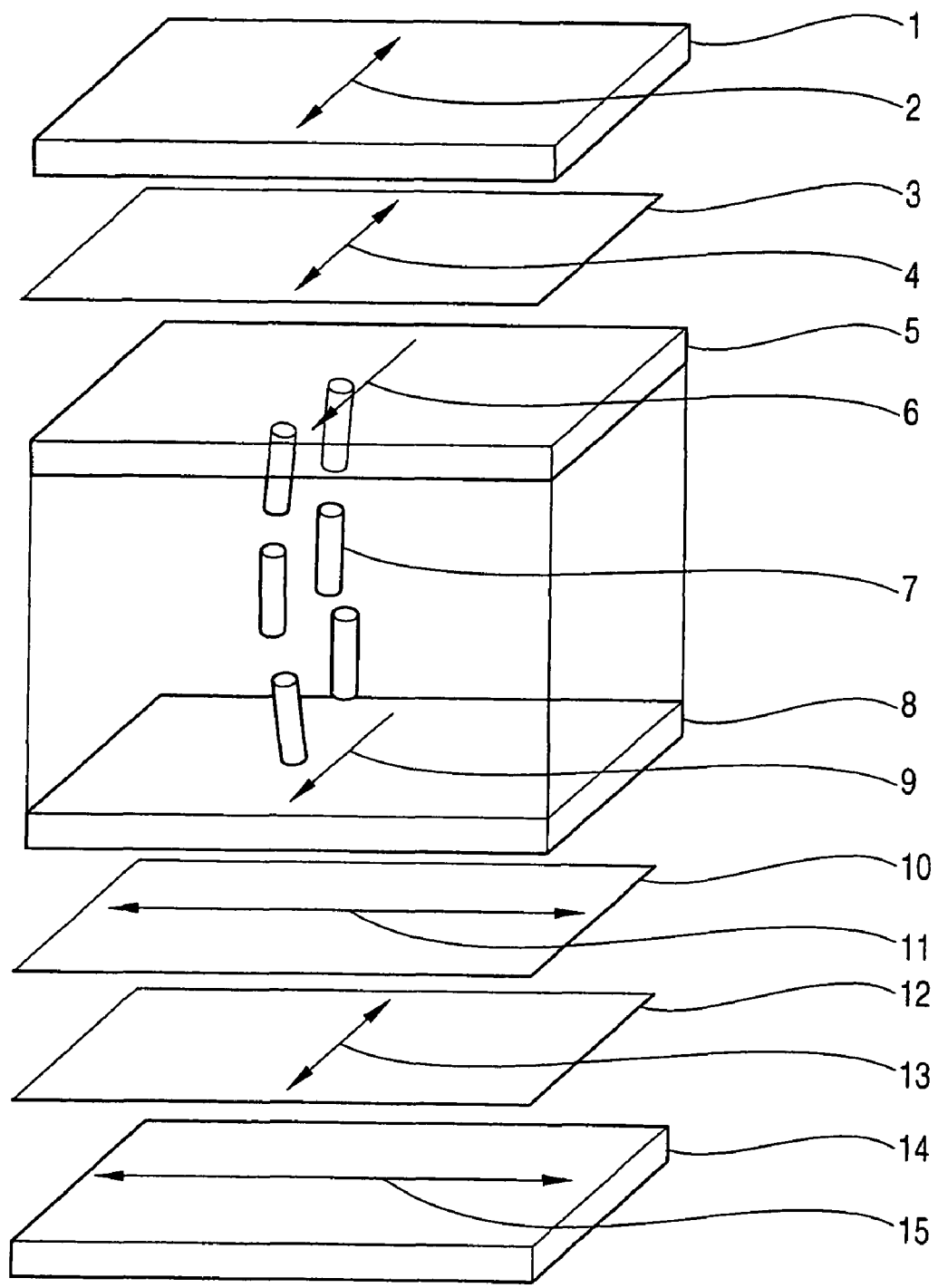
FIG. 2 is a schematic view showing an exemplary embodiment of a liquid crystal display of the present invention.

The liquid crystal display device as illustrated in FIG. 2 has a liquid crystal cell (5 to 9) and an upper polarizing plate 1 and a lower polarizing plate 14 disposed so as to interpose the liquid crystal cell (5 to 9) therebetween. Though the polarizing plate is interposed by a polarizer and a pair of transparent protective films, in FIG. 2, the polarizing plate is shown as an integrated polarizing plate, and a detail structure is omitted.

The liquid crystal cell is composed of a liquid crystal layer which is formed of an upper electrode substrate 5 and a lower electrode substrate 8 and a liquid crystal molecule 7 as interposed therebetween. The liquid crystal cell is classified into various display modes such as TN (twisted nematic), IPS (in-plane switching), OCB (optically compensatory band), VA (vertically aligned), and ECB (electrically controlled birefringence) modes depending upon a difference in the orientation state of the liquid crystal molecule which performs an ON/OFF display. The polarizing plate of the invention can be used in any display mode regardless of the transmission type or reflection type.

Among these modes, OCB or VA mode is preferred.

An oriented film (not shown) is formed on the surface of each of the electrode substrates 5 and 8 coming into contact with the liquid crystal molecule 7 (hereinafter sometimes referred to as "inner surface"), and the orientation of the liquid crystal molecule 7 in the state that no electrical field is applied or in the state that a low electrical field is applied is controlled by a rubbing treatment as applied on the oriented film or the like. Furthermore, a transparent electrode (not shown) capable of applying an electrical field to the liquid crystal layer composed of the liquid crystal molecule 7 is formed on the inner surface of each of the electrode substrates 5 and 8.

Rubbing of a TN mode is applied in such a manner that the rubbing directions are crossed to each other on the upper and lower substrates, and the size of a tilt angle can be controlled by the strength and number of rubbing. The oriented film is formed by coating a polyimide film and then baking it. The size of a twist angle of the liquid crystal layer is determined by a crossing angle in the rubbing directions on the upper and lower substrates and a chiral agent to be added to a liquid crystal material. In order that the twist angle may become 90°, a chiral agent having a pitch of about 60 μm is added.

Incidentally, the twist angle is set up in the vicinity of 90° (from 85 to 95°) in the case of monitors of notebook PC and PC and liquid crystal display devices for TV and is set up at from 0 to 70° in the case of use as a reflection type display device such as mobile telephones. Furthermore, in an IPS mode or ECB mode, the twist angle is 0°. In the IPS mode, an electrode is disposed only on the lower substrate 13, and an electrical field parallel to the substrate surface is applied. Moreover, in an OCB mode, a twist angle does not exist, and a tilt angle is made large; and in a VA mode, the liquid crystal molecule 7 orients vertically to the upper and lower substrates.

Here, the size of the product (Δnd) of the thickness (d) of the liquid crystal layer and the anisotropy (Δn) changes the brightness at the time of white display. For this reason, in order to obtain the maximum brightness, its range is set up at every display mode.

In general, by performing lamination so as to make a crossing angle between an absorption axis 2 of the upper polarizing plate 1 and an absorption axis 15 of the lower polarizing plate 14 substantially orthogonal, a high contrast is obtained. In the liquid crystal cell, a crossing angle between the absorption axis 2 of the upper polarizing plate 1 and the rubbing direction of the upper substrate 5 varies depending upon the liquid crystal display mode. In the TN mode and IPS mode, the crossing angle is generally set up either parallel or vertical. In the OCB mode and ECB mode, the crossing angle is often set up at 45°. However, for the purpose of adjusting the color tone of the display color or viewing angle, the optimum value is different in every display mode, and therefore, the crossing angle is not limited to the foregoing ranges.

The liquid crystal display device in which the polarizing plate of the invention is used is not limited to the construction as shown in FIG. 2 but may contain other members. For example, a color filter may be disposed between the liquid crystal cell and the polarizer. Furthermore, viewing angle enlarging filters as described previously can be separately disposed between the liquid crystal cell and the polarizing plate. The polarizing plates 1 and 14 and the optical compensation layers (viewing angle enlarging films) 3 and 05 may be disposed in a laminated state as stuck with an adhesive or may be disposed as a so-called integrated elliptical polarizing plate in which the one-sided protective film in the side of the liquid crystal cell is used for enlarging the viewing angle.

Furthermore, in the case where the liquid crystal display device in which the polarizing plate of the invention is used as a transmission type, a cold cathode or hot cathode fluorescent tube, or a backlight using, as a light source, a luminescent diode, a field emission element, or an electro-luminescent element can be disposed in the back side. Moreover, the liquid crystal display device in which the polarizing plate of the invention is used may be of a reflection type. In such case, only one polarizing plate may be disposed in the viewing side, and a reflection film is disposed in the back side of the liquid crystal cell or on the inner surface of the lower substrate of the liquid crystal cell. As a matter of course, a front light using the foregoing light source may be provided in the viewing side of the liquid crystal cell. The liquid crystal display of the invention is preferably a liquid crystal display of VA mode utilizing the polarizing plate of the invention at a backlight side of a liquid crystal cell.

EXAMPLES

Example 1-1

Preparation of Optical Compensation Sheet A-1

(Preparation of Polarizing Plate Protective Film A-1)
(Preparation of Cellulose Acylate Film)
A following composition was charged in a mixing tank and agitated under heating to dissolve components, thereby obtaining a cellulose acylate solution A.

| <Composition of cellulose acylate solution A> | |
|---|---|
| cellulose acylate with a substitution degree of 2.86 | 100 parts by mass |
| triphenyl phosphate (plasticizer) | 7.8 parts by mass |
| biphenyldiphenyl phosphate (plasticizer) | 3.9 parts by mass |
| methylene chloride (first solvent) | 300 parts by mass |
| methanol (second solvent) | 54 parts by mass |
| 1-butanol | 11 parts by mass |

A following composition was charged in another mixing tank and agitated under heating to dissolve components, thereby obtaining an additive solution B.

| <Composition of solution B> | |
|---|---|
| methylene chloride (first solvent) | 80 parts by mass |
| methanol (second solvent) | 20 parts by mass |
| positive birefringent additive (compound 16) | 30 parts by mass |
| negative birefringent additive (benzyl methacrylate oligomer) | 70 parts by mass |

<Preparation of Cellulose Acetate Film Sample CAF-01>

In 477 parts by mass of the cellulose acylate solution A, 20 parts by mass of the additive solution B were added and the mixture was sufficiently agitated to obtain a dope. The dope was cast from a casting slot onto a band cooled to 10° C. An obtained film was peeled at a solvent content of 50 mass %, and stretched by a tenter in a state with a solvent content of 5 to 40 mass % and with a stretch rate of 1.15 times in a transversal direction (perpendicular to the machine direction), followed by a drying. It was then further dried by being conveyed between rolls of a heat treatment apparatus to obtain a cellulose acetate film sample A-1 of a thickness of 80 μm.

The sample A-1 was subjected to a measurement of optical characteristics, whose results are summarized in Table 1.
(Preparation of Polarizer)

PVA of an average polymerization degree of 4,000 and a saponification degree of 99.8 mol. % was dissolved in water to obtain a 4.0% aqueous solution. This solution was cast on a band, utilizing a tapered die, and dried to obtain a film having, before stretching, a width of 110 mm and a thickness of 120 μm at a left-hand edge and 135 μm at a right-hand edge.

The film was peeled from the band, then diagonally stretched in a 45° direction in a dry state, immediately immersed in an aqueous solution of iodine by 0.5 g/L and potassium iodide by 50 g/L for 1 minute at 30° C., then immersed in an aqueous solution of boric acid by 100 g/L and potassium iodide by 60 g/L for 5 minutes at 70° C., then rinsed with water in a rinsing tank for 10 seconds at 20° C. and dried for 5 minutes at 80° C. to obtain an iodine-based polarizer (HF-01). The polarizer had a width of 660 mm and a thickness of 20 μm at the left- and right-hand edges.
(Preparation of Polarizing Plate HB-1)

The stretched film (A-1) was adhered, with a polyvinyl alcohol-based adhesive, on a surface of the polarizer (HF-01). A triacetyl cellulose film: Fujitac TD-80 U was subjected to a surface saponification, in the same manner as the saponification described in WO02/46809, Example 1, and was adhered to the other surface of the polarizer with a polyvinyl alcohol-based adhesive.

A transmission axis of the polarizer was positioned perpendicular to a slow axis of the stretched film (A-1) and the triacetyl cellulose film.

Figure 3:
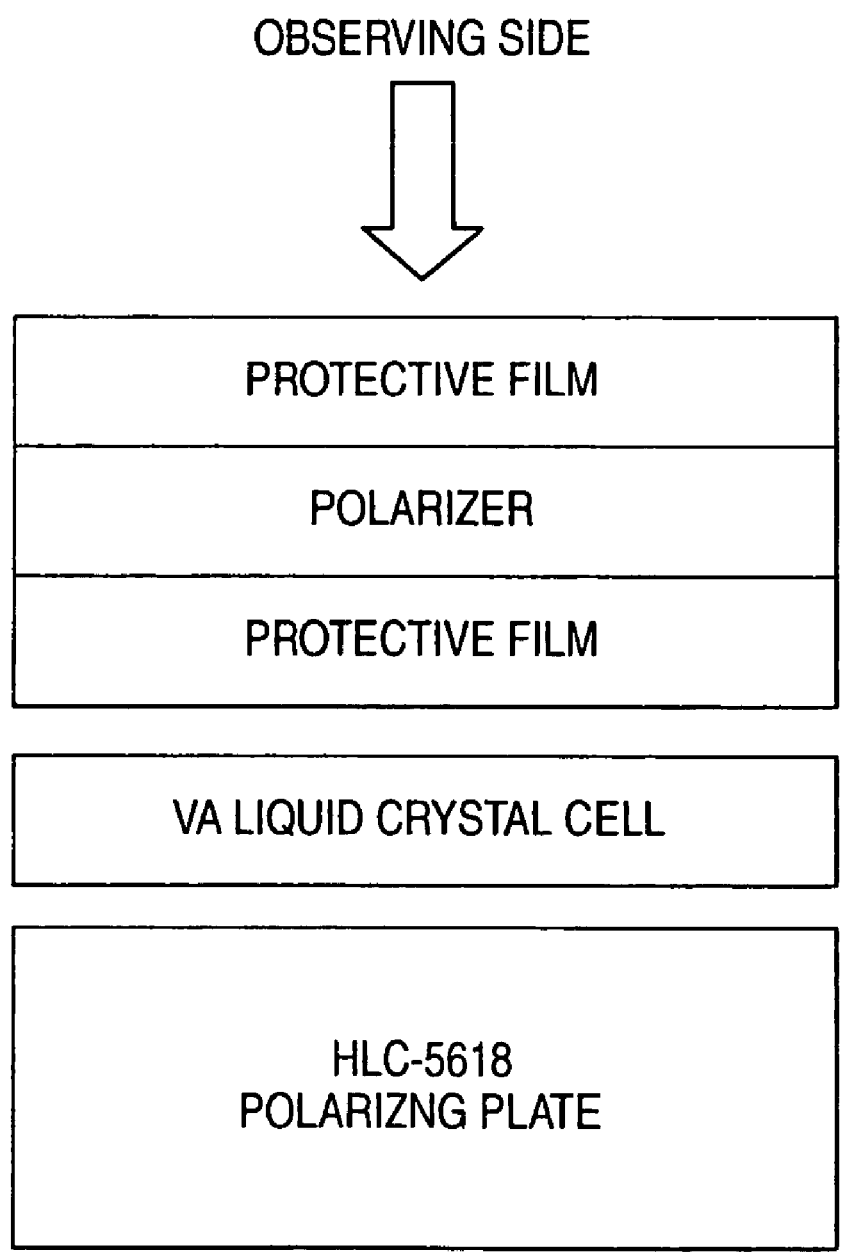
FIG. 3 is a view showing an exemplary embodiment of a composite structure of a polarizing plate a optical functional film, employed in Examples.

A polarizing plate (HB-1) thus prepared was used for preparing a liquid crystal display shown in FIG. 3. An upper polarizing plate, a VA-mode liquid crystal cell (upper substrate, liquid crystal layer and lower substrate), and a lower polarizing plate (HB-01) were laminated and a backlight source was provided, in an order from an observing side (upper side). In the following examples, a commercially available polarizing plate (HLC2-5618) was used for the upper polarizing plate, and the polarizing plate of the invention was used for the lower polarizing plate.
<Preparation of Liquid Crystal Cell>

A liquid crystal cell was prepared by employing a cell gap of 3.6 μm between substrates and by pouring and sealing a liquid crystal material of a negative dielectric anisotropy (MLC6608, manufactured by Merck Inc.) between the substrates, thereby forming a liquid crystal layer therebetween. The liquid crystal layer had a retardation (product Δn·d of a thickness d (μm) of the liquid crystal layer and a refractive index anisotropy Δn) of 275 nm, and was vertically oriented.

Example 1-2

A film A-2 was prepared in the same manner as in Example 1, except that the positive birefringent additive (compound 16) was replaced by a positive birefringent additive (compound 1) of a same amount and that styrene-maleic anhydride copolymer (Dylark D332, manufactured by Sekisui Chemical Co. Ltd.) was used as a negative birefringent additive. Also a liquid crystal display was prepared in the same manner as in Example 1, except that the film A-1 was replaced by the film A-2.

Comparative Example 1-1

A film B-1 was prepared in the same manner as in Example 1, except that the negative birefringent additive (benzyl methacrylate oligomer) was not added.

Comparative Example 1-2

A film B-2 was prepared in the same manner as in Example 1, except that the retardation controlling agent (compound 16) was not added.

Comparative Example 1-3

Polycarbonate was fused under heating, and a styrene oligomer was added in an amount of 25 wt. % to the polycarbonate. After both components were uniformly kneaded, the resulting mixed melt was pressed between two glass plates to obtain an optical resin film of a thickness of about 115 μm. The optical resin film was stretched to 1.5 times at 170° C. to obtain a film B-3.
<Measurement of Physical Properties of Film>
(Measurement of Optical Properties)

As the optical characteristics, Re and Rth were measured at 25° C., 60% RH with an automatic birefringence meter (KOBRA-21ADH, manufactured by Oji Keisoku Kiki Co.), at measuring wavelengths of 480, 546 and 628 nm.

Table 1 summarizes results of physical property measurements of the film. A contrast was evaluated by an average luminance (Cd/m$^2$) in measurements with a polar angle of 60° and in 10 points in the entire directional angle, and a variation in 10 points which is (difference between maximum and minimum in 10-point measurements)/average luminance (%). Thus a film having a smaller average luminance and a smaller luminance variation can provide a display of a higher contrast and a smaller viewing angle dependence.

TABLE 1

| Optical compensation sheet | Thickness (μm) | Re (nm) | | | | | Rth (nm) | | | | | Contrast evaluation (Cd/m2) | | Remarks |
| | | 480 nm | 546 nm | 628 nm | 480 nm/ 546 nm | 480 nm/ 628 nm | 480 nm | 546 nm | 628 nm | 480 nm/ 546 nm | 480 nm/ 628 nm | average | variation | |
| A-1 | 92 | 63 | 81 | 98 | 0.78 | 1.21 | 198 | 187 | 182 | 1.06 | 0.97 | 0.06 | 34% | invention |
| A-2 | 88 | 33 | 67 | 105 | 0.49 | 1.57 | 224 | 206 | 190 | 1.09 | 0.92 | 0.04 | 18% | invention |

TABLE 1-continued

| Optical compensation sheet | Thickness (μm) | Re (nm) 480 nm | Re (nm) 546 nm | Re (nm) 628 nm | Re (nm) 480 nm/ 546 nm | Re (nm) 480 nm/ 628 nm | Rth (nm) 480 nm | Rth (nm) 546 nm | Rth (nm) 628 nm | Rth (nm) 480 nm/ 546 nm | Rth (nm) 480 nm/ 628 nm | Contrast evaluation (Cd/m2) average | Contrast evaluation (Cd/m2) variation | Remarks |
|---|---|---|---|---|---|---|---|---|---|---|---|---|---|---|
| B-1 | 91 | 98 | 85 | 79 | 1.15 | 0.93 | 192 | 184 | 182 | 1.04 | 0.99 | 0.08 | 48% | comp. ex. |
| B-2 | 92 | 33 | 12 | −32 | 2.75 | −2/67 | 202 | 186 | 175 | 1.09 | 0.11 | 0.11 | 52% | comp. ex. |
| B-3 | 94 | 92 | 114 | 145 | 0.81 | 1.27 | 100 | 117 | 136 | 0.85 | 0.11 | 0.11 | 34% | comp. ex. |

<Evaluation of Color Hue Change>

In the liquid crystal display prepared in Example 2, Comparative Examples 1 and 3, a color hue change in front between immediately after the display was turned on and after the display was turned on for 500 hours in an environment of 30° C., 80% RH was measured by EZcontrast, manufactured by ELDIM Co. to determine absolute color hue changes Δx, Δy on the x-y chromaticity chart. Results are shown in Table 2.

TABLE 2

| Sample | Δx | Δy | Remarks |
|---|---|---|---|
| liquid crystal display 1 | 0.02 | 0.01 | invention |
| liquid crystal display 2 | 0.07 | 0.09 | comp. ex. |
| liquid crystal display 3 | 0.13 | 0.12 | comp. ex. |

Results in Table 2 indicate that the polarizing plate utilizing the optical compensation sheet of the invention is advantageous in showing little color hue change, when incorporated in a liquid crystal display, even after a prolonged operation.

Example 2-1

Preparation of Cellulose Acylate Film 1>

A following composition was charged in a mixing tank and agitated under heating to dissolve components, thereby obtaining a cellulose acylate solution.

| (Composition of cellulose acylate solution A) | |
|---|---|
| Cellulose acetate with a substitution degree of 2.75 | 100.0 parts by mass |
| Triphenyl phosphate (plasticizer) | 9.0 parts by mass |
| Ethylphthalylethyl glycolate (plasticizer) | 3.5 parts by mass |
| Polystyrene (additive with negative intrinsic birefringence, manufactured by Aldrich Inc., Mw: 800) | 2.0 parts by mass |
| Methylene chloride (first solvent) | 403.0 parts by mass |
| Methanol (second solvent) | 60.2 parts by mass |

(Preparation of Matting Agent Solution)

A following composition was charged in a mixing tank and agitated under heating to dissolve components, thereby obtaining a matting agent solution.

| (Composition of matting agent solution) | |
|---|---|
| Silica particles of an average particle size of 16 nm (AEROSIL R972, manufactured by Nippon Aerosil Co.) | 2.0 parts by mass |
| Methylene chloride (first solvent) | 72.4 parts by mass |
| Methanol (second solvent) | 10.8 parts by mass |
| Cellulose acetate solution A | 0.3 parts by mass |

(Preparation of Cellulose Acylate Film 1)

98.7 parts by pass of the cellulose acetate solution A and 1.3 parts by mass of the matting agent solution were mixed after respective filtrations, and was cast by a band casting mathicne. An obtained film was peeled from the band at a residual solvent content of 35%, then transversally stretched by a tenter with a stretching magnification of 35% at 130° C., and was retained at a width after stretching for 30 seconds at 140° C. Then the film was unclipped and dried for 40 minutes at 140° C. to obtain a cellulose acylate film 1. The obtained cellulose acylate film 1 had a residual solvent amount of 0.2% and a film thickness of 92 μm.

Example 2-2

Preparation of cellulose acylate film 2>

A following composition was charged in a mixing tank and agitated under heating to dissolve components, thereby obtaining a cellulose acylate solution B.

| (Composition of cellulose acylate solution B) | |
|---|---|
| Cellulose acetate with a substitution degree of 2.75 | 100.0 parts by mass |
| Triphenyl phosphate (plasticizer) | 9.0 parts by mass |
| Ethylphthalylethyl glycolate (plasticizer) | 3.5 parts by mass |
| Polystyrene (additive with negative intrinsic birefringence, manufactured by Aldrich Inc., Mw: 800) | 1.0 parts by mass |
| Methylene chloride (first solvent) | 403.0 parts by mass |
| M0ethanol (second solvent) | 60.2 parts by mass |

(Preparation of Cellulose Acylate Film 2)

98.7 parts by pass of the cellulose acetate solution B and 1.3 parts by mass of the matting agent solution were mixed after respective filtrations, and was cast by a band casting mathicne. An obtained film was peeled from the band at a residual solvent content of 35%, then transversally stretched by a tenter with a stretching magnification of 18% at 130° C., and was retained at a width after stretching for 30 seconds at 140° C. Then the film was unclipped and dried for 40 minutes at 140° C. to obtain a cellulose acylate film 2. The obtained cellulose acylate film 1 had a residual solvent amount of 0.3% and a film thickness of 94 μm.

Example 2-3

Preparation of stretched cycloolefin Polymer Film 1

(Synthesis of Cycloolefin Polymer 1)

In a nitrogen-substituted reactor, 225 parts of 8-methyl-8-carboxymethyltetracyclo[4.4.0.12,5.17,10]-3-dodecene as the specified monomer a, 25 parts of bicyclo[2.2.1]hept-2-ene as the specified monomer b, 18 parts of 1-hexene as the molecular weight regulating agent, and 750 parts of toluene as the solvent were charged, and a resulting solution was heated at 60° C. Then, to the solution in the reactor, 0.62 parts of a solution containing triethylaluminum by 1.5 mol/L and 3.7 parts of a solution containing tungsten hexachloride denatured with t-butanol and methanol (t-butanol:methanol:tungsten=0.35 moles:0.3 moles:1 mole) with a concentration of 0.05 mol/L as the polymerization catalyst were added, and the mixture was heated at 80° C. for 3 hours under agitation to execute a ring-opening copolymerization, thereby obtaining a solution of a ring-opening copolymer.

The polymerization reaction had a conversion rate of 97%, and a ring-opening copolymer constituting the obtained solution of the ring-opening copolymer had an inherent viscosity ($\eta_{inh}$) of 0.65 dl/g in chloroform at 30° C.

4000 parts of the obtained ring-opening copolymer solution were charged in an autoclave, then 0.48 parts of carbonylchlorohydridetris(triphenylphosphine)ruthenium: RuHCl(CO)[P($C_6H_5$)$_3$]$_3$ were added, and the mixture was heated and agitated for 3 hours under conditions of a hydrogen gas pressure of 100 kg/$cm^2$ and a reaction temperature 165° C. to execute a hydrogenation reaction.

The obtained reaction solution (hydrogenated polymer solution) was cooled, and hydrogen gas was released. Then the reaction solution was poured into a large amount of methanol, and a resulting precipitate was separated and dried to obtain a hydrogenated polymer (hereinafter also called "cycloolefin polymer 1").

The obtained cycloolefin polymer 1 had a hydrogenation rate of 99.9% as measured by 400 MHZ $^1$H-NMR spectrum.

Also a proportion of the structural unit b, derived from bicyclo[2.2.1]hept-2-ene, in the cycloolefin polymer 1 was determined as 20.1% by a measurement by 400 MHz $^1$H-NMR spectrum, based on an absorption peak of a methyl proton in the methyl ester of the structural unit a derived from 8-methyl-8-carboxymethyltetracyclo[4.4.0.12,5.17,10]-3-dodecene and appearing at about 3.7 ppm, and on an absorption peak of a proton of alicyclic structures of the structural units a and b appearing at 0.15-3 ppm. Also gel permeation chromatography (GPC) was used to obtain a fraction with a weight-average molecular weight, converted into polystyrene, of 10,000 or less, a fraction with a molecular weight exceeding 10,000 but equal to or less than 30,000 and a fraction with a molecular weight exceeding 30,000, and a proportion of the structural unit b was confirmed in each fraction, by 400 MHz $^1$H-NMR. As a result, a fluctuation from the average proportion of 20.1% in the entire cycloolefin polymer 1 was 15% or less in all the fractions.

(Preparation of Cycloolefin Polymer Film 1)

The cycloolefin polymer film 1 was dissolved in toluene so as to obtain a concentration of 30%. An obtained solution had a viscosity at the room temperature of 30,000 mPa·s.

Then pentaerythrityltetrakis[3-(3,5-di-t-butyl-4-hydroxyphenyl) propionate] as an antioxidant in an amount of 0.1 parts by mass with respect to 100 parts by mass of the cycloolefin polymer 1, and styrene-maleic anhydride copolymer (Dylark D332, manufactured by Sekisui Chemical Co. Ltd.) as an additive of negative intrinsic birefringence in an amount of 1 parts by mass with respect to 100 parts by mass of the cycloolefin polymer 1 were added, and a resulting solution was filtered with a sintered metal fiber filter of a pore size of 5 μm, manufactured by Nippon Pall Corp. under such a flow rate control as to maintain a pressure difference of 0.4 MPa or less. It was then coated, by an INVEX Lab Coater, manufactured by Inoue Kinzoku Kogyo Co. and installed in a clean room of a class 1000, onto a PET film of a thickness of 100 μm (Lumilar U94 manufactured by Toray Industries Inc.) subjected to a hydrophilization treatment (adhesion promoting treatment) with an acrylic acid-type agent.

Then an obtained liquid layer was primarily dried at 50° C., then secondarily dried at 90° C. and peeled off from the PET film to obtain a resin film of a thickness of 99 μm (hereinafter also called "cycloolefin polymer film 1"). The obtained cycloolefin polymer film 1 had a residual solvent content of 0.5 mass % and an optical transmittance of 93% or higher.

Also the cycloolefin polymer film 1 was heated to 120° C. (Tg+10° C.) in a tenter, then stretched in the longitudinal planar direction to 1.05 times with a stretching rate of 300%/min, further stretched to 1.5 times in the transversal planar direction, then cooled in the stretched state for 1 minute in an atmosphere of 90° C. (Tg−20° C.), further cooled at the room temperature and taken out from the tenter to obtain a stretched cycloolefin polymer film 1, which had a thickness of 87 μm.

Comparative Example 2-1

Preparation of Laminated Phase Difference Film (Stretched Polymer Film B as Substrate)

A polycarbonate film of a thickness of 80 μm (trade name: Pure Ace WR, manufactured by Teijin Inc.), prepared by casting and stretching and constituted of a copolymer containing monomer units constituting polymers of different wavelength dispersion characteristics, was employed as a stretched polymer film B serving as a substrate.

<Preparation of Liquid Crystal Layer Coating Liquid>

A following liquid crystal material (B), having polymerizable acrylate groups on both ends and having spacers between a central mesogen and terminal acrylate groups, was employed for a coating liquid for forming a liquid crystal layer of a normal wavelength dispersion. Also Irgacure 184 (manufactured by Ciba Specialty Chemicals Inc.) was employed as a photopolymerization initiator (B). Also a following chiral agent (B), having polymerizable acrylate groups on both ends, was employed as a chiral agent. The chiral agent (B) had X=3 in the formula 4.

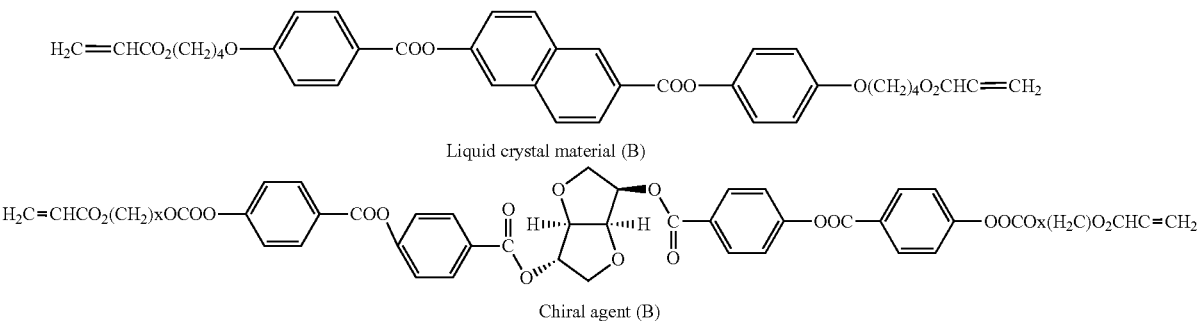

Liquid crystal material (B)

Chiral agent (B)

(Preparation of Liquid Crystal Layer Coating Liquid)

A following composition was charged in a disperser and agitated to dissolve components, thereby obtaining a liquid crystal layer coating liquid.

| (Composition of liquid crystal layer coating liquid) | |
|---|---|
| Liquid crystal material (B) | 75.0 parts by mass |
| Photopolymerization initiator (B) | 1.0 part by mass |
| Toluene (solvent) | 25.0 parts by mass |
| Chiral agent (B) | 10.0 parts by mass |

(Preparation of Chiral Nematic (Cholesteric) Liquid Crystal Layer)

The aforementioned coating liquid was spin coated on the stretched polymer film B.

Then the film coated with the polymerizable liquid crystal coating liquid was heated for 5 minutes at 100° C. on a hot plate to remove the residual solvent, thereby developing a liquid crystal structure with a twisted orientation.

Then the coated liquid crystal layer was irradiated with an ultraviolet light (20 mJ/cm$^2$, wavelength: 365 nm) to obtain a laminated film structure of a chiral nematic (cholesteric) liquid crystal layer of a thickness of 4.0 μm. The liquid crystal layer had a spiral pitch of 180 nm, and a reflection wavelength of 280 nm. This film is called a laminated phase difference film 1.

<Measurement of Retardation>

A retardation in planar direction Re(0) was measured with an automatic birefringence meter (KOBRA-21ADH, manufactured by Oji Keisoku Kiki Co.). Also retardations Re(40) and Re(−40) were measured by deflections by 40° and −40° about the phase retarding axis in planar direction. Also a retardation Rth was determined by using the film thickness and the film thickness nx along the phase retarding axis as parameters, and by calculating a refractive index ny and a refractive index nz in the thickness direction so as to match the measured values of Re(0), Re(40) and Re(−40). Measurements were made at wavelengths of 480, 546 and 628 nm.

Table 3 summarizes results of physical property measurements of the film.

TABLE 3

| Sample No. | Thickness (μm) | Re (nm) | | | | | Rth (nm) | | | | | Remarks |
|---|---|---|---|---|---|---|---|---|---|---|---|---|
| | | 480 nm | 546 nm | 628 nm | 480 nm/ 546 nm | 628 nm/ 546 nm | 480 nm | 546 nm | 648 nm | 480 nm/ 546 nm | 628 nm/ 546 nm | |
| cellulose acylate film 1 | 92 | 35 | 53 | 72 | 0.66 | 1.36 | 198 | 186 | 177 | 1.06 | 0.95 | invention |
| cellulose acylate film 2 | 94 | 27 | 51 | 67 | 0.53 | 1.31 | 213 | 191 | 181 | 1.12 | 0.95 | invention |
| stretched cyclo-olefin polymer film 1 | 87 | 31 | 38 | 43 | 0.82 | 1.13 | 180 | 157 | 141 | 1.15 | 0.90 | invention |
| laminated phase difference film | 84 | 126 | 137 | 144 | 0.92 | 1.05 | 468 | 452 | 432 | 1.04 | 0.96 | comp. ex. |

As will be from the results in Table 3, the stretched optical resin film of the invention could attain Re of normal dispersion and Rth of inverse dispersion by a simple process without a coating step, in comparison with the laminated phase difference film of Comparative Example.

Example 2-4

Saponification Process

The cellulose acetate film 1 was immersed in a 1.5 N aqueous solution of sodium hydroxide for 2 minutes at 55° C., then washed with water in a rinsing bath of room temperature, neutralized with 0.1N sulfuric acid at 30° C., again washed with water in a rinsing bath of room temperature, and dried with warm air of 100° C., thereby saponifying the surface of the cellulose acetate film.

(Preparation of Polarizing Plate)

A polarizing film was prepared by adsorbing iodine on a stretched polyvinyl alcohol film.

Then a transparent substrate of the prepared cellulose acetate film was adhered, with a polyvinyl alcohol-based adhesive, to a surface of the polarizing film. A phase retarding axis of the transparent substrate was positioned parallel to a transmission axis of the polarizing film.

A commercially available cellulose triacetate film (Fujitac TD80UF, manufactured by Fuji Photo Film Co.) was saponified in a similar manner as the cellulose acetate film 1, and was adhered, with a polyvinyl alcohol-based adhesive, to the other surface of the polarizing film, whereby a polarizing plate 1 was obtained.

Comparative Example 2-2

Surface Treatment of Laminated Phase Difference Film 1

A polycarbonate film of the laminated phase difference film 1 was hydrophilized by a corona discharge treatment with a corona discharge manufactured by Kasuga Denki Co. under a condition of 12 W·min/m$^2$.

Comparative Example 2-3

Preparation of Polarizing Plate 2

The laminate phase difference film 1 surface treated in Comparative Example 2 and the saponified Fujitac TD80 saponified as described above were so adhered as to sandwich the polarizer as in Example 2-3, and the adhered structure was dried and cured for 72 hours at 40° C. to obtain a polarizing plate 2. The laminate phase difference film 1 was so adhered that the polycarbonate film contacted the polarizer. The obtained polarizing plate had a transmittance of 40% and a polarization degree of 99.4%.

Example 2-5

The polarizing plates 1 and 2, prepared in Example 2-2 and Comparative Example 2-2, were cut into a size of 20×20 cm, and the adhesion between the polarizer and the protecting film after a standing for 500 hours at 60° C. 90% RH was confirmed. The polarizing plate 1 of the invention retained satisfactory adhesion, while the polarizing plate 2 of Comparative Example showed a peeling at the interface between the polarizer and the polycarbonate, at four corners of square form.

Results of Example 2-4 indicate that the polarizing plate 1 utilizing the cellulose acylate film 1 of the invention is superior in the polarizing property and in the durability under a condition of high temperature and high humidity, in comparison with the polarizing plate 2, utilizing the laminate phase difference film 1 of Comparative Example.

Example 2-6

In a 22" liquid crystal display apparatus (manufactured by Sharp Inc.), a polarizing plate at the observing side was peeled off and replaced by the polarizing plate 1 prepared in Example 2-4, which was adhered on the observing side by an adhesive in such a manner that the cellulose acetate film 1 of the invention faces the liquid crystal cell, as shown in FIG. 3. The transmission axis of the polarizing plate at the observing side was positioned perpendicular to that of the polarizing plate at the backlight side.

It was confirmed that the polarizing plate of the invention showed little changes in color and contrast depending on the viewing angle, and little unevenness in display.

Example 2-7

Saponification Process

A solution of a following composition was coated in an amount of 5.2 ml/m$^2$ on the cellulose acetate film 2 prepared in Example 2-2, and was dried for 10 seconds at 60° C. The film surface was rinsed for 10 seconds under running water, and was dried by blowing air of 25° C.

| (Composition of saponifying solution) | |
|---|---|
| Isopropyl alcohol | 818 parts by mass |
| Water | 167 parts by mass |
| Propylene glycol | 187 parts by mass |
| Potassium hydroxide | 68 parts by mass |
| Surfactant (1) n-C$_{16}$H$_{33}$O(C$_2$H$_4$O)$_{10}$H | 12 parts by mass |

(Preparation of Orienting Film)

On the saponified cellulose acetate film 2, a coating solution of a following composition was coated with an amount of 24 ml/m$^2$ with a #14 wired bar coater, then dried for 60 seconds with warm air of 60° C. and for 150 seconds with warm air of 90° C.

Then the formed film was subjected to a rubbing process in a direction of 45° to a stretching direction (substantially same as the phase retarding axis) of the cellulose acetate film 2.

| (Compsition of orienting film coating solution) | |
|---|---|
| Denatured polyvinyl alcohol of following formula | 20 parts by mass |
| Water | 360 parts by mass |
| Methanol | 120 parts by mass |
| Glutaraldehyde | 1.0 part by mass |

Denatured Polyvinyl Alcohol

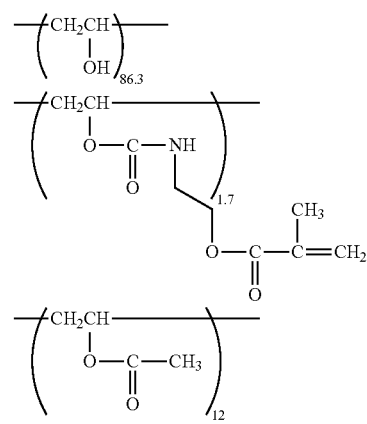

(Preparation of Optically Anisotropic Layer)

A coating liquid prepared by dissolving following components:

| | |
|---|---|
| Discotic liquid crystalline molecule (I) of following formula | 91 parts by mass |
| Ethylene oxide-denatured trimethylolpropane triacrylate (V#360, manufactured by Osaka Organic Chemical Industry Ltd.) | 9 parts by mass |
| Cellulose acetate butyrate (CAB531-1, manufactured by Eastman Chemical Ltd.) | 1.5 parts by mass |
| Photopolymerization initiator (Irgacure 907, manufactured by Ciba-Geigy Ltd.) | 3 parts by mass |
| Citrate ester mixture of following formula | 1.0 part by mass, | in 214.2 parts by mass of methyl ethyl ketone, was coated with an amount of 6.2 ml/m$^2$ with a #3.6 wired bar coater in an atmosphere of 25° C. The coated film was applied to a metal frame and heated for 2 minutes in a thermostat oven of 140° C. to orient the discotic -continued liquid crystal molecules. It was then irradiated with ultraviolet light of a 120 W/cm high-pressure mercury lamp for 1 minute at 90° C. to polymerize the discotic liquid crystal moleculres, and was then let to cool to the room temperature.

Discotic Liquid Crystal Molecule (1)

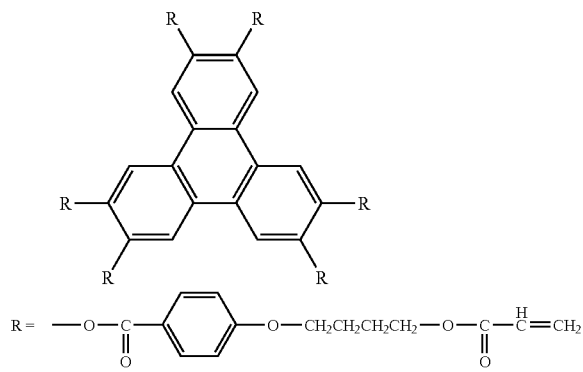

Citric Ester Mixture

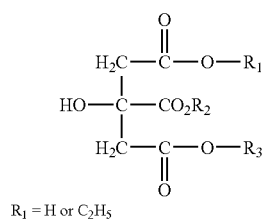

$R_1 = H$ or $C_2H_5$ (Preparation of Polarizing Plate)

A polarizing film was prepared by adsorbing iodine on a stretched polyvinyl alcohol film.

Then a transparent substrate of the prepared optical compensation sheet was adhered, with a polyvinyl alcohol-based adhesive, to a surface of the polarizing film. A phase retarding axis of the transparent substrate was positioned parallel to a transmission axis of the polarizing film.

A commercially available cellulose triacetate film (Fujitac TD80UF, manufactured by Fuji Photo Film Co.) was saponified as in Example 2, and was adhered, with a polyvinyl alcohol-based adhesive, to the other surface of the polarizing film, whereby a polarizing plate 3 was obtained.

(Preparation of Bend-Aligned Liquid Crystal Cell)

On a glass substrate having an ITO electrode, a polyimide film was provided as an orienting film, which was subjected to a rubbing process. Two glass substrates thus prepared were mutually opposed in an arrangement where the rubbing directions thereof are mutually parallel, with a cell gap of 5.7 μM. A liquid crystal compound (ZLI1132, manufactured by Merck Inc.) with Δn of 0.1396 was poured into the cell gap to obtain a bend-aligned liquid crystal cell.

(Preparation of Liquid Crystal Display Apparatus)

Two polarizing plates 3 were adhered so as to sandwich thus prepared bend-aligned liquid crystal cell, in such a manner that the optically anisotropic layer of the polarizing plate faces the substrate of the cell and that the rubbing direction of the liquid crystal cell and the rubbing direction of the optically anisotropic layer opposed thereto are antiparallel.

In an observation of thus prepared liquid crystal display apparatus in different temperature and humidity conditions, the liquid crystal display apparatus utilizing the polarizing plate of the invention was found to show little changes in the contrast and the color depending on the viewing angle, and little unevenness in the display.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-77316 and JP2005-77317, both filed Mar. 17, 2005, the contents of which are incorporated herein by reference.

The invention claimed is:

1. A stretched optical resin film comprising:
    a polymer resin;
    0.1 to 20 parts by mass of at least one additive having a negative intrinsic birefringence with respect to 100 parts by mass of the polymer resin; and
    0.1 to 20 parts by mass of at least one additive having a positive intrinsic birefringence with respect to 100 parts by mass of the polymer resin,
    wherein the film has retardations satisfying relations (A) to (F):
    (A) 0 nm<Re(546)<300 nm
    (B) 30 nm<Rth(546)<700 nm
    (C) 0.1<Re(480)/Re(546)<1.0
    (D) 1.0<Re(628)/Re(546)<4.0
    (E) 0.8<Rth(480)/Rth(546)<4.0
    (F) 0.1<Rth(628)/Rth(546)<1.2
    wherein Re(λ) represents an in-plane retardation at a wavelength of λ, and Rth(λ) represents a retardation in a thickness direction of the stretched optical resin film at a wavelength of λ.

2. The stretched optical resin film according to claim 1, which is a cellulose acylate film.

3. The stretched optical resin film according to claim 1, which is a cycloolefin polymer film.

4. The stretched optical resin film according to claim 1, wherein the additive having a negative intrinsic birefringence has an absorption maximum within a wavelength region of 200 to 400 nm.

5. The stretched optical resin film according to claim 1, which has a slow axis crossing a stretching direction of the stretched optical resin film at an angle of −5° to 5°, wherein the angle has a fluctuation range of 5° or less in a longitudinal direction of the stretched optical resin film.

6. The stretched optical resin film according to claim 1, which has a film thickness of 40 to 110 μm.

7. A method for producing a stretched optical resin film according to claim 1, which comprises: adding an additive having a negative intrinsic birefringence to an optical resin film; and stretching the optical resin film.

8. An optical compensation sheet comprising: a stretched polymer film according to claim 1; and an optically anisotropic layer.

9. A polarizing plate comprising: a polarizer; and two protective films, the polarizer being between the two protective films, wherein at least one of the two protective films is a stretched polymer film according to claim 1.

10. A polarizing plate comprising: a polarizer; and two protective films, the polarizer being between the two protective films, wherein at least one of the two protective films is an optical compensation sheet according to claim 8.

11. A liquid crystal display comprising: a liquid crystal cell; and two polarizing plates, the liquid crystal cell being between the two polarizing plates, wherein at least one of the two polarizing plates is a polarizing plate according to claim 9.

12. The liquid crystal display according to claim 11, wherein the liquid crystal cell is of a VA mode.

13. The liquid crystal display according to claim 11, wherein the liquid crystal cell is of an OCB mode.

14. The liquid crystal display according to claim 11, which comprises a backlight, the polarizing plate being between the liquid crystal cell and the backlight.

* * * * *